(12) United States Patent
Leiza et al.

(10) Patent No.: US 12,297,306 B2
(45) Date of Patent: May 13, 2025

(54) METHOD FOR PRODUCING A POLYMERIC COMPOSITION AND POLYMERIC COMPOSITION THUS PRODUCED AS WELL AS APPLICATIONS THEREOF, ESPECIALLY AS OR IN PRESSURE SENSITIVE ADHESIVES

(71) Applicants: The University of the Basque Country, Leioa (ES); Basque Center for Macromolecular Design and Engine, Donostia-San Sebastián (ES)

(72) Inventors: José Ramón Leiza, Hernani (ES); Miren Aguirre Arrese, Elgoibar (ES); Fabian Wenzel, Hamburg (DE)

(73) Assignees: The University of the Basque Country (ES); Basque Center for Macromolecular Design and Engine (ES)

(*) Notice: Subject to any disclaimer, the term of this patent is extended or adjusted under 35 U.S.C. 154(b) by 706 days.

(21) Appl. No.: 17/764,342

(22) PCT Filed: Dec. 13, 2019

(86) PCT No.: PCT/EP2019/085056
§ 371 (c)(1),
(2) Date: Mar. 28, 2022

(87) PCT Pub. No.: WO2021/058122
PCT Pub. Date: Apr. 1, 2021

(65) Prior Publication Data
US 2022/0403079 A1    Dec. 22, 2022

(30) Foreign Application Priority Data

Sep. 27, 2019 (WO) ............... PCT/EP2019/025320
Oct. 9, 2019 (WO) ............... PCT/EP2019/025338
Nov. 14, 2019 (WO) ............... PCT/EP2019/081347

(51) Int. Cl.
*C08F 220/18* (2006.01)
*C08F 2/00* (2006.01)
(Continued)

(52) U.S. Cl.
CPC ........ *C08F 220/1804* (2020.02); *C08F 2/001* (2013.01); *C08F 2/22* (2013.01);
(Continued)

(58) Field of Classification Search
CPC ...... C08F 220/1804; C08F 2/001; C08F 2/22; C08F 220/06; C08F 220/14; C08G 63/08;
(Continued)

(56) References Cited

U.S. PATENT DOCUMENTS 6,521,431 B1 * 2/2003 Kiser ............... C08G 63/00
530/812
9,517,203 B2 * 12/2016 Turnell ............... A61K 47/59
(Continued)

FOREIGN PATENT DOCUMENTS

| CA | 2385140 C | * 7/2011 | ......... A61K 47/482 |
| CN | 109134745 | 1/2019 | |
| WO | 0078846 | 12/2000 | |

*Primary Examiner* — Scott R. Walshon
(74) *Attorney, Agent, or Firm* — Edward E. Sowers; Brannon Sowers & Cracraft PC

(57) ABSTRACT

The present invention refers to a method for producing polymeric compositions, preferably in the form of water-based (i.e. waterborne) compositions, more preferably dispersions (i.e. emulsions or latices), which are particularly useful as or in adhesives, especially pressure-sensitive adhesives, particularly pressure-sensitive adhesives degradable under basic conditions, as well as to the polymeric compositions thus produced and to their applications.

24 Claims, 12 Drawing Sheets

(51) Int. Cl.
　　　*C08F 2/22*　　　　(2006.01)
　　　*C08F 220/06*　　(2006.01)
　　　*C08F 220/14*　　(2006.01)
　　　*C08G 63/08*　　　(2006.01)
　　　*C09J 7/38*　　　　(2018.01)
　　　*C09J 133/08*　　(2006.01)
　　　*C09J 133/12*　　(2006.01)

(52) U.S. Cl.
　　　CPC .......... *C08F 220/06* (2013.01); *C08F 220/14* (2013.01); *C08G 63/08* (2013.01); *C09J 7/385* (2018.01); *C09J 133/08* (2013.01); *C09J 133/12* (2013.01); C09J 2301/302 (2020.08); C09J 2433/00 (2013.01)

(58) Field of Classification Search
　　　CPC ........ C09J 7/385; C09J 133/08; C09J 133/12; C09J 2301/302; C09J 2433/00
　　　See application file for complete search history.

(56) References Cited

U.S. PATENT DOCUMENTS

2015/0337179 A1　11/2015　Lewandowski
2019/0119530 A1　4/2019　Miyazawa

\* cited by examiner

METHOD FOR PRODUCING A POLYMERIC COMPOSITION AND POLYMERIC COMPOSITION THUS PRODUCED AS WELL AS APPLICATIONS THEREOF, ESPECIALLY AS OR IN PRESSURE SENSITIVE ADHESIVES

CROSS-REFERENCES TO RELATED APPLICATIONS

This application is a National Stage filing of International Application PCT/EP 2019/085056 filed Dec. 13, 2019, entitled "METHOD FOR PRODUCING A POLYMERIC COMPOSITION AND POLYMERIC COMPOSITION THUS PRODUCED AS WELL AS APPLICATIONS THEREOF, ESPECIALLY AS OR IN PRESSURE-SENSITIVE ADHESIVES" claiming priority to PCT/EP 2019/025320, filed Sep. 27, 2019, PCT/EP 2019/025338, filed Oct. 9, 2019, and PCT/EP 2019/081347, filed Nov. 14, 2019. The subject application claims priority to PCT/EP 2019/085056, PCT/EP 2019/025320, PCT/EP 2019/025338, and PCT/EP 2019/081347 and incorporates all by reference herein, in their entirety.

FIELD OF THE INVENTION

The present invention refers to the technical field of polymeric compositions, especially polymeric compositions to be used in or as adhesives.

Especially, the present invention relates to a method for producing a polymeric composition, preferably in the form of a water-based (waterborne) composition, more preferably dispersion (emulsion or latex), particularly to be used as or in an adhesive, especially a pressure-sensitive adhesive, particularly a pressure-sensitive adhesive degradable under basic conditions, as well as to the polymeric composition thus produced and to its various uses, usages and applications.

Furthermore, the present invention is also directed to an adhesive, especially a pressure-sensitive adhesive, especially a pressure-sensitive adhesive degradable under basic conditions, particularly in the form of a water-based (waterborne) composition, more preferably dispersion (emulsion or latex), comprising the inventive polymeric composition and/or being obtainable using the inventive polymeric composition as well as to its various uses, usages and applications.

Finally, the present invention also refers to a crosslinker, particularly a crosslinking (macro)monomer or oligomer, especially a crosslinker degradable under basic conditions, as well as to its various uses, usages and applications.

BACKGROUND OF THE INVENTION

One of the most important challenges of the 21$^{st}$ century is to diminish the amount of residues produced by humans. The World Bank predicts that the yearly-generated amount of municipal solid waste is going to increase from 1.3 billion tons up to 2.2 billion tons by the year 2025. Next to organic, paper and plastic waste, glass waste makes up for 5% of the global solid waste composition. Glass bottles and jars are 100% and infinitely recyclable. However, for example in the US, in the year 2015 only 33.2% of the waste glass was recycled. Even better than recycling, which means crushing the glass into glass cullet and manufacturing new glass from these glass cullet, would be reusing the glass bottles. According to the annual worldwide production, around 5 billion glass bottles could be reusable.

When reusing glass bottles, the returned bottles are cleaned in bottle cleaning machines at temperatures of around 85° C., using additives containing a basic solution (e.g. sodium hydroxide). During the cleaning process the labels and adhesives of the glass bottles have to be removed and, in order to achieve this, the exposure to heat, jetted hot gas or sprayed hot liquid having a predetermined temperature is necessary. Another method for removing bottle labels and adhesives is the use of amidine solvents such as 1,8-diazobicyclo[5.4.0]undec-7-ene (i.e. DBU) or fatty N,N-dialkylamides. All in all, the described industrial processes are either energy-intensive and/or require the use of toxic chemicals. An adhesive that would degrade during the bottle cleaning process within milder conditions, especially within the conditions of the bottle cleaning process, might be able to overcome this issue.

Adhesives can be designed for either permanent or removable application. Permanent adhesives form a permanent bond with the surface of the adherend and can only be removed when breaking up (i.e. degrading) the adhesive. Removable adhesives temporarily bond to a surface and can then, ideally, be easily removed without leaving residues on the surface of the adherend.

Furthermore, adhesives can be categorized by their method of adhesion, i.e. generally there are two different types: reactive and non-reactive adhesives, which refers to whether the adhesive chemically reacts in order to adhere to a surface or not. In the packaging and labeling industry, non-reactive adhesives are widely used, especially pressure-sensitive adhesives (PSAs) are omnipresent. Pressure-sensitive adhesives are particularly popular because they are time-effective, easy to apply and cost-effective while simultaneously being long-lasting and versatile.

Pressure-sensitive adhesives (=PSAs) are viscoelastic materials which can adhere strongly to solid surfaces upon application of a light contact pressure and in short contact times, i.e. generally no water, solvent nor heat is needed to activate the adhesive (i.e. instantaneous adhesion to a surface can be achieved without activation) and which provide sufficient internal strength in order not to break up before the bond between the adhesive and the surface ruptures. Waterborne PSA formulations are especially popular in commercial applications because, among other things, they do not contain any VOCs or other noxious fumes.

The PSA sector is among the fastest growing sectors in the adhesives market. PSAs, especially waterborne PSAs, can be based on a wide variety of polymers but within these different base polymers waterborne acrylates represent the fastest growing area for commercial applications. In a typical waterborne PSA formulation—apart from the monomers, emulsifiers, initiators and water—crosslinkers and chain transfer agents (CTA) can be used to balance the cohesive and adhesive forces of the resulting adhesive film, respectively. Crosslinkers bond one polymer chain to another by forming covalent or ionic bonds and thereby promote changes in the polymer's physical properties. Therefore, new adhesive formulations with improved adhesivity, degradability or stimuli-responsive characteristics are of interest.

Different approaches to obtain degradable polymer nanoparticles are already published in literature. One of these approaches is based on the synthesis of degradable macromonomers suitable for biodegradable nanoparticles synthesis and is described e.g. in the publications "*PLA-Based Nanoparticles with Tunable Hydrophobicity and Degrada-* tion Kinetics" by Yingchun Yu, Raffaele Ferrari, Marco Lattuada, Giuseppe Storti, Massimo Morbidelli, David Moscatelli in Journal of Polymer Science 2012, 50, pages 5191 to 5200 and "ε-*Caprolactone-Based Macromonomers Suitable for Biodegradable Nanoparticles Synthesis through Free Radical Polymerization*" by Raffaele Ferrari, Yingchuan Yu, Massimo Morbidelli, Robin A. Hutchinson, David Moscatelli in Macromolecules 2011, 44, pages 9205-9212. However, the nanoparticles obtained on the basis of these macromonomers are predominantly determined for drug delivery applications and are not sufficiently degradable under moderate or mild conditions since they do not possess any crosslinkages. Above all, for these reasons, neither the nanoparticles nor the macromonomer are appropriate to be used as or in pressure-sensitive adhesives.

Moreover, the publication "*Renewable Biobased Polymeric Materials: Facile Synthesis of Itaconic Anhydride-Based Copolymers with Poly(L-lactic acid) Grafts*" by Tomoya Okuda, Kiyoaki Ishimoto, Hitomi Ohara, Shiro Kobayashi in Macromolecules 2012, 45, 4166-4174 refers to the synthesis of biobased macromonomers by ring-opening polymerization (ROP) and to the copolymerization of these macromonomers with acrylic monomers to obtain graft PLA-copolymers which are to be used for coating and elastic materials. Also these graft PLA-copolymers are not appropriate to be used as or in pressure-sensitive adhesives and do not possess any crosslinkages.

Furthermore, U.S. Pat. No. 7,754,241 B1 describes a hydrogel and a method of making a degradable hydrogel, wherein the method comprises obtaining a hydrophilic polymer having at least two hydroxyl groups, reacting the hydrophilic polymer with a difunctional monomer comprised of an acid halide group and an alkyl halide group to form an intermediate with a metallic salt of a vinyl acid monomer to form a macromonomer comprised of an ester, an alkyl group spacer and a terminal vinyl group and polymerizing the macromonomer to form a degradable hydrogel. However, these degradable hydrogels are determined for biomedical applications and are not appropriate for use as or in pressure-sensitive adhesives. Above all, the hydrogels have a predetermined life span which may not be controlled by outer conditions.

Moreover, U.S. Pat. No. 6,521,431 B1 refers to biodegradable crosslinkers having a polyacid core with at least two acidic groups covalently connected to reactive groups usable to crosslink polymer filaments, wherein between at least one reactive group and an acidic group of polyacid is a biodegradable region, which preferably consists of a hydroxyalkyl acid ester sequence having one to six hydroxyalkyl acid ester groups, wherein the polyacid may be attached to a water-soluble region that is attached to the biodegradable region having attached reactive groups, wherein the hydroxyalkyl acid ester group is preferably a lactate or glycolate, wherein polyacids include diacids, triacids, tetraacids and pentaacids and the reactive group may contain a carbon-carbon double bond. Applications of the crosslinkers and network include controlled release of drugs and cosmetics, tissue engineering, wound healing, hazardous waste remediation, metal chelation, swellable devices for absorbing liquids and prevention of surgical adhesions.

Further, U.S. Pat. No. 9,334,428 B2 refers to pressure-sensitive adhesives prepared from degradable monomers and polymers, wherein the pressure-sensitive adhesives comprise a copolymeric (meth)acrylic-based elastomeric material comprising a polymerization product of two different monomers comprising each an ethylenically unsaturated group. However, degradability and thus removability are not always sufficient under given conditions. Furthermore, the use of specific crosslinkers on behalf of polymerization reaction is only optional and not deemed critical; above all, the optionally used crosslinkers of this document are not easily available but only via complex multistage synthesis including various and extensive purification steps. Crosslinking according to this document can also be performed in a non-chemical way, namely via high energy electromagnetic radiation.

Furthermore, publication "Cohesive Force Change Induced by Polyperoxide Degradation for Application to DismantleableAdhesion" by Eriko Sato, Hiroshi Tamura, Akikazu Matsumoto in ACS Applied Materials and Interfaces 2010, 2, 2594-2601 describes another approach to obtain degradable PSAs, wherein degradable polyperoxide PSAs are synthesized, on the one hand, through the synthesis of linear polyperoxides from methyl sorbate and oxygen and, on the other hand, through the oxygen crosslinking of dienyl functionalized poly(ethylene glycol) to obtain peroxide groups within the crosslinkers, wherein degradation is observed at raised temperatures and under UV-light.

Moreover, publication "*Poly(Alkyl Glycidate Carbonate)s as Degradable Pressure-Sensitive Adhesives by Anjeza Beharaj, Iriny, Ekladious, Prof Mark W. Grinstaff in Angewandte Chemie International Edition*, 2019, 58, 1407-1411" describes another different approach to synthesize PSAs, wherein carbon dioxide $CO_2$ is inserted into a polyacrylic backbone, thus forming poly(carbonate) analogues which are degrading depending upon time and pH.

Thus, in the prior art, there do not exist high-performance polymeric compositions which are appropriate for use as or in pressure-sensitive adhesives and which are degradable under moderate or mild conditions, especially under basic conditions (e.g. as used in the bottle cleaning processes) and which provide at the same time good or improved adhesivity.

OBJECTS OF THE PRESENT INVENTION

What is needed are thus pressure-sensitive adhesives which are degradable under mild or moderate conditions, particularly under basic conditions (e.g. especially under the conditions used during bottle cleaning processes), and which at the same time possess high-performance PSA properties such as e.g. adhesivity.

Therefore, it is an object of the present invention to provide a method for producing a polymeric composition, especially a polymeric composition, which can be used for or as an adhesive, especially a pressure-sensitive adhesive, wherein the aforementioned disadvantages and/or drawbacks of the prior art should be at least partially avoided or even at least essentially overcome.

Particularly, it is another object of the present invention to provide a method for producing a polymeric composition which may especially be used for or as an adhesive, especially a pressure-sensitive adhesive, particularly a pressure-sensitive adhesive degradable under basic condition, and which is preferably in the form of a water-based (waterborne) composition, more preferably a dispersion (emulsion or latex).

Especially, in view of the prior art described before, another problem underlying the present invention is especially to provide a polymeric composition, especially a polymeric composition, which can be used for or as an adhesive, especially a pressure-sensitive adhesive, particularly a pressure-sensitive adhesive degradable under basic conditions, preferably in the form of a water-based (waterborne) composition, more preferably a dispersion (emulsion or latex), which polymeric composition is to at least partially avoid or even to at least essentially overcome the aforementioned disadvantages and/or drawbacks of the prior art.

Especially, yet another particular problem addressed by the present invention is that of providing a polymeric composition, preferably in the form of a water-based (waterborne) composition, more preferably dispersion (emulsion or latex), particularly to be used as or in an adhesive, especially a pressure-sensitive adhesive, particularly a pressure-sensitive adhesive degradable under basic conditions, which polymeric composition, especially when used in or as an adhesive, provides efficient and long-lasting adhesion and is, at the same time, degradable when subjected to a treatment under defined and particularly basic conditions.

Furthermore, it is still another object of the present invention to provide a respective method for producing a polymeric composition, preferably in the form of a water-based (waterborne) composition, more preferably dispersion (emulsion or latex), particularly to be used as or in an adhesive, especially a pressure-sensitive adhesive, particularly a pressure-sensitive adhesive degradable under basic conditions, which polymeric composition and its respective method of production shall be compatible to environmental requirements and constraints, especially avoiding the use of deleterious and/or toxic ingredients or materials (such as e.g. volatile organic compounds VOCs etc.) and not leading to highly polluted wastes.

Moreover, it is yet another object of the present invention to provide a method for producing a polymeric composition, preferably in the form of a water-based (waterborne) composition, more preferably dispersion (emulsion or latex), particularly to be used as or in an adhesive, especially a pressure-sensitive adhesive, particularly a pressure-sensitive adhesive degradable under basic conditions, which polymeric composition shall be economic and cost-efficient in its production and shall be easy to be used and to be applied.

Especially, it is yet another object of the present invention to provide and/or to develop a novel polymeric composition, preferably in the form of a water-based (waterborne) composition, more preferably dispersion (emulsion or latex), particularly to be used as or in an adhesive, especially a pressure-sensitive adhesive, particularly a pressure-sensitive adhesive degradable under basic conditions, which is especially appropriate for use as or in pressure-sensitive adhesives degradable under defined basic conditions and shows improved properties, especially improved adhesion, while at the same time being environmentally compatible, economic and cost-efficient in its production as well as easy to use and to apply.

Furthermore, it is also still another object of the present invention to provide a crosslinker, particularly a crosslinking (macro)monomer or oligomer, especially a crosslinker degradable under defined and particularly basic conditions, which is particularly appropriate to be incorporated into a polymeric composition, especially a polymeric composition which can be used as or in an adhesive, especially a pressure-sensitive adhesive, preferably a pressure-sensitive adhesive degradable under basic conditions, and/or which is particularly appropriate for providing a polymeric composition with degradable functional groups, especially ester groups, particularly degradable under defined basic conditions.

Finally, it is yet another object of the present invention to provide an adhesive, especially a pressure-sensitive adhesive, especially degradable under basic conditions, particularly in the form of a water-based (waterborne) composition, preferably in the form of a dispersion (emulsion or latex), which shows improved properties, especially improved adhesion, while, at the same time, being degradable under basic conditions while simultaneously being environmentally compatible, economic and cost-efficient in its production as well as easy to use and to apply.

SUMMARY OF THE INVENTION

The present invention, according to a first aspect of the present invention, refers to a method for producing a polymeric composition; further and especially advantageous embodiments of the inventive method are described.

Furthermore, according to a second aspect of the present invention, the present invention also relates to a polymeric composition; further and especially advantageous embodiments of the inventive crosslinker are similarly described.

Further, according to a third aspect of the present invention, the present invention also relates to the use of the inventive polymeric composition and; further and especially advantageous embodiments of the inventive crosslinker are provided.

Moreover, according to a fourth aspect of the present invention, the present invention further relates to an adhesive comprising an inventive polymeric composition; further and especially advantageous embodiments of the inventive adhesive are disclosed.

Moreover, according to a fifth aspect of the present invention, the present invention further relates to a crosslinker and especially advantageous embodiments of the inventive crosslinker are the subject-matter of the further disclosure.

Further, according to a sixth aspect of the present invention, the present invention also relates to the use of an inventive crosslinker and especially advantageous embodiments of the inventive crosslinker are also disclosed.

Finally, according to a seventh aspect of the present invention, the present invention also relates to the use of an inventive adhesive; and further and especially advantageous embodiments of the inventive crosslinker are also provided.

Before the present invention will be described more in detail hereinafter, the following general remarks are given:

It will be appreciated and it goes without saying that, in the following, features, embodiments, configurations or the like which are described or cited hereinafter for just one aspect of the present invention or for the purpose of avoiding repetitions do, of course, also apply correspondingly and mutatis mutandis in relation to all other aspects of the present invention.

Moreover, it will be appreciated and goes also without saying that all single features, embodiments, configurations or the like are also to be understood and are also disclosed in their respective combinations with one another.

Furthermore, it will be appreciated that, in the case of any values, numbers, figures, ranges etc. indicated hereinafter, any ranges etc. stated should not be understood in a restrictive manner. It will be apparent to the person skilled in the art that, depending on the individual case and/or based on the respective application, it is possible to deviate from the stated ranges, figures, values etc., without leaving the scope of the present invention.

Moreover, any values, numbers, figures, ranges, parameters and the like indicated hereinafter may be determined or ascertained, in principle, by standardized or expressly specified determination methods or else by determination methods well known per se to those skilled in the art.

Furthermore, in relation to any hereinbelow recited relative or percentage-based indications, in particular weight-based amounts, it goes without saying that these indications are, in the context of the present invention, to be selected and/or to be combined by a person skilled in the art such that the resulting sum total—including where applicable any further components/ingredients—always results in 100% or 100 wt. %, respectively.

Having stated this and with these provisions, the present invention will be described more in detail hereinafter.

DETAILED DESCRIPTION OF THE INVENTION

Figure 1:
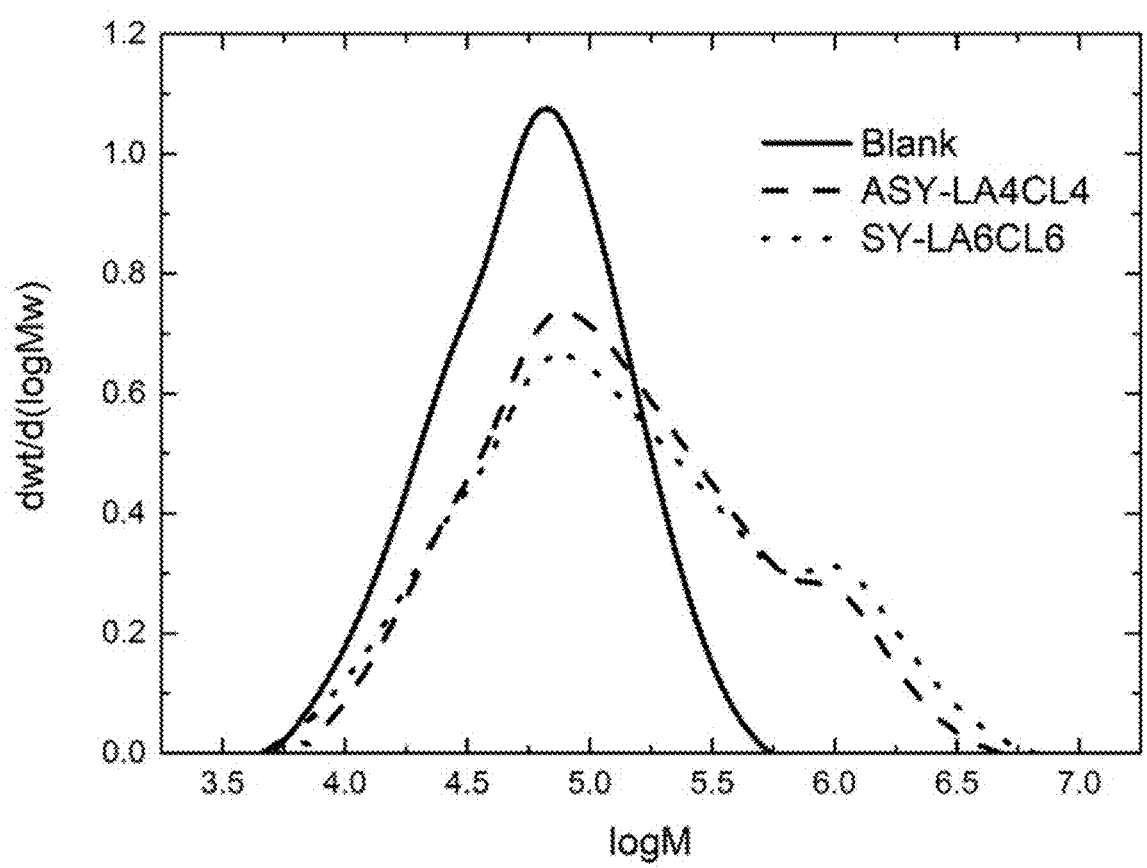
FIG. 1 shows the molecular mass distribution measured by GPC (SEC/RI) of various polymers obtained by solution polymerization according to a particular embodiment of the invention.

According to a first aspect of the present invention, the present invention refers to a method for producing a polymeric composition, preferably in the form of a water-based (waterborne) composition, more preferably dispersion (emulsion or latex), particularly to be used as or in an adhesive, especially a pressure-sensitive adhesive, particularly a pressure-sensitive adhesive degradable under basic conditions, wherein the method comprises producing, via polymerization, preferably via emulsion polymerization, especially in a two-stage radical polymerization process, a copolymer obtainable by copolymerizing moieties (monomers) (i), (ii) and (iii) according to the following definition and each being different from one another:
(i) at least one first ethylenically unsaturated monomer, the homopolymer of which has a glass transition temperature $Tg^{(i)}$ ranging from 30° C. to 200° C., especially from 40° C. to 150° C.,
(ii) at least one second ethylenically unsaturated monomer, the homopolymer of which has a glass transition temperature $Tg^{(ii)}$ ranging from −100° C. to −10° C., especially from −60° C. to −20° C.,
(iii) at least one crosslinker, especially at least one crosslinking (macro)monomer or oligomer, which crosslinker comprises moieties (units) derived from ε-caprolactone (1-oxa-2-oxocylcoheptane) and/or lactide (3,6-dimethyl-1,4-dioxan-2,5-dion) and which crosslinker additionally comprises two ethylenically unsaturated bonds (carbon-carbon double bonds).

According to a preferred embodiment of the invention, the inventive method may comprise two stages, wherein
(a) in a first stage (step), an emulsion prepolymerization of at least part of at least one of monomers (i) and (ii) is performed in the absence of crosslinker (iii), so as to produce an emulsion prepolymerization product to be used as a seed in the subsequent second stage (step) (b); and then
(b) in a second stage (step), the emulsion prepolymerization product resulting from stage (step) (a) and the remainder of monomers (i) and (ii), if any, are polymerized together with and in the presence of crosslinker (iii), so as to yield a polymeric composition, preferably in the form of a water-based (waterborne) composition, more preferably dispersion (emulsion or latex), which polymeric composition comprises a copolymer comprising moieties of (i), (ii) and (iii), especially in the form of discrete particles.

In the case of the present invention, the inventive method leads to a copolymer comprising the aforedefined moieties (i), (ii) and (iii), which are the three different moieties or monomers from which the copolymer is obtainable via copolymerization. Moiety (iii), i.e. the crosslinker (iii), itself is again comprised by moieties (i.e. repeating units or blocks) derived from ε-caprolactone (1-oxa-2-oxocylcoheptane) and/or lactide (3,6-dimethyl-1,4-dioxan-2,5-dion), wherein in this context the term "derived from" particularly means that ε-caprolactone-based moiety and/or the lactide-based moiety is incorporated as a linear or chain-formed moiety obtained via ring-opening from ε-caprolactone and/or lactide, respectively (which is well known to those skilled in the art and corresponds to the common use).

The compound ε-caprolactone or synonymously 1-oxa-2-oxocylcoheptane according to IUPAC (International Union of Pure and Applied Chemistry) is a lactone, i.e. a cyclic ester, possessing a seven-membered ring. In the following the abbreviation "CL" can also be used to describe the moiety (unit) derived from ε-caprolactone which is incorporated into the crosslinker (iii). The moiety (unit) derived from ε-caprolactone, which is incorporated into the crosslinker (iii), can be represented by the following formula (1):

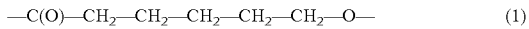

$$—C(O)—CH_2—CH_2—CH_2—CH_2—CH_2—O— \quad (1)$$

The compound lactide or synonymously 3,6-dimethyl-1,4-dioxan-2,5-dion according to IUPAC is the lactone cyclic di-ester of lactic acid (i.e. 2-hydroxypropionic acid according to IUPAC) and exists in three different stereoisomeric forms. In the following the abbreviation "LA" can also be used to describe the moiety (unit) derived from lactide which is incorporated into the crosslinker (iii). The moiety (unit) derived from lactide, which is incorporated into the crosslinker (iii), can be represented by the following formula (2):

$$—C(O)—CH(CH_3)—O— \quad (2)$$

The glass-liquid transition or glass transition, according to IUPAC definition, is a process in which a polymer melt changes on cooling to a polymer glass or a polymer glass changes on heating to a polymer melt, respectively. Especially, the glass-liquid transition or glass transition denotes the gradual and reversible transition in amorphous polymers or in amorphous regions/moieties of semicrystalline polymers from a hard and relatively brittle (i.e. glassy or glass-like) state into a viscous or rubbery state as the temperature is increased. In this respect, the so-called glass transition temperature Tg of a polymer characterizes the temperature where this glass transition occurs.

The glass transition temperature Tg indicated hereinabove and/or hereinbelow particularly refers to the glass transition temperature Tg as defined and/or determined according to standard DIN EN ISO 11357-2: 2014 (determination via Differential Scanning Calorimetry DSC). Differential scanning calorimetry (DSC) is a thermoanalytical analysis in which the difference in the amount of heat required to increase the temperature of a sample and a reference is measured as a function of temperature.

The inventive method as well as the inventive polymeric composition thus produced and the uses and applications thereof as well as the inventive crosslinker thus produced and the uses and applications thereof are linked to a multitude of particularities and advantages, which significantly distinguish the present invention over the prior art and which indicate the significant technical progress and inventiveness involved by the present invention if compared to the prior art.

The inventive method is conceived as a two-stage (two-step) process, particularly a two-step seeded emulsion polymerization, especially a semi-batch two-step seeded emulsion polymerization: In a first stage (step) (a), a prepolymerization product is produced via emulsion polymerization, so that the resulting product from the first stage (step) (a) can be used as a seed in a subsequent second stage (step) (b); the subsequent second stage (step) (b) is thus performed as a so-called seeded polymerization, particularly as a seeded emulsion polymerization.

Typically, the overall method, i.e. both the first stage (step) (a) and also the second stage (step) (b), is/are performed as an emulsion polymerization, particularly as a radical emulsion polymerization.

The method of the present invention as well as the resulting polymeric composition are environmentally friendly and/or environmentally compatible under several aspects and particularly fulfill also the most recent environmental requirements: The overall method, i.e. both the first stage (step) (a) and the second stage (step) (b), is/are performed in a liquid water-based (i.e. waterborne) carrier or milieu. Thus, the use of organic solvents and of volatile organic compounds (VOCs) (of course, except for the used monomers) may be efficiently avoided completely. Therefore, also the resulting inventive polymeric composition, particularly in the form of a water-based (waterborne) composition, preferably as a dispersion (i.e. emulsion or latex), is conceived on a mere waterborne (water-based) basis or formulation, so that also on behalf of its use or application no volatile organic substances have to be handled. Consequently, both the inventive method and the resulting polymeric composition of the present invention are highly environmentally friendly and thus fulfill also the most recent requirements as to environmental compatibility.

Since the overall method of the present invention is performed in a water-based (waterborne) carrier system or milieu, waste waters or wastes polluted with organics are completely avoided. This facilitates performing and handling of the inventive method and the resulting polymeric composition and contributes to the highly environmental compatibility of the present invention. Thus, the invention is also applicable on an industrial level or on a large-scale level, respectively.

The method of the present invention referring to the production of the inventive crosslinker as well as the resulting crosslinker itself are also environmentally friendly and/or environmentally compatible under several aspects and particularly fulfill also the most recent environmental requirements: The respective method for producing the inventive crosslinker, i.e. both the first stage (step) (A) and the second stage (step) (B), is/are performed in bulk.

Thus, the use of organic solvents and of volatile organic compounds (VOCs) (of course, except for the used monomers) may be efficiently avoided completely. Therefore, also the resulting inventive crosslinker, is conceived without any solvent, so that also on behalf of its use or application no volatile organic substances have to be handled. Consequently, both the inventive method referring to the production of the inventive crosslinker and the resulting crosslinker of the present invention are highly environmentally friendly and thus fulfill also the most recent requirements as to environmental compatibility.

Above all, high-performance polymeric compositions are provided by the present invention, which can especially be used as or in an adhesive, especially a pressure-sensitive adhesive, particularly a pressure-sensitive adhesive degradable under basic conditions: On the one hand, the inventive polymeric composition, especially when used in or as an adhesive, especially a pressure-sensitive adhesive, particularly a pressure-sensitive adhesive degradable under basic conditions, provides excellent adhesion properties; on the other hand, the inventive polymeric composition, especially when used in or as an adhesive, especially a pressure-sensitive adhesive, particularly a pressure-sensitive adhesive degradable under basic conditions, can be degraded under defined basic conditions, especially without leaving any relevant residues on the surface of the adherend. These properties, inter alia, significantly distinguish the present polymeric composition from prior art compositions, i.e. the inventive polymeric composition, especially when used in or as an adhesive, especially a pressure-sensitive adhesive, particularly a pressure-sensitive adhesive degradable under basic conditions, unifies, at the same time, excellent adhesion properties, on the one hand, and superior degradability under defined basic conditions, especially without leaving any significant residues on the adherend, on the other hand.

Due to the presence of the inventive crosslinker in the copolymer comprised by the inventive polymeric composition, which crosslinker comprises functional groups, especially ester groups, being degradable under basic conditions, a kind of a double functionality can be provided: On the one hand, the polymeric composition, especially when used in or as an adhesive, especially a pressure-sensitive adhesive, particularly a pressure-sensitive adhesive degradable under basic conditions, provides effective and improved adhesive strength. On the other hand, the polymeric composition, especially when used in or as an adhesive, especially a pressure-sensitive adhesive, particularly a pressure-sensitive adhesive degradable under basic conditions, can be degraded under defined basic conditions and therefore be peeled and/or removed and/or released from the adherend basically without leaving any significant residue. Thus, an adhesive can be provided with or in the form of the inventive polymeric composition which adheres permanently until subjected to a purposeful and targeted treatment in basic conditions resulting in the degradation and thus the removal and/or release and/or peel from the adherend.

The degradability of the polymeric composition, especially the copolymer comprised by the polymeric composition, is controllable under defined conditions. In this context, both the site and the speed of the degradation can be controlled; this controllability of the degradation is possible via the specific composition of the inventive crosslinker and the crosslinking degree within the polymeric composition and the copolymer comprised by the polymeric composition. Especially, the number of functional groups, especially ester groups, degradable under basic conditions directly influence both the exact site and the speed of the degradation. In this context, the degradation speed increases with the number of degradable functional groups, especially ester groups, within the crosslinker and thus also within the copolymer.

Furthermore, the degradability of the copolymer comprised by the polymeric composition is also controllable with regard to the conditions, i.e. the copolymer comprised by the polymeric composition is stable under neutral and slightly acidic conditions and only degrades under basic (i.e. alkaline) and acidic conditions. This specific characteristic of the copolymer comprised by the polymeric composition is especially advantageous when the films formed from the polymeric composition are used as or in adhesives, especially pressure-sensitive adhesives, particularly pressure-sensitive adhesives degradable under basic conditions.

The crosslinking degree of the inventive polymeric composition is easily adjustable and controllable and, therefore, also the swelling degree and/or the swellability of the polymeric composition or the films produced from the polymeric composition can therefore be adjusted to the specific use or application.

Furthermore, by controlling the crosslinking degree, also the microstructure of the copolymer comprised by the polymeric composition can be controlled, which again directly influences the quality and/or performance of the polymeric composition or the films produced from the polymeric composition.

Moreover, also the weight-average molecular weight ($M_w$) of the polymer molecules (i.e. particles) of the polymeric composition can be controlled and/or tailored. This can be done during their production by selection of the crosslinker and/or chain-transfer agent (CTA), especially by selecting the crosslinker and/or chain-transfer agent (CTA) with respect to their respective chemical nature, physico-chemical properties and/or amounts.

The resulting inventive polymeric composition comprises a copolymer comprising, inter alia, moieties (i) and (ii) having different characteristics, namely: moiety (i) based on/derived from at least one first ethylenically unsaturated monomer, the homopolymer of which has a glass transition temperature $Tg^{(i)}$ ranging from 30° C. to 200° C., especially from 40° C. to 150° C., on the one hand, and moiety (ii) based on/derived from at least one second ethylenically unsaturated monomer, the homopolymer of which has a glass transition temperature $Tg^{(ii)}$ ranging from –100° C. to –10° C., especially from –60° C. to –20° C. (i.e. the second ethylenically unsaturated monomer being different from the first ethylenically unsaturated monomer), on the other hand. Consequently, moiety (i), due to the relatively high glass transition temperature $Tg^{(i)}$, forms a rigid or stiff part (moiety) in the overall copolymer of the polymeric composition, whereas moiety (ii), due to the relatively low glass transition temperature $Tg^{(ii)}$, forms a soft or flexible part (moiety) in the overall copolymer of the polymeric composition.

The resulting copolymer is thus so to say a "hybrid" copolymer comprising both at least one moiety (i) having rigid or stiff characteristics and also at least one moiety (ii) having soft or flexible characteristics. On behalf of application of the polymeric composition comprising such copolymer, moiety (i) having rigid or stiff characteristics provides improved mechanical properties, especially when used in or as adhesives, particularly pressure-sensitive adhesives (such as e.g. improved peel, shear values etc.) and thus an improved adhesion to the adherend, whereas moiety (ii) having soft or flexible characteristics provides improved flexibility and flowability (e.g. improved wettability of the adherend, tack, peel etc.) and extended durability (e.g. longevity), thus resulting in improved pressure-sensitive adhesives which have enough flow to wet the adherend and to form a bond but also enough resistance to flow in order to stay adhered to the adherend when stress is applied. Consequently, by using the method for producing a pressure-sensitive adhesive according to the present invention, the overall performance of the resulting pressure-sensitive adhesive can be improved, especially adhesion and cohesion at the same time, particularly if compared to known prior art pressure-sensitive adhesives.

As delineated already hereinabove, moiety (iii) and/or the crosslinker (iii) comprising functional groups, especially ester groups, degradable under basic conditions effect the easy degradation of the copolymer comprised in the polymeric composition of the present invention when subjected to a treatment under defined basic conditions. Above all degradation only takes place when the inventive polymeric composition or the respective film produced therefrom is subjected to such defined treatment under basic conditions; otherwise (i.e. when no treatment under basic conditions is applied), the inventive polymeric composition or the respective film produced therefrom, especially when used as or in an adhesive, especially a pressure-sensitive adhesive, particularly a pressure-sensitive adhesive degradable under basic conditions, provides lasting high-performance adhesion.

As delineated before, the polymeric composition of the present invention resulting from the inventive production method provides excellent properties, especially for the use in or as adhesives, particularly pressure-sensitive adhesives, more particularly pressure-sensitive adhesive degradable under basic conditions, so that an efficient adhesion is provided by the inventive polymeric composition, fulfilling at the same time the requirements of a required degradation under defined basic conditions and those of an environmental compatibility. Especially, the use of toxic or harmful substances, such as organics (e.g. volatile organic compounds or VOCs), may be completely avoided by the present invention. At the same time, the resulting polymeric composition provides excellent mechanical and adhesion properties as well as other properties.

The polymeric composition or the film produced from the polymeric composition exhibit excellent properties which are required for pressure-sensitive adhesives, especially with respect to e.g. initial tack, loop tack, probe tack, peel resistance, shear and SAFT properties. Apart from this, the inventive method is economically efficient and especially uses commercially available and usual starting materials and may be easily controlled and performed also on an industrial or large-scale production level. The inventive method, i.e. the production process of the invention, is thus both economic and cost-efficient and also environmentally compatible as well as easy to use and to apply.

On the whole, the present invention provides an efficient method for producing a polymeric composition, especially to be used in or as adhesives, especially pressure-sensitive adhesives, particularly pressure-sensitive adhesives degradable under basic conditions. Particularly these pressure-sensitive adhesives degradable under basic conditions produced or obtained from or derived of the inventive polymeric composition are highly suitable for the use in combination with or for adhering labels, packagings, tags, tickets, tabs, stickers, sign, plaques or the like to objects. Furthermore, by using such pressure-sensitive adhesives degradable under defined basic conditions and produced or obtained from or derived from the inventive polymeric composition, any attached and/or adhered labels, packagings, tags, tickets, tabs, stickers, sign, plaques or the like are peelable and/or removable and/or releasable from the objects to which they are attached, especially under basic conditions and/or when in contact with a basic medium, especially without leaving any relevant residue.

As clearly delineated hereinbefore, the present invention, namely both the inventive process as well as the polymeric composition as such resulting therefrom and also the various uses and applications thereof, are linked to a multitude of particularities and advantages which clearly distinguish the present invention from the disadvantageous prior art techniques.

In the following, the present invention, namely first of all the inventive method, will be explained in more detail.

According to a particular embodiment of the first aspect of the present invention, there is provided a method for producing a polymeric composition, preferably in the form of a water-based (i.e. waterborne) composition, more preferably dispersion (i.e. emulsion or latex), particularly to be used as or in an adhesive, especially a pressure-sensitive adhesive, particularly a pressure-sensitive adhesive degradable under basic conditions, especially a method as described hereinabove, wherein the method comprises producing, via emulsion polymerization in a two-stage radical polymerization process, a copolymer obtainable by copolymerizing moieties (monomers) (i), (ii) and (iii) according to the following definition and each being different from one another:

(i) at least one first ethylenically unsaturated monomer, the homopolymer of which has a glass transition temperature $Tg^{(i)}$ ranging from 30° C. to 200° C., especially from 40° C. to 150° C., (ii) at least one second ethylenically unsaturated monomer, the homopolymer of which has a glass transition temperature $Tg^{(ii)}$ ranging from –100° C. to –10° C., especially from –60° C. to –20° C., (iii) at least one crosslinker, especially at least one crosslinking (macro)monomer or oligomer, which crosslinker comprises moieties (i.e. units) derived from ε-caprolactone (1-oxa-2-oxocylcoheptane) and/or lactide (3,6-dimethyl-1,4-dioxan-2,5-dion) and which crosslinker additionally comprises two ethylenically unsaturated bonds (i.e. carbon-carbon double bonds);

wherein:

(a) in a first stage (step), an emulsion prepolymerization of at least part of at least one of monomers (i) and (ii) is performed in the absence of crosslinker (iii), so as to produce an emulsion prepolymerization product to be used as a seed in the subsequent second stage (step) (b); and then (b) in a second stage (step), the emulsion prepolymerization product resulting from stage (step) (a) and the remainder of monomers (i) and (ii), if any, are polymerized together with and in the presence of crosslinker (iii), so as to yield a polymeric composition, preferably in the form of a water-based (i.e. waterborne) composition, more preferably dispersion (i.e. emulsion or latex), which polymeric composition comprises a copolymer comprising moieties of (i), (ii) and (iii), especially in the form of discrete particles.

With respect to moiety (i), as delineated hereinabove, moiety (i) of the copolymer of the polymeric composition produced by the inventive method is based on or derived from a first ethylenically unsaturated monomer, the homopolymer of which has a glass transition temperature $Tg^{(i)}$ ranging from 30° C. to 200° C., especially from 40° C. to 150° C. (i.e. a first ethylenically unsaturated monomer forming a homopolymer having a glass transition temperature $Tg^{(i)}$ ranging from 30° C. to 200° C., especially from 40° C. to 150° C.) (i.e. glass transition temperature $Tg^{(i)}$ in accordance with standard DIN EN ISO 11357-2: 2014).

According to a particular embodiment of the inventive method, it is preferred when moiety (i) and/or (i) the first ethylenically unsaturated monomer, the homopolymer of which has a glass transition temperature $Tg^{(i)}$ ranging from 30° C. to 200° C., especially from 40° C. to 150° C., is selected from the group consisting of:

(1) linear, branched or cycloaliphatic $C_1$-$C_{22}$-alkyl(meth)acrylates, especially methyl(meth)acrylate, ethyl(meth)acrylate, n-butyl(meth)acrylate, isobutyl(meth)acrylate, lauryl(meth)acrylate, 2-ethylhexyl(meth)acrylate, stearyl(meth)acrylate, cyclohexyl(meth)acrylate, isobornyl(meth)acrylate, 2-octyl(meth)acrylate and tert-butyl(meth)acrylate;

(2) acrylic acid and linear, branched or cycloaliphatic $C_1$-$C_{22}$-alkylacrylic acids, especially methacrylic acid, ethylacrylic acid, n-butylacrylic acid, isobutylacrylic acid, laurylacrylic acid, 2-ethylhexylacrylic acid, stearylacrylic acid, cyclohexylacrylic acid, isobornylacrylic acid and tert-butylacrylic acid;

(3) aryl(meth)acrylates, especially benzyl(meth)acrylate and phenyl(meth)acrylate, especially wherein the aryl radicals may be each unsubstituted or substituted with up to four substituents;

(4) arylacrylic acids, especially benzylacrylic acid and phenylacrylic acid, especially wherein the aryl radicals may be each unsubstituted or substituted with up to four substituents;

(5) mono(meth)acrylates of ethers, polyethyleneglycols, polypropyleneglycols or mixed polyethylene/propylene glycols each comprising 5 to 80 carbon atoms, especially tetrahydrofurfuryl(meth)acrylate, methoxyethoxyethyl(meth)acrylate, 1-butoxypropyl(meth)acrylate, cyclohexyloxymethyl(meth)acrylate, methoxymethoxyethyl(meth)acrylate, benzyloxymethyl(meth)acrylate, furfuryl(meth)acrylate, 2-butoxyethyl(meth)acrylate, 2-ethoxyethyl(meth)acrylate, allyloxymethyl(meth)acrylate, 1-ethoxybutyl(meth)acrylate, 1-ethoxyethyl(meth)acrylate, ethoxymethyl(meth)acrylate, poly(ethyleneglycol)methylether (meth)acrylate and poly(propyleneglycol)methylether (meth)acrylate;

(6) aminoalkyl(meth)acrylates, especially N,N-dimethylaminoethyl(meth)acrylate, 2-trimethylammoniumethyl (meth)acrylatchloride and N,N-dimethylaminopropyl (meth)acrylate;

(7) oxiranyl(meth)acrylates, especially 2,3-epoxybutyl (meth)acrylate, 3,4-epoxybutyl(meth)acrylate and glycidyl(meth)acrylate;

(8) styrenes and substituted styrenes, especially α-methylstyrenes, 4-methylstyrenes, 4-vinylbenzoic acid and sodium-4-vinylbenzene sulfonate;

(9) (meth)acrylonitriles;

(10) ethylenically unsaturated sulfonic acids and sulfates and salts thereof, especially potassium[3-((meth)acryloyloxy)propyl]sulfonate and ammonium[2-((meth)acryloyloxy)ethyl]sulfate;

(11) vinylesters of carboxylic acids comprising 1 to 20 carbon atoms, especially vinylacetate;

(12) vinylesters of versatic acids;

(13) (meth)acrylamides;

(14) N-alkyl- and N,N-dialkyl-substituted (meth)acrylamides comprising linear, branched or cycloaliphatic $C_1$-$C_{22}$-alkyl groups, especially N-(tert-butyl)acrylamide and N,N-dimethylacrylamide;

(15) heterocyclic (meth)acrylates, especially piperonyl (meth)acrylate.

According to yet another particular embodiment of the inventive method, it is preferred when moiety (i) and/or (i) the first ethylenically unsaturated monomer, the homopolymer of which has a glass transition temperature $Tg^{(i)}$ ranging from 30° C. to 200° C., especially from 40° C. to 150° C., is selected from the group consisting of:

(1) linear, branched or cycloaliphatic $C_1$-$C_{22}$-alkylmethacrylates, especially methylmethacrylate, ethylmethacrylate, iso-butylmethacrylate, cyclohexylmethacrylate, isobornylmethacrylate, isobornylacrylate, tert-butylacrylate and tert-butylmethacrylate;

(2) acrylic acid and linear, branched or cycloaliphatic $C_1$-$C_{22}$-alkylacrylic acids;

(3) arylmethacrylates, especially benzylmethacrylate, phenylacrylate and phenylmethacrylate, especially wherein the aryl radicals are each unsubstituted or substituted with up to four substituents;

(4) arylacrylic acids, especially wherein the aryl radicals may be each unsubstituted or substituted with up to four substituents;

(6) aminoalkylmethacrylates, especially N,N-dimethylaminoethylmethacrylate, 2-trimethylammoniumethylmethacrylate chloride and N,N-dimethylaminopropylmethacrylate;

(7) oxiranylmethacrylates, especially 2,3-epoxybutylmethacrylate, 3,4-epoxybutylmethacrylate and glycidylmethacrylate;

(8) styrenes and substituted styrenes, especially α-methylstyrenes, 4-methylstyrenes, 4-vinylbenzoic acid and sodium-4-vinylbenzene sulfonate;

(9) acrylonitrile and methacrylonitrile;

(10) ethylenically unsaturated sulfonic acids and sulfates and salts thereof, especially potassium[3-(methacryloyloxy)propyl]sulfonate and ammonium[2-(methacryloyloxy)ethyl]sulfate;

(11) vinylesters of carboxylic acids comprising 1 to 20 carbon atoms, especially vinylacetate;

(12) vinylesters of versatic acids;

(13) acrylamide and methacrylamide;

(14) N-alkyl- and N,N-dialkyl-substituted methacrylamides comprising linear, branched or cycloaliphatic $C_1$-$C_{22}$-alkyl groups, especially N-(tert-butyl)acrylamide and N,N-dimethylacrylamide;

(15) heterocyclic methacrylates, especially piperonyl methacrylate.

According to a preferred embodiment of the present invention, moiety (i) and/or (i) the first ethylenically unsaturated monomer, the homopolymer of which has a glass transition temperature $Tg^{(i)}$ ranging from 30° C. to 200° C., especially from 40° C. to 150° C., comprises or is a combination of (meth)acrylic acid and/or at least one carboxylic acrylate with at least one other ethylenically unsaturated monomer being different therefrom, the homopolymer of which other ethylenically unsaturated monomer has a glass transition temperature $Tg^{(i)}$ ranging from 30° C. to 200° C., especially from 40° C. to 150° C., especially wherein the other ethylenically unsaturated monomer is selected as defined hereinabove.

Furthermore, according to the present invention, it is preferred when moiety (i) and/or (i) the first ethylenically unsaturated monomer, the homopolymer of which has a glass transition temperature $Tg^{(i)}$ ranging from 30° C. to 200° C., especially from 40° C. to 150° C., is selected such and/or with the proviso that moiety (i) and/or (i) the first ethylenically unsaturated monomer comprises or is a combination of (meth)acrylic acid and/or at least one carboxylic acrylate with at least one other ethylenically unsaturated monomer being different therefrom, the homopolymer of which other ethylenically unsaturated monomer has a glass transition temperature $Tg^{(i)}$ ranging from 30° C. to 200° C., especially from 40° C. to 150° C., especially wherein the other ethylenically unsaturated monomer is selected as defined hereinabove.

According to yet a further particular embodiment of the inventive method, it is preferred when moiety (i) and/or (i) the first ethylenically unsaturated monomer, the homopolymer of which has a glass transition temperature $Tg^{(i)}$ ranging from 30° C. to 200° C., especially from 40° C. to 150° C., comprises or is methyl methacrylate (MMA) and/or acrylic acid (AA), preferably methyl methacrylate (MMA) and acrylic acid (AA).

With respect to moiety (ii), as delineated hereinabove, moiety (ii) of the copolymer of the polymeric composition produced by the inventive method is based on or derived from a second ethylenically unsaturated monomer, the homopolymer of which has a glass transition temperature $Tg^{(ii)}$ ranging from –100° C. to –10° C., especially from –60° C. to –20° C. (i.e. a second ethylenically unsaturated monomer forming a homopolymer having a glass transition temperature $Tg^{(ii)}$ ranging from –100° C. to –10° C., especially from −60° C. to −20° C.) (i.e. glass transition temperature Tg$^{(ii)}$ in accordance with standard DIN EN ISO 11357-2: 2014).

According to a particular embodiment of the inventive method, it is preferred when moiety (ii) and/or (ii) the second ethylenically unsaturated monomer, the homopolymer of which has a glass transition temperature Tg$^{(ii)}$ ranging from −100° C. to −10° C., especially from −60° C. to −20° C., is selected from the group consisting of:
- (1) linear, branched or cycloaliphatic C$_1$-C$_{22}$-alkyl(meth)acrylates, especially methyl(meth)acrylate, ethyl(meth)acrylate, n-butyl(meth)acrylate, iso-butyl(meth)acrylate, lauryl(meth)acrylate, 2-ethylhexyl(meth)acrylate, stearyl(meth)acrylate, cyclohexyl(meth)acrylate, isobornyl(meth)acrylate, 2-octyl(meth)acrylate and tert-butyl(meth)acrylate;
- (2) linear, branched or cycloaliphatic C$_1$-C$_{22}$-alkylacrylic acids, especially methylacrylic acid, ethylacrylic acid, n-butylacrylic acid, isobutylacrylic acid, laurylacrylic acid, 2-ethylhexylacrylic acid, stearylacrylic acid, cyclohexylacrylic acid, isobornylacrylic acid and tert-butylacrylic acid;
- (3) aryl(meth)acrylates, especially benzyl(meth)acrylate and phenyl(meth)acrylate, especially wherein the aryl radicals are each unsubstituted or substituted with up to four substituents;
- (4) arylacrylic acids, especially benzylacrylic acid and phenylacrylic acid, especially wherein the aryl radicals may be each unsubstituted or substituted with up to four substituents;
- (5) mono(meth)acrylates of ethers, polyethyleneglycols, polypropyleneglycols or mixed polyethylene/propylene glycols each comprising 5 to 80 carbon atoms, especially tetrahydrofurfuryl(meth)acrylate, methoxyethoxyethyl(meth)acrylate, 1-butoxypropyl(meth)acrylate, cyclohexyloxymethyl(meth)acrylate, methoxymethoxyethyl(meth)acrylate, benzyloxymethyl(meth)acrylate, furfuryl(meth)acrylate, 2-butoxyethyl(meth)acrylate, 2-ethoxyethyl(meth)acrylate, allyloxymethyl(meth)acrylate, 1-ethoxybutyl(meth)acrylate, 1-ethoxyethyl(meth)acrylate, ethoxymethyl(meth)acrylate, poly(ethyleneglycol)methylether(meth)acrylate and poly(propyleneglycol)methylether(meth)acrylate;
- (6) aminoalkyl(meth)acrylates, especially N,N-dimethylaminoethyl(meth)acrylate, 2-trimethylammoniumethyl(meth)acrylatchloride and N,N-dimethylaminopropyl(meth)acrylate;
- (7) oxiranyl(meth)acrylates, especially 2,3-epoxybutyl(meth)acrylate, 3,4-epoxybutyl(meth)acrylate and glycidyl(meth)acrylate;
- (8) styrenes and substituted styrenes, especially α-methylstyrenes, 4-methylstyrenes, 4-vinylbenzoic acid and sodium-4-vinylbenzene sulfonate;
- (9) (meth)acrylonitriles;
- (10) ethylenically unsaturated sulfonic acids and sulfates and salts thereof, especially potassium[3-((meth)acryloyloxy)propyl]sulfonate and ammonium[2-((meth)acryloyloxy)ethyl]sulfate;
- (11) vinylesters of carboxylic acids comprising 1 to 20 carbon atoms, especially vinylacetate;
- (12) vinylesters of versatic acids;
- (13) (meth)acrylamides;
- (14) N-alkyl- and N,N-dialkyl-substituted (meth)acrylamides comprising linear, branched or cycloaliphatic C$_1$-C$_{22}$-alkyl groups, especially N-(tert-butyl)acrylamide and N,N-dimethylacrylamide;
- (15) heterocyclic (meth)acrylates, especially piperonyl(meth)acrylate.

According to yet another particular embodiment of the inventive method, it is preferred when moiety (ii) and/or (ii) the second ethylenically unsaturated monomer, the homopolymer of which has a glass transition temperature Tg$^{(i)}$ ranging from −100° C. to −10° C., especially from −60° C. to −20° C., is selected from the group consisting of:
- (1) linear, branched or cycloaliphatic C$_1$-C$_{22}$-alkylacrylates, especially ethylacrylate, n-butylacrylate, isobutylacrylate, laurylacrylate, laurylmethacrylate, 2-ethylhexylacrylate, 2-ethylhexylmethacrylate, stearylacrylate, stearylmethacrylate, 2-octylmethacrylate and 2-octylacrylate;
- (2) linear, branched or cycloaliphatic C$_1$-C$_{22}$-alkylacrylic acids, especially ethylacrylic acid, n-butylacrylic acid, isobutylacrylic acid, laurylacrylic acid, 2-ethylhexylacrylic acid, stearylacrylic acid, cyclohexylacrylic acid, isobornylacrylic acid and tert-butylacrylic acid;
- (3) arylacrylates, especially wherein the aryl radicals are each unsubstituted or substituted with up to four substituents;
- (4) arylacrylic acids, especially benzylacrylic acid and phenylacrylic acid, especially wherein the aryl radicals may be each unsubstituted or substituted with up to four substituents;
- (5) monoacrylates of ethers, polyethyleneglycols, polypropyleneglycols or mixed polyethylene/propylene glycols each comprising 5 to 80 carbon atoms, especially tetrahydrofurfurylmethacrylate, tetrahydrofurfurylacrylate, methoxyethoxyethylmethacrylate, methoxyethoxyethylacrylate, 1-butoxypropylmethacrylate, 1-butoxypropylacrylate, cyclohexyloxymethylmethacrylate, cyclohexyloxymethylacrylate, methoxymethoxyethylmethacrylate, methoxymethoxyethylacrylate, benzyloxymethylmethacrylate, benzyloxymethylacrylate, furfurylmethacrylate, furfurylacrylate, 2-butoxyethylmethacrylate, 2-butoxyethylacrylate, 2-ethoxyethylmethacrylate, 2-ethoxyethylacrylate, allyloxymethylmethacrylate, allyloxymethylacrylate, 1-ethoxybutylmethacrylate, 1-ethoxybutylacrylate, 1-ethoxyethylmethacrylate, 1-ethoxyethylacrylate, ethoxymethylmethacrylate, ethoxymethylacrylate, poly(ethyleneglycol)methylethermethacrylate poly(ethyleneglycol)methyletheracrylate, poly(propyleneglycol)methylethermethacrylate and poly(propyleneglycol)methyletheracrylate;
- (6) aminoalkylacrylates, especially N,N-dimethylaminoethylacrylate, 2-trimethylammoniumethylacrylatchloride and N,N-dimethylaminopropylacrylate;
- (7) oxiranylacrylates, especially 2,3-epoxybutylacrylate, 3,4-epoxybutylacrylate and glycidylacrylate;
- (8) styrenes and substituted styrenes;
- (9) ethylenically unsaturated sulfonic acids and sulfates and salts thereof, especially potassium[3-(acryloyloxy)propyl]sulfonate and ammonium[2-(acryloyloxy)ethyl]sulfate;
- (10) vinylesters of carboxylic acids comprising 1 to 20 carbon atoms;
- (11) N-alkyl- and N,N-dialkyl-substituted acrylamides comprising linear, branched or cycloaliphatic C$_1$-C$_{22}$-alkyl groups;
- (12) heterocyclic acrylates, especially piperonylacrylate.

According to yet a further particular embodiment of the inventive method, it is preferred when moiety (ii) and/or (ii) the second ethylenically unsaturated monomer, the homopolymer of which has a glass transition temperature Tg$^{(ii)}$ ranging from −100° C. to −10° C., especially from −60° C. to −20° C., comprises or is butyl acrylate (BA).

According to yet another particular embodiment of the inventive method, it is preferred when moiety (i) and/or (i) the first ethylenically unsaturated monomer, the homopolymer of which has a glass transition temperature $Tg^{(i)}$ ranging from 30° C. to 200° C., especially from 40° C. to 150° C., comprises or is methyl methacrylate (MMA) and/or acrylic acid (AA), preferably methyl methacrylate (MMA) and acrylic acid (AA); and/or when moiety (ii) and/or (ii) the second ethylenically unsaturated monomer, the homopolymer of which has a glass transition temperature $Tg^{(ii)}$ ranging from −100° C. to −10° C., especially from −60° C. to −20° C., comprises or is butyl acrylate (BA).

According to another particular embodiment of the first aspect of the present invention, there is provided a method for producing a polymeric composition, preferably in the form of a water-based (i.e. waterborne) composition, more preferably dispersion (i.e. emulsion or latex), particularly to be used as or in an adhesive, especially a pressure-sensitive adhesive, particularly a pressure-sensitive adhesive degradable under basic conditions, especially a method as described hereinabove, wherein the method comprises producing, via emulsion polymerization in a two-stage radical polymerization process, a copolymer obtainable by copolymerizing moieties (monomers) (i) methyl methacrylate (MMA) and/or acrylic acid (AA), (ii) butyl acrylate (BA) and (iii) at least one crosslinker, especially at least one crosslinking (macro)monomer or oligomer, which crosslinker comprises moieties (units) derived from ε-caprolactone (1-oxa-2-oxocylcoheptane) and/or lactide (3,6-dimethyl-1,4-dioxan-2,5-dion) and which crosslinker additionally comprises two ethylenically unsaturated bonds (carbon-carbon double bonds), wherein:
(a) in a first stage (step), an emulsion prepolymerization of at least part of at least one of monomers (i) and (ii) is performed in the absence of crosslinker (iii), so as to produce an emulsion prepolymerization product to be used as a seed in the subsequent second stage (step) (b); and then
(b) in a second stage (step), the emulsion prepolymerization product resulting from stage (step) (a) and the remainder of monomers (i) and (ii), if any, are polymerized together with and in the presence of crosslinker (iii), so as to yield a polymeric composition, preferably in the form of a water-based (waterborne) composition, more preferably dispersion (emulsion or latex), which polymeric composition comprises a copolymer comprising moieties of (i) methyl methacrylate (MMA) and/or acrylic acid (AA), (ii) butyl acrylate (BA) and (iii) at least one crosslinker, especially at least one crosslinking (macro)monomer or oligomer, which crosslinker comprises moieties (units) derived from ε-caprolactone (1-oxa-2-oxocylcoheptane) and/or lactide (3,6-dimethyl-1,4-dioxan-2,5-dion) and which crosslinker additionally comprises two ethylenically unsaturated bonds (carbon-carbon double bonds), especially in the form of discrete particles.

This particular embodiment of the inventive method leads to particularly good results and an excellent performance of the resulting polymeric composition, especially when used as or in an adhesive.

According to a further particular embodiment, the resulting copolymer comprised by the polymeric composition may have a glass transition temperature Tg in the range of from −5 to −100° C., particularly in the range of from −10 to −55° C., especially in the range of from −20 to −50° C., especially as determined by differential scanning calorimetry, preferably in accordance with DIN EN ISO 11357-2:2014.

According to another particular embodiment, moieties (i), (ii) and (iii) may be selected such that the resulting copolymer comprised by the polymeric composition has a glass transition temperature Tg in the range of from −5 to −100° C., particularly in the range of from −20 to −50° C., especially in the range of from −10 to −40° C., especially as determined by differential scanning calorimetry, preferably in accordance with DIN EN ISO 11357-2:2014; especially wherein moieties (i), (ii) and (iii) are selected as a function of and/or according to their chemical nature and/or physicochemical properties, especially with respect to the glass transition temperatures Tg of the respective homopolymers of moieties (i) and (ii) and/or with respect to the molecular masses of moieties (i), (ii) and (iii), and/or as a function of and/or according to the relative or proportional amounts of moieties (i), (ii) and (iii).

With respect to the first stage (step) (a) of the inventive method, in the following typical and representative but non-limiting embodiments will be described.

Typically, the first stage (step) (a) may be performed in the presence of at least one polymerization initiator, especially a radical polymerization initiator. Such initiator ensures an efficient initiation or start of the polymerization reaction and thus an efficient reaction course. This ensures an efficient polymerization procedure within the first stage (step) (a).

Preferably, such polymerization initiator, especially radical polymerization initiator may be selected from the group consisting of thermal polymerization initiators, redox polymerization initiators and combinations thereof, particularly inorganic and/or organic persulfates, peroxides, hydroperoxides, perbenzoates, peralkanoates, azoinitiators and combinations thereof, more preferably selected from the group consisting of inorganic and/or organic persulfates and azobisisobutyronitrile (AIBN), particularly selected from the group consisting of inorganic persulfates of alkali or earth alkaline metals and azobisisobutyronitrile (AIBN), more particularly potassium persulfate (KPS) or azobisisobutyronitrile (AIBN).

As delineated before, apart from azoinitiators such as e.g. AIBN and inorganic persulfates such as e.g. KPS, stage (step) (a), i.e. polymerization, can also be performed in the presence of other polymerization initiators. The initiator system may, for example, be chosen among thermal initiators, redox initiators or combinations thereof, for example potassium or ammonium persulfates, tert-butyl hydroperoxide, cumene hydroperoxide, tert-butyl perbenzoate, tert-butyl 2-ethyl perhexanoate, hydrogen peroxide and benzoyl peroxide. Either oil- and/or water-soluble initiators may be used. Suitable reducing agents of a redox initiator system may include compounds, such as sulphur compounds with a low oxidation state, such as sulfites, hydrogen sulfites, alkali metal bisulfites, ketone adducts of bisulfites, such as acetone bisulfite, alkali metal disulfites, metabisulfites and its salts, thiosulfates, formaldehyde sulfoxylates and its salts, reducing nitrogen compounds, such as hydroxylamines, hydroxylamine hydrosulfate and hydroxylammonium salts, polyamines and reducing sugars, such as sorbose, fructose, glucose, lactose and derivatives thereof, enediols, such as ascorbic acid and isoascorbic acid, sulfinic acids, hydroxy alkyl sulfinic acids, such as hydroxy methyl sulfinic acid and 2-hydroxy-2-sulfinactic acid and its salts. Redox initiators are typically used in combination with trace amounts of metal such as iron, for example supplied as ferrous sulfate.

Usually, the first stage (step) (a) is performed in the presence of at least one surfactant (synonymously also called emulsifier). This embodiment also ensures an efficient polymerization procedure.

Especially, such surfactant or emulsifier may be an anionic or non-ionic surfactant, especially selected from the group consisting of anionic organic sulfates and sulfonates and non-ionic alkylene oxides, especially ethylene and/or propylene oxides, and combinations thereof, preferably selected from the group consisting of organic sulfonates, particularly dodecyl diphenyloxide disulfonates.

As appropriate surfactants, there may particularly be used anionic surfactants, such as e.g. alkyl, alkyl phenyl or styrenated phenyl sulfates and sulfonates, or polymerizable anionic surfactants containing sulfates and sulfonates together with allyl, propenyl and propenyl phenyl polymerizable groups, or polymerizable non-ionic surfactants with hydrophilic part containing ethylene oxide or propylene oxide groups or mixtures of both together with polymerizable groups like allyl, propenyl and propenyl phenyl.

However, according to another (i.e. alternative) embodiment, the first stage (step) (a) may also be performed in the absence of any surfactant (i.e. in the absence of any emulsifier).

Furthermore, it may be advantageous when the first stage (step) (a) is performed in the presence of at least one buffer, especially an inorganic carbonate buffer, a hydrogen carbonate buffer or a ammonium hydroxide buffer. This embodiment ensures a stable and constant reaction environment and thus an efficient reaction course.

Particularly, the first stage (step) (a) may be performed under neutral or acidic conditions, preferably under acidic conditions.

Particularly, the first stage (step) (a) may be performed in a water-based (i.e. waterborne) liquid milieu or carrier. Especially, the water-based (waterborne) liquid milieu or carrier additionally comprises at least one polymerization initiator and/or at least one surfactant and/or at least one buffer, preferably each as defined hereinabove, and/or optionally at least one further additive. This ensures an efficient polymerization reaction under environmentally friendly conditions.

Furthermore, the first stage (step) (a) may be performed under various temperature conditions. Usually, the first stage (step) (a) may be performed at elevated temperatures. Especially, the first stage (step) (a) is performed at a temperature in the range of from 30° C. to 200° C., especially in the range of from 30° C. to 150° C., preferably in the range of from 35° C. to 130° C., more preferably in the range of from 40° C. to 100° C.

Moreover, the first stage (step) (a) may be performed under various pressure conditions. Typically, the first stage (step) (a) is performed at ambient pressure (1 bar or 101.325 kPa), at reduced pressure or at elevated pressure, preferably at ambient pressure (1 bar or 101.325 kPa).

Also, the first stage (step) (a) may be performed for various durations. Typically, the first stage (step) (a) may be performed for a duration in the range of from 0.01 to 24 hours, especially in the range of from 0.1 to 12 hours, preferably in the range of from 0.5 to 6 hours, more preferably in the range of from 0.75 to 4 hours.

In order to provide an efficient seed for the subsequent second stage (step) (b), it is advantageous to adjust the solids content level in the first stage (step) (a). Particularly, in this respect, the first stage (step) (a) may be performed until a solids content, based on the total weight of the emulsion prepolymerization product resulting from stage (a), of at least 0.1% by weight, especially of at least 0.5% by weight, preferably of at least 0.75% by weight, more preferably of at least 1% by weight, has been reached. Especially, in this respect the first stage (step) (a) may be performed until a solids content, based on the total weight of the emulsion prepolymerization product resulting from stage (a), in the range of from 0.1 to 60% by weight, especially in the range of from 0.5 to 55% by weight, preferably in the range of from 0.75 to 50% by weight, more preferably in the range of from 1 to 40% by weight, has been reached.

According to a typical embodiment, the first stage (step) (a) may be performed in an at least essentially inert atmosphere, especially selected from nitrogen and noble gases, especially nitrogen. Especially, such procedure prevents undesired side-reactions, especially due to oxidation or hydrolysis.

Usually, the first stage (step) (a) may be performed as an emulsion polymerization, particularly as a radical emulsion polymerization, preferably with diameter sizes of the dispersed phase from 50 nm to 1 micrometer. This ensures producing polymeric compositions with excellent film-forming properties and superior adhesion when used in or as an adhesive.

According to a particular embodiment of the present invention, it is advantageous when, in the first stage (step) (a) a (pre)emulsion and/or a homogenous mixture containing water, monomers (i) and/or (ii) used in this first stage (step) (a) and optionally surfactant may be fed into a solution containing water and optionally catalyst and/or buffer. Thereby a homogeneous mixture of the monomers is fed into the solution, whereby the monomers are present in the solution in an even distribution. This ensures an efficient polymerization procedure.

According to a further particular embodiment of the present invention, it is advantageous when, after the first stage (step) (a) and/or before the second stage (step) (b), the emulsion prepolymerization product resulting from stage (a) and/or the polymerization milieu used in the second stage (step) (b) is/are neutralized or alkalized, preferably neutralized, or is/are adjusted to a neutral or slightly alkaline pH value, preferably to a neutral pH value, particularly by use of an alkaline agent. Especially, an undesired hydrolysis of the ester groups and of the acrylate linkages is thereby efficiently prevented.

With respect to the second stage (step) (b) of the inventive method, in the following typical and representative but non-limiting embodiments will be described.

Typically, also the second stage (step) (b) may be performed in the presence of at least one polymerization initiator, especially a radical polymerization initiator. This ensures an efficient polymerization procedure within the second stage (step) (b).

Especially, such polymerization initiator, especially a radical polymerization initiator, as used in step (b) may preferably be selected from the group consisting of thermal polymerization initiators, redox polymerization initiators and combinations thereof, particularly inorganic and/or organic persulfates, peroxides, hydroperoxides, perbenzoates, peralkanoates, azoinitiators and combinations thereof, more preferably selected from the group consisting of inorganic and/or organic persulfates and azobisisobutyronitrile (AIBN), particularly selected from the group consisting of inorganic persulfates of alkali or earth alkaline metals and azobisisobutyronitrile (AIBN), more particularly potassium persulfate (KPS) or azobisisobutyronitrile (AIBN).

Basically, the same polymerization initiators as used in stage/step (a) may be used in stage/step (b). Consequently, for further details as to the polymerization initiators to be used, reference can be made to the above explanation for stage/step (a).

Principally, also the second stage (step) (b) may be performed in the presence of at least one surfactant (i.e. emulsifier). Also this measurement constitutes to ensure an efficient polymerization procedure within the second stage (step) (b).

Furthermore, it may be advantageous when also the second stage (step) (b) is performed in the presence of at least one buffer, especially inorganic carbonate buffers, hydrogen carbonate buffers or ammonium hydroxide buffers. This embodiment ensures a stable and constant reaction environment and thus an efficient reaction course.

Especially, such surfactant or emulsifier may preferably be an anionic or non-ionic surfactant, especially selected from the group consisting of anionic organic sulfates and sulfonates and non-ionic alkylene oxides, especially ethylene and/or propylene oxides, and combinations thereof, preferably selected from the group consisting of organic sulfonates, particularly dodecyl diphenyloxide disulfonates.

Basically, the same surfactants as used in stage/step (a) may be used in stage/step (b). Consequently, for further details as to the surfactants to be used, reference can be made to the above explanation for stage/step (a).

However, according to another (i.e. alternative) embodiment, the second stage (step) (b) may also be performed in the absence of any surfactant (i.e. in the absence of any emulsifier).

Typically, the second stage (step) (b) may be performed in the presence of at least one chain-transfer agent (CTA). A chain-transfer agent, as used according to the present invention, has at least one weak chemical bond, which therefore facilitates the chain-transfer reaction. Thereby, the molecular weight of the resulting polymer particles of the polymeric composition can be controlled and tailored, especially via the chemical nature, physicochemical properties and amounts of such chain-transfer agent. Such chain-transfer agents may also be called modifiers. This also influences molecular masses and molecular mass distributions, particularly also the so-called polydispersity index (PDI).

Especially, the chain-transfer agent may be selected from the group consisting of thiols and halocarbons, especially selected from the group consisting of dodecyl mercaptan (DDM), 2-ethylhexyl thioglycolate, tetrabromomethane and carbon tetrachloride, preferably dodecyl mercaptan (DDM).

According to a particular embodiment of the present invention, the second stage (step) (b) may be performed under neutral or slightly acidic conditions, preferably under at least essentially neutral conditions. Especially, an undesired hydrolysis of both the acrylate linkers and the ester groups is thereby prevented.

Particularly, also the second stage (step) (b) may be performed in a water-based (waterborne) liquid milieu or carrier. Especially, the water-based (waterborne) liquid milieu or carrier may additionally comprise at least one polymerization initiator and/or at least one surfactant and/or at least one chain-transfer agent (CTA), preferably each as defined hereinabove, and/or optionally at least one further additive. This ensures an efficient polymerization reaction under environmentally friendly conditions.

Furthermore, also the second stage (step) (b) may be performed under various temperature conditions. Usually, the second stage (step) (b) may be performed at elevated temperatures. Especially, the second stage (step) (b) may be performed at a temperature in the range of from 30° C. to 200° C., especially in the range of from 30° C. to 150° C., preferably in the range of from 35° C. to 130° C., more preferably in the range of from 40° C. to 100° C.

Moreover, also the second stage (step) (b) may be performed under various pressure conditions. Usually, the second stage (step) (b) may be performed at ambient pressure (1 bar or 101.325 kPa), at reduced pressure or at elevated pressure, preferably at ambient pressure (1 bar or 101.325 kPa).

Also, the second stage (step) (b) may be performed for various duration. Typically, the second stage (step) (b) may be performed for a duration in the range of from 0.01 to 24 hours, especially in the range of from 0.1 to 12 hours, preferably in the range of from 0.5 to 6 hours, more preferably in the range of from 0.75 to 4 hours.

In order to provide an efficient performance for the final applications or uses of the polymeric composition, it is advantageous to adjust the solids content level also in the second stage (step) (b). Particularly, in this respect, the second stage (step) (b) may be performed until a solids content, based on the total weight of the polymerization product resulting from stage (b), of at least 5% by weight, especially of at least 10% by weight, preferably of at least 15% by weight, more preferably of at least 35% by weight, has been reached. Especially, in this context, the second stage (step) (b) may be performed until a solids content, based on the total weight of the polymerization product resulting from stage (b), in the range of from 5 to 90% by weight, especially in the range of from 10 to 85% by weight, preferably in the range of from 15 to 80% by weight, more preferably in the range of from 35 to 65% by weight, has been reached.

According to a typical embodiment, also the second stage (step) (b) may be performed in an at least essentially inert atmosphere, especially selected from nitrogen and noble gases, especially nitrogen. Especially, such procedure prevents undesired side-reactions, especially due to oxidation or hydrolysis.

Usually, also the second stage (step) (b) may be performed as an emulsion polymerization, particularly as a radical emulsion polymerization, preferably with diameter sizes of the dispersed phase from 50 nm to 1 micrometer. This ensures producing polymeric compositions with excellent film-forming properties and superior adhesion, especially when used as or in adhesives.

According to a preferred embodiment of the present invention, the first stage (step) (a) may be performed in the absence of any chain-transfer agent (CTA).

According to another preferred embodiment of the present invention, the second stage (step) (b) may be performed in the presence of at least one chain-transfer agent (CTA).

According to a further preferred embodiment of the present invention, the first stage (step) (a) may be performed in the absence of any chain-transfer agent (CTA) and the second stage (step) (b) may be performed in the presence of a chain-transfer agent (CTA). This results in polymer particles in the polymeric composition particularly suitable for the use in adhesives, especially pressure sensitive adhesives.

According to a particular embodiment of the present invention, it is also advantageous when, in the second stage (step) (b), a (pre)emulsion and/or a homogenous mixture containing water, the monomers (i) and/or (ii) used in this second stage (step) (b), the crosslinker (iii) and optionally the chain-transfer-agent (CTA) and/or the surfactant may be fed into a solution containing water, the seed and optionally the catalyst. Thereby, also in the second stage (step) (b), a homogeneous mixture of the monomers is fed into the solution, whereby the monomers and the seed are present in the solution in an even distribution. This ensures an efficient polymerization procedure.

According to a particular embodiment, the method of the present invention results in producing a polymeric composition, preferably in the form of a water-based (i.e. waterborne) composition, more preferably dispersion (emulsion or latex), particularly to be used as or in an adhesive, especially a pressure-sensitive adhesive, particularly a pressure-sensitive adhesive degradable under basic conditions, which polymeric composition may comprise at least one of the following copolymers:

(i)/(ii)/(iii)-copolymers and/or copolymers comprising moieties (i), (ii) and (iii), preferably with a (i)/(ii)/(iii)-weight ratio of (1-80)/(20-99)/(0.0001-20), particularly (2-70)/(30-98)/(0.001-10), especially (5-60)/(40-97)/(0.005-5), preferably (5-40)/(50-96)/(0.01-5), however, with the proviso that the sum of the weight shares results in 100.

According to yet another particular embodiment, the method of the present invention results in producing a polymeric composition, preferably in the form of a water-based (i.e. waterborne) composition, more preferably dispersion (emulsion or latex), particularly to be used as or in an adhesive, especially a pressure-sensitive adhesive, particularly a pressure-sensitive adhesive degradable under basic conditions, which polymeric composition may comprise at least one of the following copolymers:

(i)/(ii)/(iii)-copolymers and/or copolymers comprising moieties (i), (ii) and (iii), preferably with a (i)/(ii)/(iii)-molar ratio of (1-80)/(25-99)/(0.001-15), particularly (2-75)/(30-98)/(0.005-10), especially (5-65)/(35-97)/(0.01-8), preferably (5-50)/(40-96)/(0.05-5), however, with the proviso that the sum of the molar shares results in 100.

According to yet a further particular embodiment, the method of the present invention results in producing a polymeric composition, preferably in the form of a water-based (waterborne) composition, more preferably dispersion (emulsion or latex), particularly to be used as or in an adhesive, especially a pressure-sensitive adhesive, particularly a pressure-sensitive adhesive degradable under basic conditions, which polymeric composition may comprise at least one of the following copolymers:

(MMA and/or AA)/BA/crosslinker-copolymers and/or copolymers comprising moieties (MMA and/or AA), BA and crosslinker, preferably with a (MMA and/or AA)/BA/crosslinker-weight ratio of (20-99)/(1-80)/(0.0001-20), particularly (2-70)/(30-98)/(0.001-10), especially (5-60)/(40-97)/(0.005-5), preferably (5-40)/(50-96)/(0.01-5), however, with the proviso that the sum of the weight shares results in 100.

According to a further particular embodiment, the method of the present invention results in producing a polymeric composition, preferably in the form of a water-based (waterborne) composition, more preferably dispersion (emulsion or latex), particularly to be used as or in an adhesive, especially a pressure-sensitive adhesive, particularly a pressure-sensitive adhesive degradable under basic conditions, which polymeric composition may comprise at least one of the following copolymers:

(MMA and/or AA)/BA/crosslinker-copolymers and/or copolymers comprising moieties (MMA and/or AA), BA and crosslinker, preferably with a (MMA and/or AA)/BA/crosslinker-molar ratio of (1-80)/(25-99)/(0.001-15), particularly (2-75)/(30-98)/(0.005-10), especially (5-65)/(35-97)/(0.01-8), preferably (5-50)/(40-96)/(0.05-5), however, with the proviso that the sum of the molar shares results in 100.

According to a particular embodiment of the inventive method, the first stage (step) (a) and/or the second stage (step) (b), preferably at least the second stage (step (b), may be followed by a post-polymerization step. Especially, post-polymerization may be performed so as to remove residual monomers. Particularly, post-polymerization may be performed at elevated temperatures. Especially, post-polymerization may be performed at a temperature in the range of from 30° C. to 200° C., especially in the range of from 30° C. to 150° C., preferably in the range of from 35° C. to 130° C., more preferably in the range of from 40° C. to 100° C. Especially, post-polymerization may be performed at ambient pressure (1 bar or 101.325 kPa), at reduced pressure or at elevated pressure, preferably at ambient pressure (1 bar or 101.325 kPa). Particularly, post-polymerization may be performed for a duration in the range of from 0.01 to 24 hours, especially in the range of from 0.1 to 12 hours, preferably in the range of from 0.5 to 6 hours, more preferably in the range of from 0.75 to 4 hours.

As delineated hereinabove, according to a preferred embodiment of the inventive method, the method of the present invention is performed in the absence of organic solvents and/or in the absence of volatile organic compounds (VOCs). This leads to a high environmental compatibility. Also, this corresponds to harsh health and safety regulations and measurements, especially with respect to safety at work standards and industrial safety. Furthermore, this corresponds also to the health regulations and measurements with respect to the use of the polymeric composition in food and beverage related areas.

As stated hereinabove, according to a preferred embodiment of the present invention, the first stage (step) (a) may be performed until a solids content of the resulting emulsion pre-polymerization product (i.e. seed) of from 0.1 to 60% by weight, especially 0.5 to 55% by weight, preferably 0.75 to 50% by weight, more preferably 1 to 40% by weight, is reached and/or obtained. Thereby, an efficient seed for the following stage (step) (b) is provided.

As also stated hereinabove, according to a further preferred embodiment of the present invention, the second stage (step) (b) may be performed until a solids content of the resulting polymeric composition of from 5 to 90% by weight, especially 10 to 85% by weight, preferably 15 to 80% by weight, more preferably 35 to 65% by weight, is reached and/or obtained. Thus, providing a polymeric composition with efficient performance for the final applications or uses.

With respect to moiety (iii) and/or (iii) the crosslinker, as delineated hereinabove, moiety (iii) and/or (iii) the crosslinker of the copolymer of the polymeric composition produced by the inventive method is based on or derived from moieties (units) derived from ε-caprolactone and/or lactide via ring-opening polymerization, especially via ring-opening polymerization, which crosslinker additionally comprises two ethylenically unsaturated bonds (carbon-carbon double bonds).

The moieties (units) derived from ε-caprolactone and/or lactide are obtained by ring-opening polymerization of ε-caprolactone and/or lactide, respectively, thereby producing the corresponding linear or chain-formed moieties incorporated into the crosslinker (iii), which is as such well known to those skilled in the art (see above explanations).

According to a particular embodiment of the present invention, it is preferred when the moieties (units) derived from ε-caprolactone and/or lactide, which are comprised by the crosslinker (iii), may be obtainable via ring-opening polymerization, especially via ring-opening polymerization.

Usually, the moiety (unit) derived from ε-caprolactone, which is comprised by the crosslinker (iii), may be represented by the following formula (3):

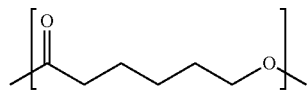
(3)

Typically, the moiety (unit) derived from lactide, which is comprised by the crosslinker (iii), may be represented by the following formula (4):

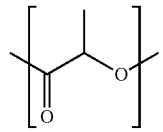
(4)

According to a particular embodiment of the present invention, it is preferred when moiety (iii) and/or (iii) the crosslinker is obtainable via ring-opening polymerization from ε-caprolactone and/or lactide in the presence of at least one organic alcohol, followed by a termination reaction in the presence of at least one ethylenically unsaturated compound comprising a methylene group.

With respect to moiety (iii) and/or (iii) the crosslinker, moiety (iii) and/or (iii) the crosslinker may be obtainable via ring-opening polymerization, especially via ring-opening polymerization, from ε-caprolactone and/or lactide in the presence of at least one organic alcohol, especially at least one monovalent or divalent organic alcohol, particularly selected from monovalent or divalent aliphatic, cyclic and arylic alcohols, followed by a termination reaction in the presence of at least one ethylenically unsaturated compound comprising a methylene group, especially at least one ethylenically unsaturated cycloaliphatic monomer comprising a methylene group.

According to yet a further particular embodiment of the present invention, it is preferred when the crosslinker (iii) is obtainable and/or producible (produced) via a ring-opening polymerization, especially a ring-opening polymerization, with subsequent termination reaction, wherein, in this context, it is preferred when the ring-opening polymerization with subsequent termination reaction produces the crosslinker (iii) obtainable by reacting and/or copolymerizing the moieties (I), (II) and (III) according to the following definition and each being different from one another:
- (I) at least one organic alcohol, especially at least one monovalent or divalent organic alcohol, especially selected from monovalent or divalent aliphatic, cyclic and arylic alcohols,
- (II) ε-caprolactone and/or lactide,
- (III) at least one ethylenically unsaturated compound comprising a methylene group, especially at least one ethylenically unsaturated cycloaliphatic monomer comprising a methylene group.

A crosslinker obtainable by reacting and/or copolymerizing these moieties (I), (II) and (III) leads to particularly good results and an excellent performance of the resulting polymeric composition, especially a polymeric composition particularly suitable to be used in an adhesive, especially a pressure-sensitive adhesive, particularly a pressure-sensitive adhesive degradable under basic conditions.

According to a preferred embodiment of the invention, the crosslinker (iii) is obtainable and/or producible (produced) via a ring-opening polymerization, especially a ring-opening polymerization, with subsequent termination reaction comprising the moieties (I), (II) and (III),
wherein:
- (A) in a first stage (step), ring-opening polymerization of moiety (II) initialized by moiety (I) is performed in the absence of moiety (III); and then
- (B) in a second stage (step), termination of the ring-opening polymerization of stage (step) (A) is initiated and/or performed by adding moiety (III).

According to yet another preferred embodiment of the present invention, the crosslinker (iii) is obtainable and/or producible (i.e. is produced) via a ring-opening polymerization, especially a ring-opening polymerization, with subsequent termination reaction,
wherein:
- (A) in a first stage (step), ring-opening polymerization of ε-caprolactone and/or lactide initialized by at least one organic alcohol, especially by at least one monovalent or divalent organic alcohol, especially selected from monovalent or divalent aliphatic, cyclic and arylic alcohols, is performed; and then
- (B) in a second stage (step), termination of the ring-opening polymerization of stage (step) (A) is initiated and/or performed by adding at least one ethylenically unsaturated compound comprising a methylene group, especially at least one ethylenically unsaturated cycloaliphatic monomer comprising a methylene group.

When using the aforedescribed method to obtain and/or produce the crosslinker (iii), which is again used to produce the inventive polymeric composition (i.e. is one moiety of the inventive polymeric composition), commercially available and usual starting materials may be used and the production may be easily controlled and performed also on an industrial or large-scale production level. This inventive method for the production of the inventive crosslinker, i.e. the production process of the inventive crosslinker, is both economic and cost-efficient and also environmentally compatible as well as easy to use and to apply. Therefore, also the production of (i.e. method for producing) the inventive crosslinker contributes to the overall economic, cost-efficient and easily controllable and performable method of the present invention.

With respect to moiety (I), as delineated hereinabove, moiety (I) of the inventive crosslinker of the copolymeric composition according to the present invention may be based on or derived from at least one organic alcohol, especially at least one monovalent or divalent organic alcohol, which is especially selected from monovalent or divalent aliphatic, cyclic and arylic alcohols.

In this context, it is preferred when moiety (I) and/or the at least one organic alcohol, especially the at least one monovalent or divalent organic alcohol, which is especially selected from monovalent or divalent aliphatic, cyclic and arylic alcohols, is selected from the group consisting of:
- (1) aliphatic alcohols containing an unsaturated group, especially 2-hydroxyethyl methacrylate, 2-hydroxy-1-methylethyl methacrylate, methacrylic acid, 8-hydroxy-3,6-dioxaoctane-1-yl ester, 2-hydroxyethyl acrylate, 2-hydroxypropyl methacrylate, ethyl 2-(hydroxymethyl)acrylate, 2-butenoic acid 2-hydroxyethyl ester, 3-buten-1-ol, 2-propen-1-ol, 2-methyl-2-propen-1-ol, 3-buten-2-ol, 3-methyl-3-buten-1-ol, 2-methyl-3-buten-1-ol, 2-methyl-3-buten-2-ol, 1-penten-3-ol, 1-hexen-3-ol, 1-hepten-3-ol 5-methyl-1-hepten-4-ol, 1-hepten-4-ol, 4-methyl-1-hepten-4-ol, 5-methyl-1-hepten-4-ol and 1,4-butanediol vinyl ether;
(2) arylic alcohols containing an unsaturated group, especially 4-vinylbenzyl alcohol and beta-methylenephenethyl alcohol;
(3) aliphatic diols, especially ethylene glycol, 1,3-propanediol, 1,2-propanediol, 2-methyl-1,3-propanediol, 2-methyl-2-propyl-1,3-propanediol, 2,2-dimethyl-1,3-propanediol, 2,2-diisobutyl-1,3-propanediol, 1,4-butanediol, 2,3-butanediol, 1,5-pentanediol, 1,2-pentanediol, 1,4-pentanediol, 2,4-pentanediol, 3-methyl-1,5-pentanediol, 2,4-diethyl-1,5-pentanediol, 1,6-hexanediol, 1,5-hexanediol, 2,5-hexanediol, 1,2-hexanediol, 2-ethyl-1,3-hexanediol, 1,7-heptanediol, 1,8-octanediol, 1,9-nonanediol, 1,10-decenediol, 1,12-dodecanediol, 1,14-tetradecanediol, 1,16-hexadecanediol;
(4) cyclic aliphatic diols, especially 1,3-cyclopentanediol, 1,2-cyclopentanediol, 1,4-cyclohexanediol, 1,4-cyclohexanedimethanol and 1,2-cyclohexanediol (cis and trans);
(5) arylic diols, especially 1,3-benzenedimethanol, 1,4-benzenedimethanol, 1,2-benzenedimethanol, 1-phenyl-1,2-ethanediol, 4,4'-bis(hydroxymethyl)-biphenyl and 1,4-bis(2-hydroxyethyl)benzene;
(6) aliphatic triols, especially glycerol, 1,2,4-butanetriol, 2-hydroxymethyl-1,3-propanediol, 1,1,1-tris(hydroxymethyl)ethane, 1,2,6-trihydroxyhexane, 1,2,3-hexanetriol, 1,2,3-heptanetriol, 1,2,9-nonanetriol and 1,2,10-decanetriol;
(7) arylic triols, especially 1,3,5-benzenetrimethanol;
(8) cyclic aliphatic triols, especially 1,3,5-cyclohexanetriol;
(9) aliphatic tetrols, especially 1,2,3,4-butanetetrol and pentaerythritol;

According to yet a further particular embodiment of the inventive method, it is preferred when moiety (I) and/or the at least one organic alcohol, especially the at least one monovalent or divalent organic alcohol, especially selected from monovalent or divalent aliphatic, cyclic and arylic alcohols, is 2-hydroxyethyl methacrylate and/or 1,4-butanediol.

With respect to moiety (III), as delineated hereinabove, moiety (III) of the inventive crosslinker of the copolymeric composition according to the present invention may be based on or derived from at least one ethylenically unsaturated compound comprising a methylene group, especially at least one ethylenically unsaturated cycloaliphatic monomer comprising a methylene group.

In this context, it is preferred when moiety (III) and/or the at least one ethylenically unsaturated compound comprising a methylene group, especially at least one ethylenically unsaturated cycloaliphatic monomer comprising a methylene group, is selected from the group consisting of: itaconic anhydride, α-methylene-γ-butyrolactone, 4-(prop-1-en-2-yl) oxane-2,6-dione and 4-vinyl-dihydrofuran-2(3H)-one.

According to a particular embodiment of the present invention, it is preferred when moiety (III) and/or the at least one ethylenically unsaturated compound comprising a methylene group, especially at least one ethylenically unsaturated cycloaliphatic monomer comprising a methylene group, is itaconic anhydride.

According to a further particular embodiment of the present invention, it is preferred when the crosslinker (iii) is obtainable and/or producible (i.e. is produced) via a ring-opening polymerization, especially a ring-opening polymerization, with subsequent termination reaction,
wherein:
(A) in a first stage (step), ring-opening polymerization of ε-caprolactone and/or lactide initialized by 2-hydroxyethyl methacrylate and/or 1,4-butanediol is performed; and then
(B) in a second stage (step), termination of the ring-opening polymerization of stage (A) is initiated and/or performed by adding itaconic anhydride.

With respect to the first stage (step) (A) of the inventive method, especially referring to the production of the inventive crosslinker (iii), in the following typical and representative but non-limiting embodiments will be described:

Typically, the first stage (step) (A) may be performed in the presence of at least one polymerization catalyst. Such catalyst ensures an efficient initiation or start of the polymerization reaction (i.e. the ring-opening polymerization reaction) and thus an efficient reaction course. This again ensures an efficient polymerization procedure (i.e. ring-opening polymerization procedure).

Preferably, such polymerization catalyst may be selected from organometallic catalysts, organic catalysts and enzymatic catalysts. In this context the polymerization catalyst may furthermore be selected from (1) organometallic catalysts from the group consisting of metal octanoates such as tin octanoate ($SnOct_2$) and zinc octanoate ($ZnOct_2$), aluminum acetylacetonate (Alacac), 2-dibutyl-2-stanna-1,3-dioxepan (DSDOP), aluminum isopropoxide, lithium chloride, butyllithium, lithium tert-butoxide, potassium tert-butoxide, calcium dimethoxide; (2) organic catalysts from the group consisting of 1,8-diazobicyclo[5.4.0]undec-7-ene (DBU), 1,5,7-triazabicyclo[4.4.0]dec-5-ene (TBD), 4-dimethylaminopyridine (DMAP), thiourea type catalysts, and (3) enzymatic catalysts from the group consisting of lipases, preferably Candida antarctica lipase B (CALB).

The preferred enzymatic catalyst, i.e. Candida antarctica lipase B (CALB) is a member of the lipase family and originates from the yeast Candida antarctica. A lipase is essentially any enzyme that catalyzes the hydrolysis of lipids (i.e. fats). Lipases are a subclass of the esterases. CALB is an ideal and robust lipase catalyzing a diversity of reactions including many different regio- and enantio-selective syntheses, including also ring-opening polymerizations, such as described hereinabove and hereinbelow.

Usually, the first stage (step) (A) used for producing the crosslinker (iii) may be performed in the absence of solvent and/or without any solvent. Therefore, also no volatile organic compounds (VOCs) are used (as also not in the emulsion polymerization according to the present invention, as delineated hereinabove), thus leading to a high environmental compatibility. Also, this corresponds to harsh health and safety regulations and measurements, especially with respect to safety at work standards and industrial safety. Furthermore, this corresponds also to the health regulations and measurements with respect to the use of the polymeric composition comprising the crosslinker (iii) in food and beverage related areas.

Furthermore, the first stage (step) (A) used for producing the crosslinker (iii) may be performed under various temperature conditions. Usually, the first stage (step) (A) may be performed at elevated temperatures. Especially, the first stage (step) (A) may be performed at a temperature in the range of from 50° C. to 200° C., especially in the range of from 60° C. to 180° C., preferably in the range of from 70° C. to 170° C., more preferably in the range of from 90° C. to 150° C.

Moreover, the first stage (step) (A) used for producing the crosslinker (iii) may be performed under various pressure conditions. Typically, the first stage (step) (A) may be performed at ambient pressure (1 bar or 101.325 kPa), at reduced pressure or at elevated pressure, preferably at ambient pressure (1 bar or 101.325 kPa).

Further, the first stage (step) (A) used for producing the crosslinker (iii) may be performed for various durations. Typically, the first stage (step) (A) may be performed for a duration in the range of from 0.01 to 24 hours, especially in the range of from 0.1 to 18 hours, preferably in the range of from 0.5 to 12 hours, more preferably in the range of from 0.75 to 10 hours.

According to a typical embodiment, the first stage (step) (A) used for producing the crosslinker (iii) may be performed in an at least essentially inert atmosphere, especially selected from nitrogen and noble gases, especially nitrogen.

With respect to the second stage (step) (B) of the method used for producing the crosslinker (iii), i.e. referring to the production of the inventive crosslinker (iii), in the following typical and representative but non-limiting embodiments will be described:

Typically, also the second stage (step) (B) used for producing the crosslinker (iii) may be performed in the presence of at least one polymerization catalyst. This ensures an efficient polymerization procedure (i.e. ring-opening polymerization procedure) within the second stage (step) (B).

Preferably, such polymerization catalyst used in stage (B) for producing the crosslinker (iii) may be selected from organometallic catalysts, organic catalysts and enzymatic catalysts. In this context the polymerization catalyst may furthermore be selected from (1) organometallic catalysts from the group consisting of metal octanoates such as tin octanoate ($SnOct_2$) and zinc octanoate ($ZnOct_2$), aluminum acetylacetonate (Alacac), 2-dibutyl-2-stanna-1,3-dioxepan (DSDOP), aluminum isopropoxide, lithium chloride, butyl-lithium, lithium tert-butoxide, potassium tert-butoxide, calcium dimethoxide; (2) organic catalysts from the group consisting of 1,8-diazobicyclo[5.4.0]undec-7-ene (DBU), 1,5,7-triazabicyclo[4.4.0]dec-5-ene (TBD), 4-dimethylaminopyridine (DMAP), thiourea type catalysts, and (3) enzymatic catalysts from the group consisting of lipases, preferably *Candida antarctica* lipase B (CALB).

Basically, the same polymerization catalysts as used in stage (step) (A) may be used in stage (step) (B). Consequently, for further details as to the polymerization catalysts, reference can be made to above explanations for stage (step) (A).

Basically, also the second stage (step) (B) used for producing the crosslinker (iii) may be performed in the absence of solvent and/or without any solvent. Consequently, with respect to the specific advantages linked hereto, reference can be made to the above explanations for stage (step) (A).

Especially, also the second stage (step) (B) used for producing the crosslinker (iii) may be performed under various temperature conditions. Usually, the second stage (step) (B) may be performed at elevated temperatures. Especially, the second stage (step) (B) may be performed at a temperature in the range of from 40° C. to 180° C., especially in the range of from 50° C. to 160° C., preferably in the range of from 60° C. to 150° C., more preferably in the range of from 70° C. to 130° C.

Typically, also the second stage (step) (B) used for producing the crosslinker (iii) may be performed under various pressure conditions. Especially, the second stage (step) (B) may be performed at ambient pressure (1 bar or 101.325 kPa), at reduced pressure or at elevated pressure, preferably at ambient pressure (1 bar or 101.325 kPa).

Also, the second stage (step) (B) used for producing the crosslinker (iii) may be performed for various durations. Usually, the second stage (step) (B) may be performed for a duration in the range of from 0.01 to 24 hours, especially in the range of from 0.1 to 12 hours, preferably in the range of from 0.5 to 8 hours, more preferably in the range of from 0.75 to 6 hours.

Moreover, also the second stage (step) (B) used for producing the crosslinker (iii) may be performed in an at least essentially inert atmosphere, especially selected from nitrogen and noble gases, especially nitrogen.

According to a particular embodiment, the method of the present invention results in producing a crosslinker (iii), especially at least one crosslinking (macro)monomer or oligomer, which crosslinker (iii) comprises moieties (i.e. units) derived from ε-caprolactone (i.e. 1-oxa-2-oxocylcoheptane) and/or lactide (i.e. 3,6-dimethyl-1,4-dioxan-2,5-dion) and which crosslinker (iii) additionally comprises two ethylenically unsaturated bonds (i.e. carbon-carbon double bonds). Especially, the crosslinker (iii) may comprise from 1 to 100 moieties (units) derived from lactide and/or ε-caprolactone, especially from 2 to 75 moieties (units) derived from lactide and/or ε-caprolactone, preferably from 2 to 50 moieties (units) derived from lactide and/or ε-caprolactone.

In the schemes shown hereinbelow, "m" represents the number of total moieties derived from ε-caprolactone incorporated in the crosslinker (iii) and "n" represents the number of total moieties derived from lactide incorporated in the crosslinker (iii). In other words, in the following schemes, "m" represents the number of total repeating units derived from ε-caprolactone incorporated into the crosslinker (iii) whereas "n" represents the number of total repeating units derived from lactide incorporated into the crosslinker (iii).

The moieties (i.e. units) derived from ε-caprolactone (i.e. 1-oxa-2-oxocylcoheptane) and/or lactide (i.e. 3,6-dimethyl-1,4-dioxan-2,5-dion) can be arranged randomly within or over the crosslinker (iii), i.e. the crosslinker (iii) does not necessarily have to be a block copolymer but, if desired, also a block copolymer can be produced and/or obtained according to the aforedescribed method used for producing the crosslinker (iii). The illustration of a block copolymer of both the inventive polymeric composition and the inventive crosslinker hereinabove and hereinbelow is only chosen for a better general visualization and has to be considered as a simplification of the very complex inventive polymeric composition and inventive crosslinker.

According to a further particular embodiment, the method of the present invention results in producing a crosslinker (iii), especially at least one crosslinking (macro)monomer or oligomer, which crosslinker (iii) comprises moieties (i.e. units) derived from lactide (i.e. 3,6-dimethyl-1,4-dioxan-2,5-dion) and which crosslinker (iii) additionally comprises two ethylenically unsaturated bonds (i.e. carbon-carbon double bonds). Especially, the crosslinker (iii) may comprise from 2 to 50 moieties (units) derived from lactide, especially from 4 to 20 moieties (units) derived from lactide.

According to yet another particular embodiment, the aforedescribed method used for producing the crosslinker (iii) results in producing a crosslinker (iii), especially at least one crosslinking (macro)monomer or oligomer, which crosslinker (iii) comprises moieties (i.e. units) derived from ε-caprolactone (i.e. 1-oxa-2-oxocylcoheptane) and which crosslinker (iii) additionally comprises two ethylenically unsaturated bonds (i.e. carbon-carbon double bonds). Especially, the crosslinker (iii) may comprise from 1 to 30 moieties (units) derived from ε-caprolactone, especially from 3 to 12 moieties (units) derived from ε-caprolactone.

According to yet a further particular embodiment, the aforedescribed method used for producing the crosslinker (iii) results in producing a crosslinker (iii), especially at least one crosslinking (macro)monomer or oligomer, which crosslinker (iii) comprises moieties (units) derived from ε-caprolactone (1-oxa-2-oxocylcoheptane) and lactide (3,6-dimethyl-1,4-dioxan-2,5-dion) and which crosslinker (iii) additionally comprises two ethylenically unsaturated bonds (carbon-carbon double bonds). Especially, the crosslinker (iii) may comprise from 2 to 25 moieties (units) derived from lactide and from 1 to 30 moieties (units) derived from ε-caprolactone, especially from 2 to 12 moieties (units) derived from lactide and from 2 to 8 moieties (units) derived from ε-caprolactone.

According to yet another further particular embodiment, the aforedescribed method used for producing the crosslinker (iii) results in producing a crosslinker (iii), especially at least one crosslinking (macro)monomer or oligomer, which crosslinker (iii) may have a number-average molecular mass ($M_n$) in the range of from 250 to 5,000 g/mol, especially in the range of from 275 to 4,750 g/mol, preferably in the range of from 300 to 4,500 g/mol, more preferably in the range of from 325 to 4,250 g/mol, particularly in the range of from 350 to 4,000 g/mol. Especially, the number-average molecular mass ($M_n$) may be determined by size exclusion chromatography (SEC), particularly gel permeation chromatography (GPC), with refractive index detection (RI), preferably in accordance with DIN EN ISO 16014-5:2019, particularly with polystyrene (PS) as standard, or alternatively as determined by $^1$H-NMR.

The number-average molecular mass ($M_n$) refers to the ordinary arithmetic mean or average of the molecular masses of the individual molecules. It is determined by measuring the molecular mass of n polymer molecules, summing the masses, and dividing by n. Thus, the number-average molecular mass ($M_n$) is determined by the following formula, wherein $N_i$ refers to the number of molecules and $M_i$ to the measured weight of one molecule, each with the repeating unit i:

$$M_n = \frac{\sum_i N_i M_i}{\sum_i N_i}$$

In this context, the molecular masses of the individual molecules may be determined by size exclusion chromatography (SEC), particularly by gel permeation chromatography (GPC). Size exclusion chromatography (SEC), also known as molecular sieve chromatography, is a chromatographic method in which the molecules in solution are separated by size, and in some cases molecular weight. Either an aqueous solution can be used to transport the sample (i.e. the molecules of the sample) through the column or an organic solvent is used as a mobile phase. The chromatography column (i.e. column) is packed with fine, porous pellets (beads), wherein the size of the pellets (beads) are used to estimate the dimensions of macromolecules. Gel permeation chromatography (GPC) is a type of size exclusion chromatography (SEC) which separates the molecules based on its size and is especially advantageous when analyzing polymers.

The refractive index detector is a universal detector preferably used for chromatographic application, such as GPC or HPLC (High-performance liquid chromatography), for determining the change in refractive index, particularly, the change in refractive index with respect to the pure solvent.

GPC measures the molecular volume and shape function as defined by the intrinsic viscosity. The molecular mass can be determined within a ±5% accuracy by using comparable or relevant standards (here: polystyrene).

The number-average molecular mass indicated hereinabove and hereinbelow refers to molecular weight determined according to standard DIN EN ISO 16014-5:2019, especially via SEC methods, particularly GPC.

In this context, according to yet another further particular embodiment, the aforedescribed method used for producing the crosslinker (iii) may result in producing a crosslinker (iii), especially at least one crosslinking (macro)monomer or oligomer, which crosslinker (iii) comprises moieties (units) derived from lactide and ε-caprolactone and may have a number-average molecular mass ($M_n$) in the range of from 450 to 4,000 g/mol, especially in the range of from 575 to 2,250 g/mol. Especially, the number-average molecular mass ($M_n$) may be determined by size exclusion chromatography (SEC), particularly gel permeation chromatography (GPC), with refractive index detection (RI), preferably in accordance with DIN EN ISO 16014-5:2019, particularly with polystyrene (PS) as standard, or alternatively as determined by $^1$H-NMR.

Moreover, according to yet a further particular embodiment, the aforedescribed method used for producing the crosslinker (iii) may result in producing a crosslinker (iii), especially at least one crosslinking (macro)monomer or oligomer, which crosslinker (iii) only comprises moieties (units) derived from lactide and may have a number-average molecular mass ($M_n$) in the range of from 350 to 4,000 g/mol, especially in the range of from 500 to 2,000 g/mol. Especially, the number-average molecular mass ($M_n$) may be determined by size exclusion chromatography (SEC), particularly gel permeation chromatography (GPC), with refractive index detection (RI), preferably in accordance with DIN EN ISO 16014-5:2019, particularly with polystyrene (PS) as standard, or alternatively as determined by $^1$H-NMR.

According to yet another further particular embodiment, the aforedescribed method used for producing the crosslinker (iii) may result in producing a crosslinker (iii), especially at least one crosslinking (macro)monomer or oligomer, which crosslinker (iii) only comprises moieties (units) derived from ε-caprolactone and may have a number-average molecular mass ($M_n$) in the range of from 300 to 4,000 g/mol, especially in the range of from 550 to 4,000 g/mol. Especially, the number-average molecular mass ($M_n$) may be determined by size exclusion chromatography (SEC), particularly gel permeation chromatography (GPC), with refractive index detection (RI), preferably in accordance with DIN EN ISO 16014-5:2019, particularly with polystyrene (PS) as standard, or alternatively as determined by $^1$H-NMR.

In the following several exemplary schemes illustrating the inventive method for producing the crosslinker (iii) are shown, wherein "n" represents the number of total moieties (i.e. repeating units) derived from lactide and "m" represents the number of total moieties (i.e. repeating units) derived from ε-caprolactone and wherein either 2-hydroxyethyl methacrylate or 1,4-butanediol are used as initiating species and itaconic anhydride is used as terminating agent (wherein "n" and "m", i.e. the number of the respective repeating units, have been defined hereinabove).

Especially, in all subsequent schemes and formulae, if the crosslinker (iii) comprises moieties (units) derived from ε-caprolactone and/or lactide, the sum of the values for "n" and "m" may vary within the range of from 1 to 100, especially in the range of from 2 to 75, preferably in the range of from 2 to 50.

Particularly, in all subsequent schemes and formulae, if the crosslinker (iii) comprises moieties (units) derived from lactide only, "n" may vary within the range of from 2 to 50, especially in the range of from 4 to 20.

Furthermore, in all subsequent schemes and formulae, if crosslinker (iii) comprises moieties (units) derived from ε-caprolactone only, "m" may vary within the range of from 1 to 30, especially in the range of from 3 to 12.

Moreover, in all subsequent schemes and formulae, if crosslinker (iii) comprises moieties (units) derived from ε-caprolactone and lactide, "n" may vary within the range of from 2 to 25, especially in the range of from 2 to 12, and "m" may vary in the range of from 1 to 30, especially in the range of from 2 to 8.

Scheme (1) represents the synthesis of an asymmetric crosslinker (using 2-hydroxyethyl methacrylate as initiating species) with ε-caprolactone and lactide as monomers:

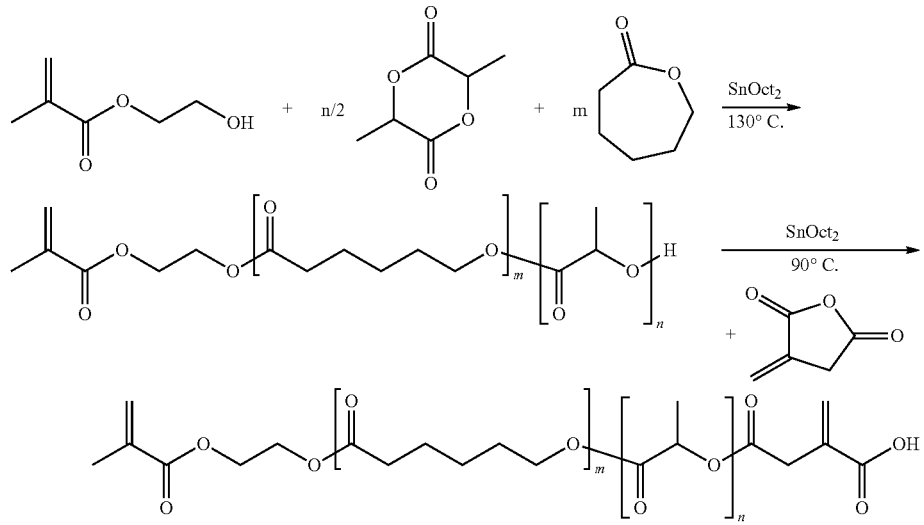

Scheme (2) represents the synthesis of a symmetric crosslinker (using 1,4-butanediol as initiating species) with ε-caprolactone and lactide as monomers:

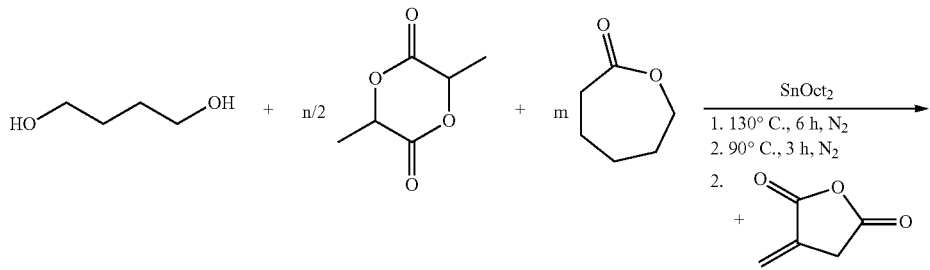

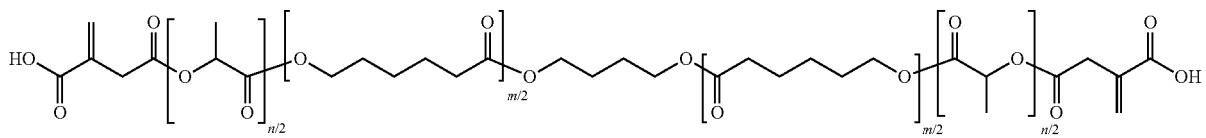

Scheme (3) represents the synthesis of an asymmetric crosslinker (using 2-hydroxyethyl methacrylate as initiating species) with only ε-caprolactone as monomer:

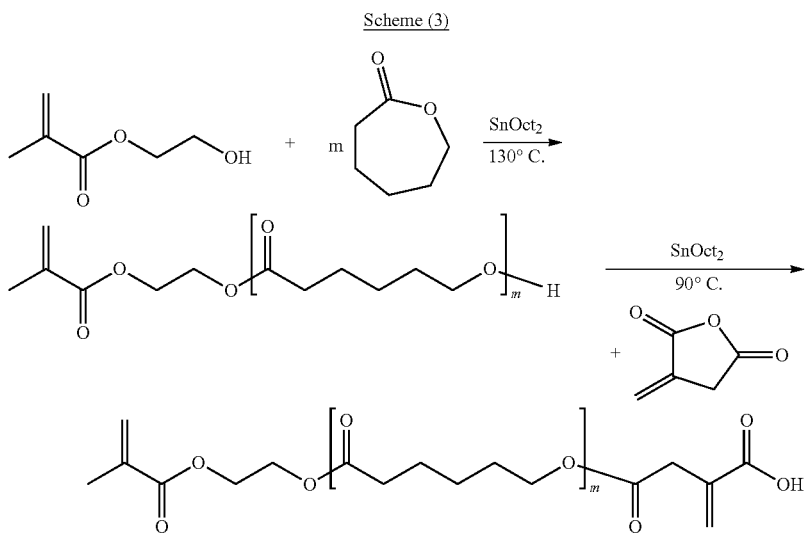

Scheme (4) represents the synthesis of a symmetric crosslinker (using 1,4-butanediol as initiating species) with only ε-caprolactone as monomer:

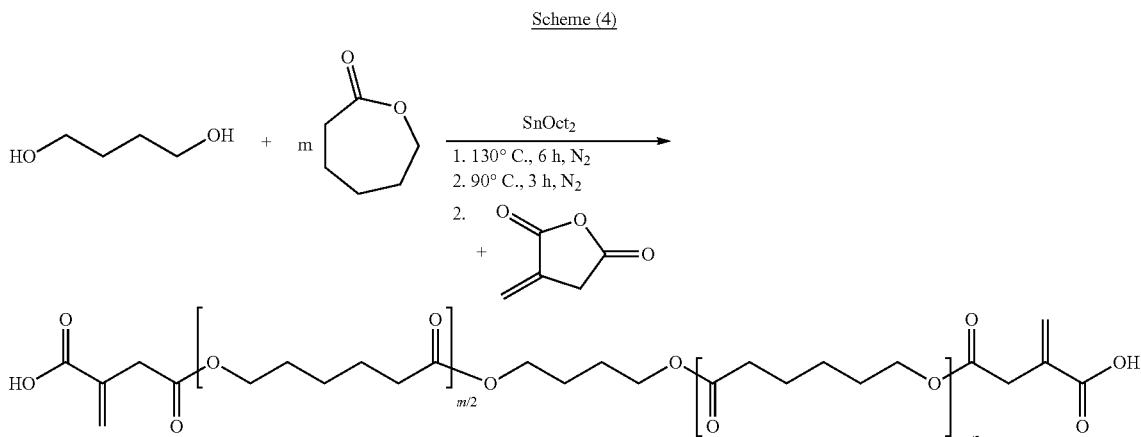

Scheme (5) represents the synthesis of an asymmetric crosslinker (using 2-hydroxyethyl methacrylate as initiating species) with only lactide as monomer:

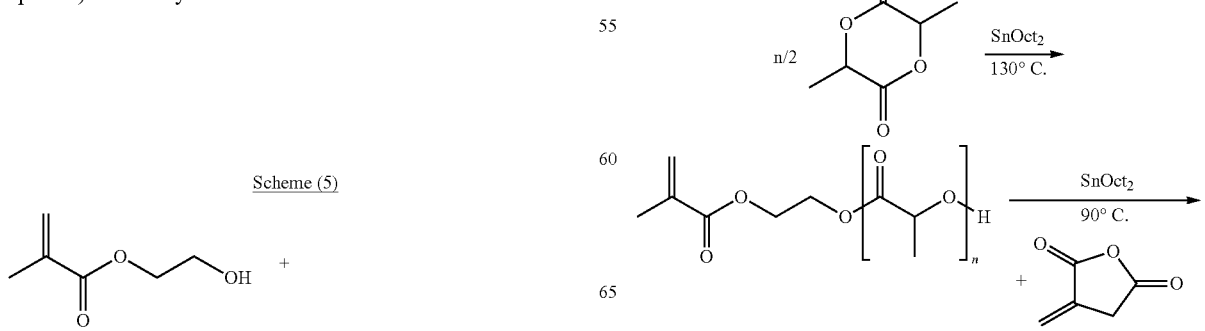

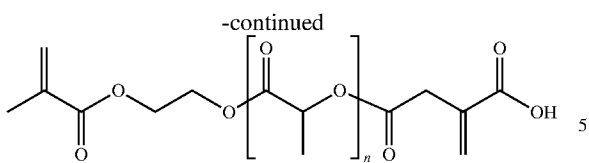

Scheme (6) represents the synthesis of a symmetric cross-linker (using 1,4-butanediol as initiating species) with only lactide as monomer:

Scheme (6)

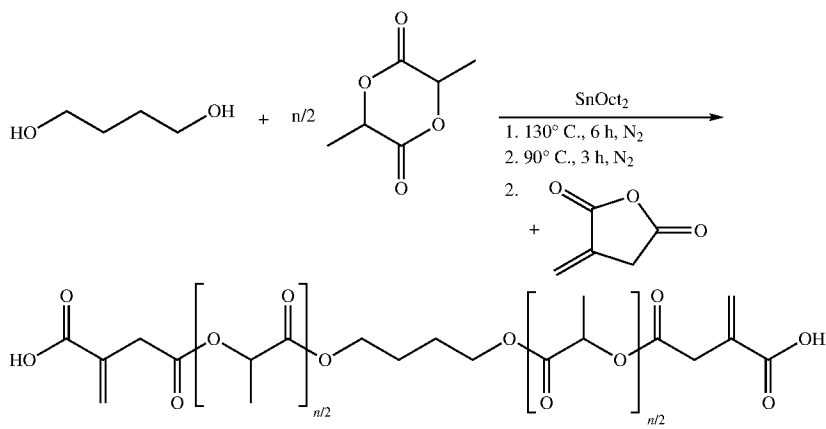

According to yet a further particular embodiment, the polymeric composition produced according to the method defined hereinabove may have a solids content in the range of from 5 to 90% by weight, especially in the range of from 10 to 85% by weight, preferably in the range of from 15 to 80% by weight, more preferably in the range of from 35 to 65% by weight, preferably in accordance with ISO 124:2014.

The term of the so-called solid content indicated hereinabove and hereinbelow is well known to those skilled in the art and used herein according to common language and understanding. The solids content indicated hereinabove and hereinbelow particularly refers to the non-volatile material (i.e. non-volatile content) contained in the emulsion, i.e. this is the material (i.e. content) which is left after the volatiles (e.g. solvent) have been removed (e.g. evaporized). In the context of the present invention, the volatile (i.e. solvent) is preferably water, i.e. the solids content essentially refers to that part of the emulsion which is not water, i.e. which is left after the water has been removed. The solids content may especially be determined according to the standard ISO 124:2014.

Furthermore, according to a particular embodiment, the copolymer produced according to the method defined hereinabove and comprised by the inventive polymeric composition may have a weight-average molecular mass ($M_w$) in the range of from $10^3$ to $10^{10}$ g/mol, especially in the range of from $10^4$ to $10^9$ g/mol, especially as determined by multi-angle light scattering (MALS), particularly flow field-flow fractionation with multi-angle light scattering and refractive index detection (AF4/MALS/RI).

The weight-average molecular mass ($M_w$) or mass-average molecular mass refers to the molecular mass averaged by the relative mass proportion. The weight-average molecular mass ($M_w$) is determined by the following formula, wherein $N_i$ refers to the number of molecules and $M_i$ to the measured weight of one molecule, each with the repeating unit i:

$$M_w = \frac{\sum_i N_i M_i^2}{\sum_i N_i M_i}$$

Dynamic light scattering (DLS) is a technique used to determine the size distribution profile of small particles in suspensions or polymers in solutions. A monochromatic light source, usually a laser, is shot through a polarizer and into a sample (i.e. the suspension or solution containing the particles to be analyzed). The scattered light then goes through a second polarizer and is then collected by a photomultiplier. Multi-angle light scattering (MALS) describes a technique for measuring light scattered by a sample into a plurality of angles. It is used to determine inter alia absolute molecular mass in solutions by detecting how the particles scatter light.

The term "AF4" refers to asymmetric flow field flow fractionation and is a fractionation (i.e. separation) method used for the characterization of nanoparticles, polymers and proteins, wherein a very thin flow against which a perpendicular field is applied is used for fractionation (separation).

Regarding MALS and RI, reference can be made to the explanations made hereinabove.

When coupling AF4 fractionation to detection by multi-angle-light scattering and refractive index (MALS/RI), it is possible to determine weight-average molecular mass ($M_w$) without the need for calibration standards.

Furthermore, according to a particular embodiment, the copolymer produced according to the method defined hereinabove and comprised by the inventive polymeric composition may have a polydispersity index (PDI) in the range of from 1.5 to 9, especially in the range of from 1.7 to 8, preferably in the range of from 1.8 to 6, more preferably in the range of from 2 to 5, based on the fraction of the copolymer being soluble in tetrahydrofuran (THF), preferably in accordance with DIN EN ISO 16014-5:2019.

The polydispersity index (PDI) is a measure of distribution of molecular mass in a given polymer sample and is determined from the ratio of the weight-average molecular mass to the number-average molecular mass and has a value equal to or greater than 1. Thus calculated according to the following formula:

$$PDI = \frac{M_w}{M_n}$$

Moreover, according to another particular embodiment, the copolymer produced according to the method defined hereinabove and comprised by the inventive polymeric composition may have a glass transition temperature Tg in the range of from −5 to −100° C., especially in the range of from −10 to −40° C., especially as determined by differential scanning calorimetry, preferably in accordance with DIN EN ISO 11357-2:2014.

According to yet another particular embodiment, the particles of the polymeric composition of the present invention may have a z-average particle size in the range of from 10 to 1,000 nm, especially in the range of from 50 to 750 nm, preferably in the range of from 75 to 500 nm, more preferably in the range of from 100 to 400 nm, particularly in the range of from 100 to 350 nm, especially as determined by dynamic light scattering (DLS), preferably in accordance with DIN ISO 22412:2018.

The z-average size used in dynamic light scattering is a parameter also known as the cumulants mean. It is the primary and most stable parameter produced by this technique. The z-average is a hydrodynamic parameter and is therefore only applicable to particles in a dispersion or molecules in solution. The z-average particle size $D_z$ is then calculated from the raw DLS data with the following formula, wherein $D_{t,avg}$ is the translational diffusion coefficient (by DSL), $k_B$ is the Boltzmann's constant, T is the thermodynamic temperature and η is the dynamic viscosity:

$$D_z = \frac{k_B T}{3\pi\eta D_{t,avg}}$$

According to a particular embodiment, the copolymer produced according to the method defined hereinabove and comprised by the inventive polymeric composition may have a weight-average molecular mass ($M_w$) in the range of from $10^3$ to $10^6$ g/mol, especially in the range of from $10^4$ to $10^6$ g/mol, especially as determined by multi-angle light scattering (MALS), particularly flow field-flow fractionation with multi-angle light scattering and refractive index detection (AF4/MALS/RI).

According to another particular embodiment, the copolymer produced according to the method defined hereinabove and comprised by the inventive polymeric composition may have a weight-average molecular mass ($M_w$) in the range of from $10^6$ to $10^9$ g/mol, especially in the range of from $10^7$ to $10^9$ g/mol, especially as determined by multi-angle light scattering (MALS), particularly flow field-flow fractionation with multi-angle light scattering and refractive index detection (AF4/MALS/RI).

Regarding the weight-average molecular mass, AF4/MALS/RI, reference can be made to the explanations made hereinabove.

According to a particular embodiment of the inventive method, the copolymer produced according to the method defined hereinabove and comprised by the polymeric composition may have a multimodal molecular mass distribution, especially a bimodal molecular mass distribution, preferably weight-based molecular mass distribution.

The molecular mass distribution describes the relationship between the number of moles of each polymer species and the molecular mass of that species. In polymers, the individual polymer chains rarely have exactly the same degree of polymerization and molecular mass, thus, there is always a distribution around an average value. In practice, due to the limited size of the individual monomers and side reactions, there are always large variations from this average value. For example, multimodal, especially bimodal, distribution can be obtained, wherein several, especially two, separated maxima exist. Molecular mass distribution indications referred to hereinabove and hereinbelow particularly relate to weight-based or mass-based molecular mass distributions.

Especially, the multimodal molecular mass distribution, especially the bimodal molecular mass distribution, of the copolymer produced according to the method described hereinabove and comprised by the polymeric composition may be controlled and/or tailored, during its production, via the reaction process, conditions and/or composition, especially by the crosslinker (iii) and/or the chain-transfer agent (CTA), preferably via the chemical nature, physicochemical properties and/or amounts of the crosslinker (iii) and/or the chain-transfer agent (CTA).

Figure 5A:
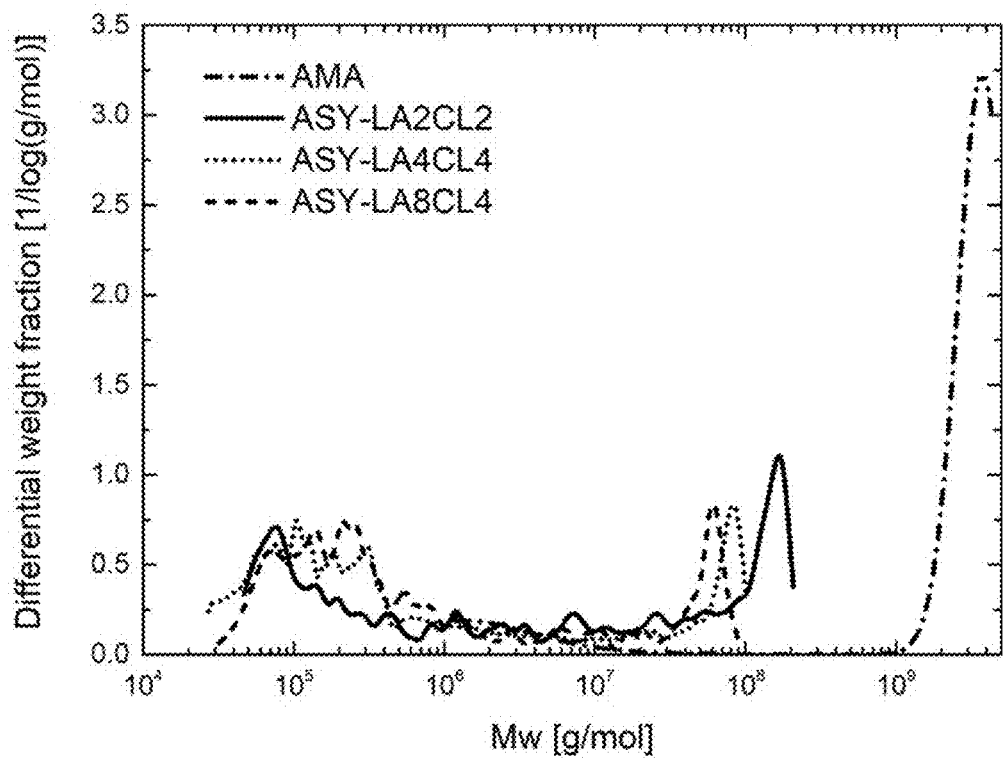
FIGS. 5A and 5B show each the molecular mass distribution measured by AF4/MALS/RI for various latices according to another particular embodiment of the invention.
Figure 5B:
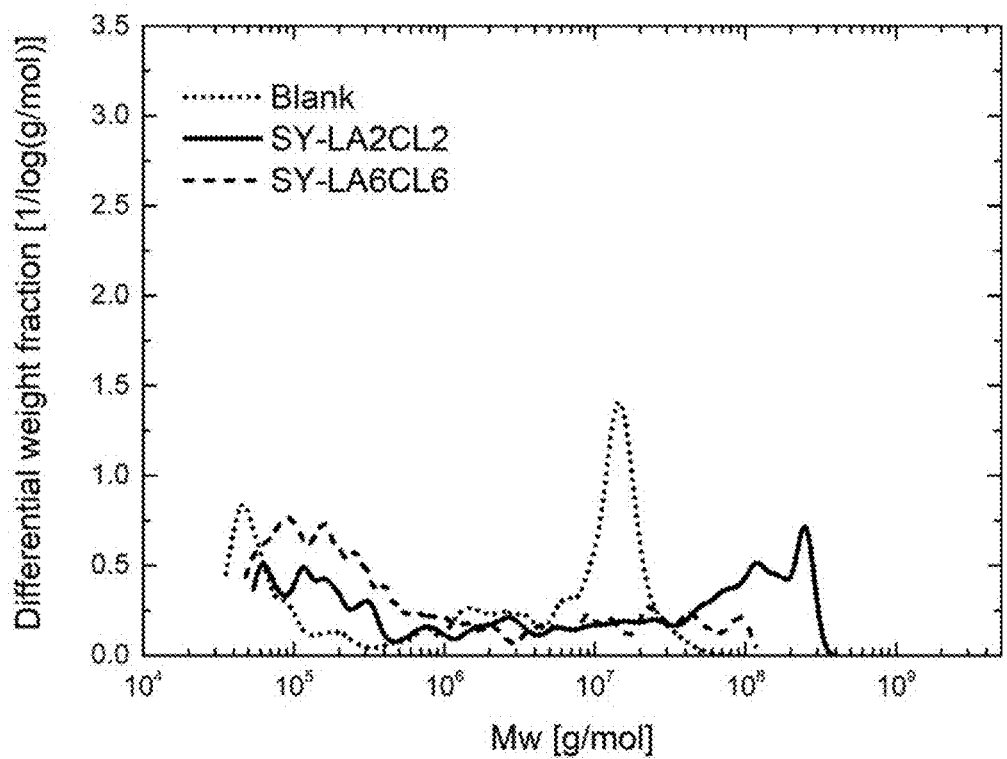

Typically, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially as shown in FIGS. 5A and 5B), may comprise at least two distribution maxima (peaks), wherein the at least two distribution maxima (peaks) may differ by at least $10^1$ g/mol, especially by at least $10^2$ g/mol, preferably by at least $10^3$ g/mol.

Usually, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially as shown in FIGS. 5A and 5B), may comprise at least two distribution maxima (peaks), wherein the at least two distribution maxima (peaks) may differ by at most $10^7$ g/mol, especially by at most $10^6$ g/mol, preferably by at most $10^5$ g/mol.

Preferably, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially as shown in FIGS. 5A and 5B), may comprise at least two distribution maxima (peaks), wherein the at least two distribution maxima (peaks) may differ by a range of from $10^1$ g/mol to $10^7$ g/mol, especially by a range of from $10^2$ g/mol to $10^6$ g/mol, preferably by a range of from $10^3$ g/mol to $10^5$ g/mol.

Especially, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially as shown in FIGS. 5A and 5B), may comprise at least two distribution maxima (peaks), wherein a first distribution maximum may be in the range of from $10^3$ g/mol to $5 \cdot 10^5$ g/mol and a second distribution maximum may be in the range of from $5 \cdot 10^6$ g/mol to $10^9$ g/mol, especially a first distribution maximum may be in the range of from $5 \cdot 10^3$ g/mol to $10^5$ g/mol and a second distribution maximum may be in the range of from $10^7$ to $10^9$ g/mol.

Also, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially as shown in FIGS. 5A and 5B), may comprise at least two molecular mass distribution modes (fractions), especially at least two weight-based molecular mass distribution modes, wherein the at least two distribution modes may differ by at least $10^1$ g/mol, especially by at least $10^2$ g/mol, preferably by at least $10^3$ g/mol.

Usually, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially as shown in FIGS. 5A and 5B), may comprise at least two molecular mass distribution modes (fractions), especially at least two weight-based molecular mass distribution modes, wherein the at least two distribution modes may differ by at most $10^7$ g/mol, especially by at most $10^6$ g/mol, preferably by at most $10^5$ g/mol.

Typically, according to this specific embodiment where the copolymer produced according to the method defined hereinabove and comprised by the polymeric composition may have a multimodal molecular mass distribution, especially a bimodal molecular mass distribution, the weight-based molecular mass distribution (especially as shown in FIGS. 5A and 5B), may comprise at least two molecular mass distribution modes (fractions), especially at least two weight-based molecular mass distribution modes, wherein the at least two distribution modes may differ by a range of from $10^1$ g/mol to $10^7$ g/mol, especially by a range of from $10^2$ g/mol to $10^6$ g/mol, preferably by a range of from $10^3$ g/mol to $10^5$ g/mol.

Especially, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially as shown in FIGS. 5A and 5B), may comprise at least two molecular mass distribution modes (fractions), especially at least two weight-based molecular mass distribution modes, wherein a first distribution mode may be in the range of from $10^3$ g/mol to $5 \cdot 10^5$ g/mol and a second distribution mode may be in the range of from $5 \cdot 10^6$ g/mol to $10^9$ g/mol, especially a first distribution mode may be in the range of from $5 \cdot 10^3$ g/mol to $10^5$ g/mol and a second distribution mode may be in the range of $10^7$ to $10^9$ g/mol.

Furthermore, according to a particular embodiment, films produced from the polymeric composition, especially by applying the inventive polymeric composition to a support surface (carrier) and subsequently drying and/or removal of liquid phase (dispersant), may have a gel content in the range of from 15 to 75%, especially in the range of from 18 to 70%, preferably in the range of from 20 to 60%, especially as determined by Soxhlet extraction with tetrahydrofuran (THF) as solvent, preferably in accordance with ASTM-D2765.

Gel content is a measure of crosslinking between polymers. It is measured by first drying the latex before solubilizing it in a solvent such as tetrahydrofuran (THF). In the parts of the latex where the density of crosslinks is low, the latex dissolves, but highly crosslinked latex parts will swell and form a gel. Then, the solvent solution is filtered and the gel collected. Once dried, it is weighed, and this number is divided by the original weight to arrive at a gel percentage.

Soxhlet extraction is a method used to continuously extract soluble constituents (parts), wherein the solvent is heated to reflux and the extract containing solvent and solved constituent is continuously emptied in a siphon. Thereby, the soluble constituents are steadily separated from the insoluble ones.

Moreover, according to a further particular embodiment, films produced from the inventive polymeric composition, especially by applying the polymeric composition to a support surface (carrier) and subsequently drying and/or removal of liquid phase (dispersant), may have swelling values in the range of from 2 to 30, especially as determined by Soxhlet extraction with tetrahydrofuran (THF) as solvent, preferably in accordance with ASTM-D2765.

The swelling value or swelling capacity of a polymer is inversely proportional to the crosslinking density and refers to the amount of liquid medium that can be absorbed in it. With regard to Soxhlet extraction reference can be made to the explanations made hereinabove.

According to a particular embodiment, films produced from the inventive polymeric composition, especially by applying the polymeric composition to a support surface (carrier) and subsequently drying and/or removal of liquid phase (dispersant), may satisfy the Dahlquist criterion. In this context they may have storage modulus values (G') smaller than $3 \cdot 10^5$ Pa at a frequency of 1 Hz, especially as determined by dynamic mechanical analysis (DMA), preferably in accordance with DIN EN ISO 6721-11:2012.

The Dahlquist Criterion states that G' (storage modulus) should be smaller than $3 \cdot 10^5$ Pa for a standard pressure-sensitive adhesive (PSA) to be relatively "flowable" to be able to make good contact with everyday surfaces. The storage modulus is a measure of elastic response of a material measuring the stored energy.

Moreover, according to another particular embodiment, films produced from the inventive polymeric composition, especially by applying the polymeric composition to a support surface (carrier) and subsequently drying and/or removal of liquid phase (dispersant), may have 180° peel values in the range of from 5 to 35 N/25 mm, especially in the range of from 7.5 to 30 N/25 mm, preferably in the range of from 10 to 25 N/25 mm, preferably in accordance with ASTM-D3330.

The 180° peel adhesion test is used to determine the force required to debond two components joined by an adhesive. In 180° peel test, a constant 180° angle is maintained whilst the two glued components are peeled apart.

Also, according to a particular embodiment, films produced from the inventive polymeric composition, especially by applying the polymeric composition to a support surface (carrier) and subsequently drying and/or removal of liquid phase (dispersant), may have loop-tack values in the range of from 5 to 50 N/25 mm, especially in the range of from 7.5 to 40 N/25 mm, preferably in the range of from 10 to 40 N/25 mm, preferably in accordance with ASTM-D6195. Loop tack tests are intended for quality control and specification of adhesive tapes and pressure sensitive adhesives. The length and width are specified to be 25 mm of the loop strip, the dimensions and material of the base plate and the speed of the test are also specified. Tack is defined as the force required to separate, at a specified speed, a loop that has adhesively contacted a specified area of defined surfaces.

According to a further particular embodiment, films produced from the inventive polymeric composition, especially by applying the polymeric composition to a support surface (carrier) and subsequently drying and/or removal of liquid phase (dispersant), may have shear values in the range of from 100 to 16,000 min, especially in the range of from 110 to 15,000 min, preferably in the range of from 120 to 14,000 min, preferably in accordance with ASTM-D3654.

Shear strength or also called shear resistance is the ability of a material to resist forces which can cause the internal structure of the material to slide against itself. Adhesives tend to have high shear strength. Thus, shear strength is the strength of a material or component against the type of yield or structural failure where the material or component fails in shear. It is therefore the load that an object is able to withstand in a direction parallel to the face of the material, as opposed to perpendicular to the surface.

Furthermore, according to another particular embodiment, films produced from the inventive polymeric composition, especially by applying the polymeric composition to a support surface (carrier) and subsequently drying and/or removal of liquid phase (dispersant), may have SAFT values in the range of from 40 to 200° C., especially in the range of from 50 to 140° C., preferably in the range of from 60 to 130° C., preferably in conformity with ASTM-D4498.

A modification of the shear-resistance test is the shear adhesion failure test (SAFT), which is a modification of ASTM D-4498—a standard test method for the heat-fail temperature in shear of hot melt adhesives. As described in this method, the samples are assembled as in the shear test using a 500 g load and placed into the test chamber. The temperature of the chamber starts at ambient and is ramped upward at a prescribed rate. The temperature at which the adhesive layer fails is noted as the shear adhesion failure temperature (SAFT) and serves as a guide to the high-temperature performance of the adhesive.

Typically, the weight-average molecular mass (i.e. weight-average molecular weight) ($M_w$) of the polymer molecules and/or of the particles of the polymeric composition may be controlled and/or tailored, during their production, by the crosslinker (iii) and/or the chain-transfer agent (CTA), especially via the chemical nature, physico-chemical properties and/or amounts of the crosslinker (iii) and/or the chain-transfer agent (CTA). Thus, the resulting polymeric composition can be adjusted to fit the exact use and application and the therefore respectively needed characteristics.

In a preferred embodiment, the present invention refers to a method for the synthesis of oligoester crosslinkers in a one pot ring-opening polymerization (ROP) reaction using preferably 2-hydroxyethyl methacrylate and/or 1,4-butanediol as initiating species and lactide, ε-caprolactone as monomers and preferably itaconic anhydride as terminating agent. Oligoester crosslinkers with target number of lactide and ε-caprolactone moieties (units) can be synthesized with symmetric and asymmetric vinyl functionality (i.e. ethylenically unsaturated bonds or carbon-carbon double bonds). These crosslinkers can be incorporated into a polymeric composition, especially used as or in waterborne pressure-sensitive adhesive (PSA) formulations using a seeded semi-batch emulsion polymerization process. Waterborne PSAs synthesized with the inventive (degradable) crosslinker according to the method of the present invention have excellent adhesive performance (measured as e.g. probe-tack, shear resistance and peel resistance).

In the following several exemplary schemes illustrating the inventive method for producing a copolymer comprised by the inventive polymeric composition are shown, wherein "n" represents the number of total moieties (i.e. repeating units) derived from lactide and "m" represents the number of total moieties (i.e. repeating units) derived from ε-caprolactone and wherein methyl methacrylate and acrylic acid are used as moieties (i) and butyl acrylate is used as moiety (ii) and wherein in the crosslinker (iii) either 2-hydroxyethyl methacrylate or 1,4-butanediol are used as initiating species, lactide and ε-caprolactone are used as monomers and itaconic anhydride is used as terminating agent (wherein "n" and "m", i.e. the number of the respective repeating units, have been defined hereinabove):

Formula (5) represents a copolymer comprised by the inventive composition and produced by the inventive method using an asymmetric crosslinker (using 2-hydroxyethyl methacrylate as initiating species) (wherein a1, b1, c1, a2, b2, c2, d denote the number of the respective repeating units of the respective moieties and correspond to the above defined molar ratios):

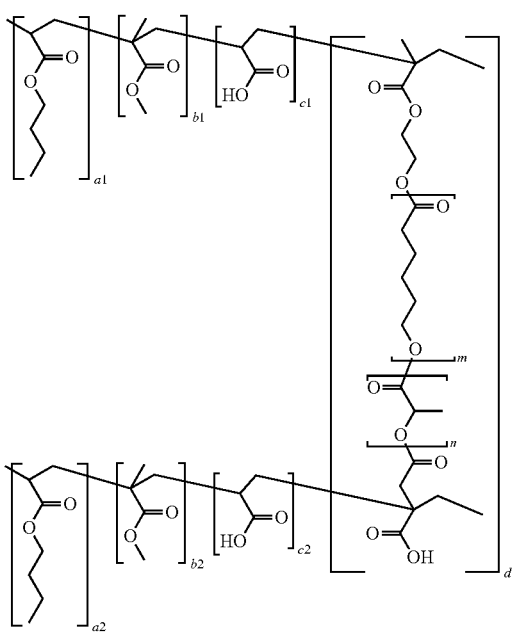
(5)
Formula (6) represents a copolymer comprised by the inventive composition and produced by the inventive method using a symmetric crosslinker (using 1,4-butanediol as initiating species) (wherein a1, b1, c1, a2, b2, c2, d denote the number of the respective repeating units of the respective moieties and correspond to the above defined molar ratios):
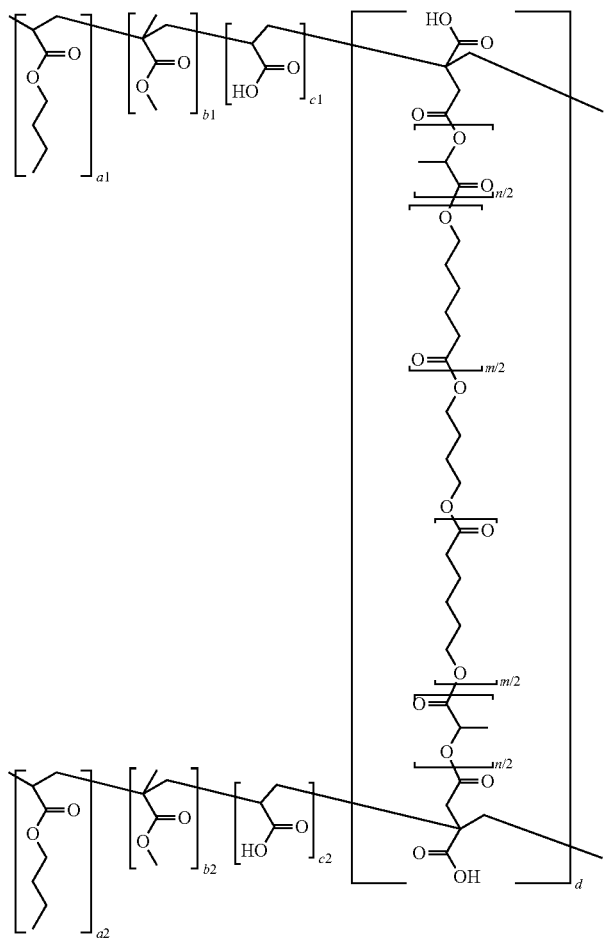
(6)

On the whole, the present invention provides an efficient and economic method for producing, under environmentally compatible conditions and with high yields, a polymeric composition providing high-performance properties, especially when used as or in an adhesive.

The multitude of the respective particularities and advantages linked to the inventive method and to the resulting polymeric composition as well as to its uses and applications have been discussed in detail hereinbefore, so that reference can be made to the above explanations in this respect.

According to a second aspect of the present invention, the present invention further refers to a polymeric composition, preferably in the form of a water-based (waterborne) composition, more preferably dispersion (emulsion or latex), particularly to be used as or in an adhesive, especially a pressure-sensitive adhesive, particularly a pressure-sensitive adhesive degradable under basic conditions, wherein the polymeric composition is obtainable by a method as defined hereinabove.

According to a particular embodiment, pursuant to this aspect of the present invention, the present invention is directed to a polymeric composition, preferably in the form of a water-based (waterborne) composition, more preferably dispersion (emulsion or latex), particularly to be used as or in an adhesive, especially a pressure-sensitive adhesive, particularly a pressure-sensitive adhesive degradable under basic conditions, especially the polymeric composition as defined hereinabove, wherein the polymeric composition comprises a copolymer obtainable by copolymerizing moieties (monomers) (i), (ii) and (iii), especially in the form of discrete particles of the copolymer, preferably in liquid carrier medium (continuous phase), more preferably in a water-based liquid carrier medium (continuous phase), wherein the moieties (i), (ii) and (iii) are in accordance with the following definition and are each different from one another:

(i) moiety (i) on the basis of at least one first ethylenically unsaturated monomer, the homopolymer of which has a glass transition temperature $Tg^{(i)}$ ranging from 30° C. to 200° C., especially from 40° C. to 150° C., (ii) moiety (ii) on the basis of at least one second ethylenically unsaturated monomer, the homopolymer of which has a glass transition temperature $Tg^{(ii)}$ ranging from −100° C. to −10° C., especially from −60° C. to −20° C., (iii) moiety (iii) on the basis of at least one crosslinker, especially at least one crosslinking (macro)monomer or oligomer, which crosslinker comprises moieties (units) derived from ε-caprolactone (1-oxa-2-oxocylcoheptane) and/or lactide (3,6-dimethyl-1,4-dioxan-2,5-dion) and which crosslinker additionally comprises two ethylenically unsaturated bonds (carbon-carbon double bonds).

Furthermore, according to this aspect of the present invention, it is preferred when moiety (i) on the basis of the first ethylenically unsaturated monomer, the homopolymer of which has a glass transition temperature $Tg^{(i)}$ ranging from 30° C. to 200° C., especially from 40° C. to 150° C., is methyl methacrylate (MMA) and/or acrylic acid (AA), preferably methyl methacrylate (MMA) and acrylic acid (AA).

Moreover, according to this aspect of the present invention, it is also preferred when moiety (ii) on the basis of the second ethylenically unsaturated monomer, the homopolymer of which has a glass transition temperature $Tg^{(ii)}$ ranging from −100° C. to −10° C., especially from −60° C. to −20° C., is butyl acrylate (BA).

According to a particular embodiment of this aspect of the present invention, the polymeric composition may comprise at least one of the following copolymers:

(i)/(ii)/(iii)-copolymers and/or copolymers comprising moieties (i), (ii) and (iii), preferably with a (i)/(ii)/(iii)-weight ratio of (1-80)/(20-99)/(0.0001-20), particularly (2-70)/(30-98)/(0.001-10), especially (5-60)/(40-97)/(0.005-5), preferably (5-40)/(50-96)/(0.01-5), however, with the proviso that the sum of the weight shares results in 100.

According to another particular embodiment of this aspect of the present invention, the polymeric composition may comprise at least one of the following copolymers:

(i)/(ii)/(iii)-copolymers and/or copolymers comprising moieties (i), (ii) and (iii), preferably with a (i)/(ii)/(iii)-molar ratio of (1-80)/(25-99)/(0.001-15), particularly (2-75)/(30-98)/(0.005-10), especially (5-65)/(35-97)/(0.01-8), preferably (5-50)/(40-96)/(0.05-5), however, with the proviso that the sum of the molar shares results in 100.

According to a further particular embodiment of this aspect of the present invention, the polymeric composition may comprise at least one of the following copolymers:

(MMA and/or AA)/BA/crosslinker-copolymers and/or copolymers comprising moieties (MMA and/or AA), BA and crosslinker, preferably with a (MMA and/or AA)/BA/crosslinker-weight ratio of (1-80)/(20-99)/(0.0001-20), particularly (2-70)/(30-98)/(0.001-10), especially (5-60)/(40-97)/(0.005-5), preferably (5-40)/(50-96)/(0.01-5), however, with the proviso that the sum of the weight shares results in 100.

According to yet another particular embodiment of this aspect of the present invention, the polymeric composition may comprise at least one of the following copolymers:

(MMA and/or AA)/BA/crosslinker-copolymers and/or copolymers comprising moieties (MMA and/or AA), BA and crosslinker, preferably with a (MMA and/or AA)/BA/crosslinker-molar ratio of (1-80)/(25-99)/(0.001-15), particularly (2-75)/(30-98)/(0.005-10), especially (5-65)/(35-97)/(0.01-8), preferably (5-50)/(40-96)/(0.05-5), however, with the proviso that the sum of the molar shares results in 100.

With respect to the polymeric composition and/or the copolymer comprised by the inventive polymeric composition, in the following typical and representative but non-limiting embodiments and characteristics will be described:

Typically, the inventive polymeric composition may have a solids content in a wide range. Especially the polymeric composition may have a solids content in the range of from 5 to 90% by weight, especially in the range of from 10 to 85% by weight, preferably in the range of from 15 to 80% by weight, more preferably in the range of from 35 to 65% by weight, preferably in accordance with ISO 124:2014.

A solids content in this range is especially suitable to be used as or in adhesives, especially pressure-sensitive adhesives, particularly pressure-sensitive adhesives degradable under basic conditions. In particular, polymeric compositions with the above specified solids content is easily applicable and processable, especially with regard to the above mentioned adhesives.

Moreover, the copolymer comprised by the inventive polymeric composition may have a weight-average molecular mass in a broad range. Typically, the copolymer comprised by the polymeric composition may have a weight-average molecular mass ($M_w$) in the range of from $10^3$ to $10^{10}$ g/mol, especially in the range of from $10^4$ to $10^9$ g/mol, especially as determined by multi-angle light scattering (MALS), particularly flow field-flow fractionation with multi-angle light scattering and refractive index detection (AF4/MALS/RI).

The copolymer comprised by the inventive polymeric composition is effective in broad molecular mass ranges and can be adjusted to the requirements of the specific applications or uses.

Furthermore, the copolymer comprised by the inventive polymeric composition may have a polydispersity index (PDI) in the range of from 1.5 to 9, especially in the range of from 1.7 to 8, preferably in the range of from 1.8 to 6, more preferably in the range of from 2 to 5, based on the fraction of the copolymer being soluble in tetrahydrofuran (THF), preferably in accordance with DIN EN ISO 16014-5:2019.

Also, the glass transition temperature of the copolymer comprised by the inventive polymeric composition may vary in a wide range. Usually, the copolymer comprised by the inventive polymeric composition may have a glass transition temperature Tg in the range of from $-5$ to $-100°$ C., particularly in the range of from $-20$ to $-50°$ C., especially in the range of from $-10$ to $-40°$ C., especially as determined by differential scanning calorimetry, preferably in accordance with DIN EN ISO 11357-2:2014. Also the glass transition temperature can be adjusted to the specific requirements of the final application.

Typically, the particles of the inventive polymeric composition may have a z-average particle size in the range of from 10 to 1,000 nm, especially in the range of from 50 to 750 nm, preferably in the range of from 75 to 500 nm, more preferably in the range of from 100 to 400 nm, particularly in the range of from 100 to 350 nm, especially as determined by dynamic light scattering (DLS), preferably in accordance with DIN ISO 22412:2018.

According to a particular embodiment, the copolymer comprised by the inventive polymeric composition may have a weight-average molecular mass ($M_w$) in the range of from $10^3$ to $10^6$ g/mol, especially in the range of from $10^4$ to $10^6$ g/mol, especially as determined by multi-angle light scattering (MALS), particularly flow field-flow fractionation with multi-angle light scattering and refractive index detection (AF4/MALS/RI).

According to a different particular embodiment, the copolymer comprised by the inventive polymeric composition may have a weight-average molecular mass ($M_w$) in the range of from $10^6$ to $10^9$ g/mol, especially in the range of from $10^7$ to $10^9$ g/mol, especially as determined by multi-angle light scattering (MALS), particularly flow field-flow fractionation with multi-angle light scattering and refractive index detection (AF4/MALS/RI).

According to a further particular embodiment, the copolymer comprised by the polymeric composition may have a multimodal molecular mass distribution, especially a bimodal molecular mass distribution, preferably weight-based molecular mass distribution.

In this context, the multimodal molecular mass distribution, especially the bimodal molecular mass distribution, of the copolymer produced according to the method defined hereinabove and comprised by the polymeric composition may be controlled and/or tailored, during its production, via the reaction process, conditions and/or composition, especially by the crosslinker (iii) and/or the chain-transfer agent (CTA), preferably via the chemical nature, physicochemical properties and/or amounts of the crosslinker (iii) and/or the chain-transfer agent (CTA).

Usually, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially as shown in FIGS. 5A and 5B), may comprise at least two distribution maxima (peaks), wherein the at least two distribution maxima (peaks) may differ by at least $10^1$ g/mol, especially by at least $10^2$ g/mol, preferably by at least $10^3$ g/mol.

Typically, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially as shown in FIGS. 5A and 5B), may comprise at least two distribution maxima (peaks), wherein the at least two distribution maxima (peaks) may differ by at most $10^7$ g/mol, especially by at most $10^6$ g/mol, preferably by at most $10^5$ g/mol.

Especially, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially as shown in FIGS. 5A and 5B), may comprise at least two distribution maxima (peaks), wherein the at least two distribution maxima (peaks) may differ by a range of from $10^1$ g/mol to $10^7$ g/mol, especially by a range of from $10^2$ g/mol to $10^6$ g/mol, preferably by a range of from $10^3$ g/mol to $10^5$ g/mol.

Moreover, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially as shown in FIGS. 5A and 5B), may comprise at least two distribution maxima (peaks), wherein a first distribution maximum may be in the range of from $10^3$ g/mol to $5·10^5$ g/mol and a second distribution maximum may be in the range of from $5·10^6$ g/mol to $10^9$ g/mol, especially a first distribution maximum may be in the range of from $5·10^3$ g/mol to $10^5$ g/mol and a second distribution maximum may be in the range of from $10^7$ to $10^9$ g/mol.

Additionally, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially as shown in FIGS. 5A and 5B), may comprise at least two molecular mass distribution modes (fractions), especially at least two weight-based molecular mass distribution modes, wherein the at least two distribution modes may differ by at least $10^1$ g/mol, especially by at least $10^2$ g/mol, preferably by at least $10^3$ g/mol.

Typically, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially as shown in FIGS. 5A and 5B), may comprise at least two molecular mass distribution modes (fractions), especially at least two weight-based molecular mass distribution modes, wherein the at least two distribution modes may differ by at most $10^7$ g/mol, especially by at most $10^6$ g/mol, preferably by at most $10^5$ g/mol.

Usually, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially as shown in FIGS. 5A and 5B), may comprise at least two molecular mass distribution modes (fractions), especially at least two weight-based molecular mass distribution modes, wherein the at least two distribution modes may differ by a range of from $10^1$ g/mol to $10^7$ g/mol, especially by a range of from $10^2$ g/mol to $10^6$ g/mol, preferably by a range of from $10^3$ g/mol to $10^5$ g/mol.

Especially, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially as shown in FIGS. 5A and 5B), may comprise at least two molecular mass distribution modes (fractions), especially at least two weight-based molecular mass distribution modes, wherein a first distribution mode may be in the range of from $10^3$ g/mol to $5 \cdot 10^5$ g/mol and a second distribution mode may be in the range of from $5 \cdot 10^6$ g/mol to $10^9$ g/mol, especially a first distribution mode may be in the range of from $5 \cdot 10^3$ g/mol to $10^5$ g/mol and a second distribution mode may be in the range of from $10^7$ to $10^9$ g/mol.

With respect to films produced from the inventive polymeric composition, especially by applying the inventive polymeric composition to a support surface (carrier) and subsequently drying and/or removal of liquid phase (dispersant), in the following typical and representative but non-limiting embodiments and characteristics will be described, wherein all these embodiments and characteristics may be modified by selecting the moieties (i), (ii), (iii) (i.e. selecting the moieties based on their characteristics and their interaction), especially from the groups listed hereinabove, particularly with regard to the inventive method, their respective amounts and by adjusting the production method (e.g. polymerization time, polymerization temperature, catalyst, chain-transfer agent etc., especially according to the ranges described with regard to the inventive method hereinabove) to obtain a copolymer comprised by the inventive polymeric composition which is tailored or customized for its specific application or use:

Typically, the films produced from the inventive polymeric composition, especially by applying the polymeric composition to a support surface (carrier) and subsequently drying and/or removal of liquid phase (dispersant), may have a gel content in the range of from 15 to 75%, especially in the range of from 18 to 70%, preferably in the range of from 20 to 60%, especially as determined by Soxhlet extraction with tetrahydrofuran (THF) as solvent, preferably in accordance with ASTM-D2765.

Moreover, the swelling values of the respective films may vary in a broad range. Especially, the films produced from the inventive polymeric composition, especially by applying the polymeric composition to a support surface (carrier) and subsequently drying and/or removal of liquid phase (dispersant), may have swelling values in the range of from 2 to 30, especially as determined by Soxhlet extraction with tetrahydrofuran (THF) as solvent, preferably in accordance with ASTM-D2765.

Usually, the films produced from the inventive polymeric composition, especially by applying the polymeric composition to a support surface (carrier) and subsequently drying and/or removal of liquid phase (dispersant), may satisfy the Dahlquist criterion. In this respect, the respective films may have storage modulus values (G') smaller than $3 \cdot 10^5$ Pa at a frequency of 1 Hz, especially as determined by dynamic mechanical analysis (DMA), preferably in accordance with DIN EN ISO 6721-11:2012.

Moreover, the films produced from the inventive polymeric composition, especially by applying the polymeric composition to a support surface (carrier) and subsequently drying and/or removal of liquid phase (dispersant), may have 180° peel values in the range of from 5 to 35 N/25 mm, especially in the range of from 7.5 to 30 N/25 mm, preferably in the range of from 10 to 25 N/25 mm, preferably in accordance with ASTM-D3330.

Furthermore, the films produced from the inventive polymeric composition, especially by applying the polymeric composition to a support surface (carrier) and subsequently drying and/or removal of liquid phase (dispersant), have loop-tack values in the range of from 5 to 50 N/25 mm, especially in the range of from 7.5 to 40 N/25 mm, preferably in the range of from 10 to 40 N/25 mm, preferably in accordance with ASTM-D6195.

Also, the films produced from the inventive polymeric composition, especially by applying the polymeric composition to a support surface (carrier) and subsequently drying and/or removal of liquid phase (dispersant), may have shear values in the range of from 100 to 16,000 min, especially in the range of from 110 to 15,000 min, preferably in the range of from 120 to 14,000 min, preferably in accordance with ASTM-D3654.

Furthermore, the films produced from the inventive polymeric composition, especially by applying the polymeric composition to a support surface (carrier) and subsequently drying and/or removal of liquid phase (dispersant), may have SAFT values in the range of from 40 to 200° C., especially in the range of from 50 to 140° C., preferably in the range of from 60 to 130° C., preferably in conformity with ASTM-D4498.

According to a particular embodiment, the inventive polymeric composition may have neutral or slightly acidic pH value. In this context, the polymeric composition may have a pH value in the range of from 4 to 8, especially in the range of from 5 to 7.5, preferably in the range of from 6 to 7.

According to this aspect of the present invention, it is preferred when the inventive polymeric composition and/or the copolymer comprised by the polymeric composition is degradable under basic conditions, especially under basic pH conditions, particularly under pH conditions in the range of from 8 to 14, more particularly in the range of from 9 to 12.

According to this aspect of the present invention, it is also preferred, when the inventive polymeric composition and/or the copolymer comprised by the polymeric composition is degradable under basic conditions at ambient or at elevated temperatures, especially at elevated temperatures, preferably at temperatures in the range of from 20 to 120° C., more preferably in the range of from 25 to 100° C., even more preferably in the range of from 30 to 90° C.

Furthermore, according to this aspect of the present invention, it is also preferred, when the inventive polymeric composition and/or the copolymer comprised by the polymeric composition is essentially degraded under basic conditions, especially under basic conditions as described hereinabove, after a duration in the range of from 1 min to 4 hours, especially in the range of from 2 min to 3.5 hours, preferably in the range of from 3 min to 3 hours.

According to a particular embodiment of this aspect of the present invention, the inventive polymeric composition may further comprise at least one additive, especially selected from the group consisting of tackifiers, resins, buffering agents, pH adjusting agents, surfactants, viscosifying agents, rheology modifiers, UV-stabilizing agents, heat protection agents, plasticizers, waxes, stabilizers, dispersants, preservatives, pigments, oils, colorants, flavorants and their combinations.

Furthermore, according to a particular embodiment of this aspect of the present invention, the inventive polymeric composition may further comprise at least one tackifier, especially resin-based tackifiers.

Moreover, the polymeric composition may be characterized by one or more of the features described hereinabove.

With respect to further details as to the polymeric composition according to the present invention, reference may be made to the above descriptions of the inventive method, which apply accordingly also to this aspect of the present invention.

According to a third aspect of the present invention, the present invention further refers to the use of a polymeric composition as defined hereinabove as or in an adhesive, especially a pressure-sensitive adhesive, particularly a pressure-sensitive adhesive degradable under basic conditions.

With respect to further details as to the use of a polymeric composition according to the present invention, reference may be made to the above descriptions of the inventive method and the inventive polymeric composition, which apply accordingly also to this aspect of the present invention.

According to a fourth aspect of the present invention, the present invention further refers to an adhesive, especially a pressure-sensitive adhesive, especially degradable under basic conditions, particularly in the form of a water-based (waterborne) composition, preferably in the form of a dispersion (emulsion or latex),
wherein the adhesive comprises a polymeric composition as defined hereinabove and/or
wherein the adhesive is obtainable using a polymeric composition as defined hereinabove.

According to a particular embodiment of this aspect of the present invention, the adhesive may further comprise at least one additive, especially selected from the group consisting of tackifiers, resins, buffering agents, pH adjusting agents, surfactants, viscosifying agents, rheology modifiers, UV-stabilizing agents, heat protection agents, plasticizers, waxes, stabilizers, dispersants, preservatives, pigments, oils, colorants, flavorants and their combinations.

Furthermore, according to a particular embodiment of this aspect of the present invention, the adhesive may further comprise at least one tackifier, especially resin-based tackifiers. With respect to further details as to the adhesive according to the present invention, reference may be made to the above descriptions of the inventive method, the inventive polymeric composition and the inventive use of the polymeric composition, which apply accordingly also to this aspect of the present invention.

According to a fifth aspect of the present invention, the present invention further refers to a crosslinker, particularly a crosslinking (macro)monomer or oligomer, especially a crosslinker degradable under basic conditions,
wherein the crosslinker comprises moieties (units) derived from ε-caprolactone (1-oxa-2-oxocylcoheptane) and/or lactide (3,6-dimethyl-1,4-dioxan-2,5-dion) and which crosslinker additionally comprises two ethylenically unsaturated bonds (carbon-carbon double bonds).

According to a particular embodiment of this aspect of the present invention, the crosslinker is obtainable by a method as defined hereinabove and/or wherein the crosslinker is characterized by any of the characteristics as defined hereinabove.

According to this aspect of the present invention, it is preferred when the crosslinker comprises the moieties (I), (II) and (III) according to the following definition and each being different from one another:
(I) at least one organic alcohol, especially at least one monovalent or divalent organic alcohol, especially selected from monovalent or divalent aliphatic, cyclic and arylic alcohols,
(II) ε-caprolactone and/or lactide,
(III) at least one ethylenically unsaturated compound comprising a methylene group, especially at least one ethylenically unsaturated cycloaliphatic monomer comprising a methylene group.

Moreover, according to this aspect of the present invention, it is also preferred when the crosslinker comprises functional groups, especially ester groups, degradable under basic conditions.

Regarding the degradability of the inventive crosslinker, in the following typical and representative but non-limiting conditions will be described:

Typically, the crosslinker may be degradable under basic conditions, especially under basic pH conditions, particularly under pH conditions in the range of from 8 to 14, more particularly in the range of from 9 to 12.

Also, the crosslinker may be degradable under basic conditions at various temperature conditions. Especially, the crosslinker may be degradable under basic conditions at ambient or at elevated temperatures, especially at elevated temperatures, preferably at temperatures in the range of from 20 to 120° C., more preferably in the range of from 25 to 100° C., even more preferably in the range of from 30 to 90° C.

Moreover, the crosslinker may be degraded under basic conditions after various durations. Usually, the crosslinker may be essentially degraded under basic conditions, especially under basic conditions as described hereinabove, after a duration in the range of from 1 min to 4 hours, especially in the range of from 2 min to 3.5 hours, preferably in the range of from 3 min to 3 hours.

With respect to further details as to the crosslinker according to the present invention, reference may be made to the above descriptions of the inventive method, the inventive polymeric composition, the inventive use of the polymeric composition and the inventive adhesive, which apply accordingly also to this aspect of the present invention.

According to a sixth aspect of the present invention, the present invention further refers to the use of a crosslinker as defined hereinabove for providing polymeric compositions, preferably adhesives, with degradable functional groups, especially ester groups, preferably degradable under basic conditions, and/or for producing degradable polymeric composition, preferably adhesives, particularly degradable under basic conditions.

With respect to further details as to the use of an inventive crosslinker according to the present invention, reference may be made to the above descriptions of the inventive method, the inventive polymeric composition, the inventive use of the polymeric composition, the inventive adhesive and the inventive crosslinker, which apply accordingly also to this aspect of the present invention.

According to a seventh aspect of the present invention, the present invention further refers to the use of an adhesive as defined hereinabove for attaching and/or adhering labels, packagings, tags, tickets, tabs, stickers, sign, plaques or the like to objects.

According to this aspect of the present invention, it is preferred when the attached and/or adhered labels, packagings, tags, tickets, tabs, stickers, sign, plaques or the like are peelable and/or removable and/or releasable from the objects, especially under basic conditions and/or especially when in contact with a basic medium.

According to this aspect of the present invention, it is also preferred when the use of an adhesive is characterized by one or more of the features described hereinabove.

With respect to further details as to the use of an inventive adhesive according to the present invention, reference may be made to the above descriptions of the inventive method, the inventive polymeric composition, the inventive use of the polymeric composition, the inventive adhesive, the inventive crosslinker and the inventive use of the crosslinker, which apply accordingly also to this aspect of the present invention.

DESCRIPTION OF THE FIGURES

Hereinafter, the present invention will be elucidated in more detail using preferred embodiments and figures. In connection with the elucidation of these preferred embodiments, which are, however, in no way restrictive as to the present invention, further advantages, particularities, properties, aspects and features of the present invention are also shown.

FIG. 1 shows the molecular mass distribution of two polymers containing the inventive crosslinkers (ASY-LA4CL4 and SY-LA6CL6; ASY=asymmetric crosslinker and SY=symmetric crosslinker; LA=lactide; CL=ε-caprolactone; 4 and 6=number of repeating units) as well as of the blank sample (polymer containing no crosslinker), wherein all three polymers are synthesized by solution polymerization with (meth)acrylic monomers. The molecular mass distributions of the polymer containing the inventive oligoester crosslinkers are broader compared to the molecular mass distribution of the blank polymer, this is also confirmed by the PDIs. For the blank polymer (polymer without a crosslinker) a PDI of 2 is obtained, while for the polymer containing the crosslinker ASY-LA4CL4 has a PDI of 5 and for the polymer containing the crosslinker SY-LA6CL6 a PDI of 6 is determined by GPC measurements. These broader distributions and higher PDIs for the polymers containing the inventive oligoester crosslinkers proof their ability to function as a crosslinker in the copolymerization with (meth)acrylic monomers.

Figure 2A:
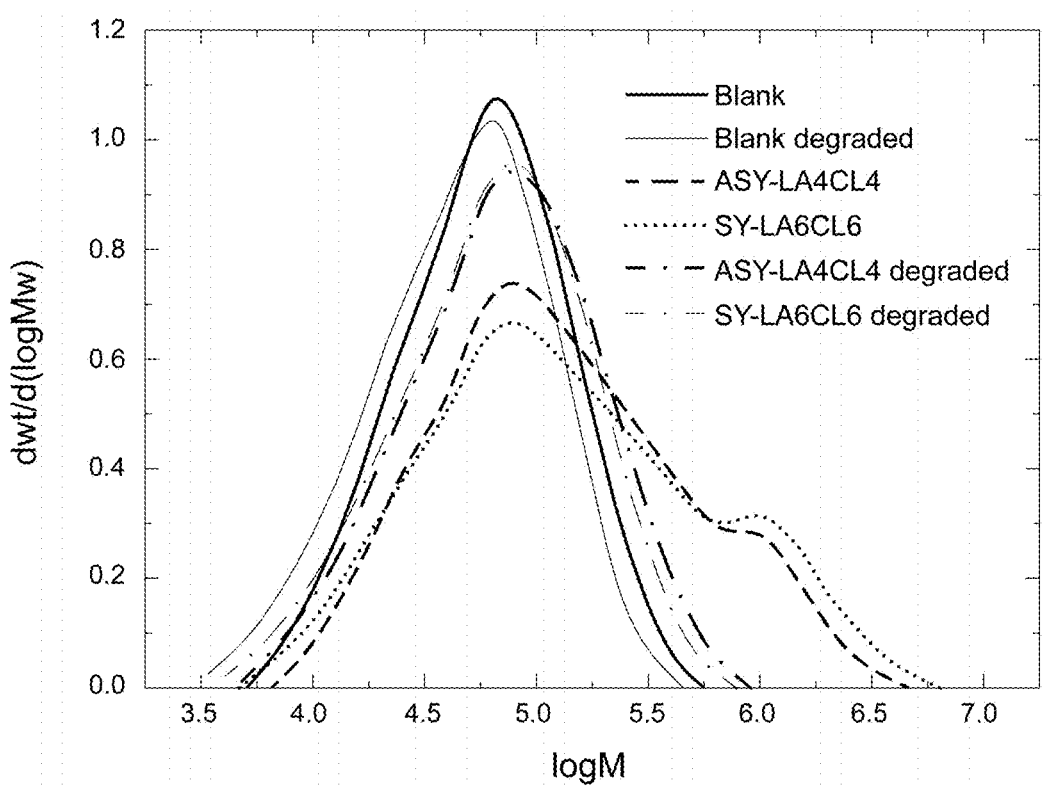
FIG. 2A shows the molecular mass distribution of polymers (obtained by solution polymerization) before and after immersion in potassium hydroxide solution (pH 10) according to yet a particular embodiment of the invention.

FIG. 2A shows the molecular mass distribution of two polymers containing the inventive crosslinkers (ASY-LA4CL4 and SY-LA6CL6) as well as of the blank sample (polymer containing no crosslinker) before and after immersion in potassium hydroxide solution (pH 10) for 24 hours, wherein all three polymers are synthesized by solution polymerization with (meth)acrylic monomers. The molecular mass distribution of the blank polymer after immersion in a basic solution changes only slightly, whereas the molecular mass distributions of the polymers containing the inventive oligoester crosslinkers become narrower and are almost similar to the molecular mass distribution of the blank polymer after degradation. The weight-average molecular mass of the blank polymer decreases by about 20% after degradation, whereas the weight-average molecular masses of the polymers with the inventive oligoester crosslinkers after degradation is around a third of the initial value. Furthermore, the polydispersity of the polymer containing the asymmetric oligoester crosslinker (ASY-LA4CL4) decreases from 4.7 to 2.5 and the polydispersity of the polymer containing the symmetric crosslinker (SY-LA6CL6) decreases from 6.4 to 2.5. On the other hand the blank polymer shows only a slight increase in polydispersity from 2.0 to 2.2 after degradation. It can be concluded that the crosslinkers are degradable in basic environment.

Figure 2B:
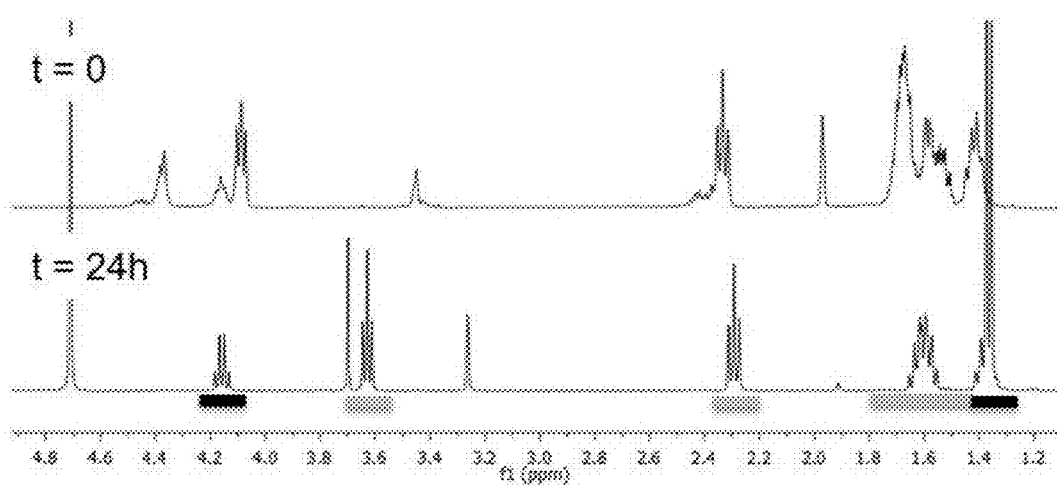
FIG. 2B shows the comparison of the respective $^1$H-NMR of an oligoester crosslinker (obtained by ring-opening polymerization) before and after immersion in potassium hydroxide solution (pH 10) according to another particular embodiment of the invention.

FIG. 2B shows the comparison of the respective $^1$H-NMR of the inventive oligoester crosslinker ASY-LA8CL4 obtained by ring-opening polymerization before and after immersion in potassium hydroxide solution (pH 10) for 24 h. The significant areas of the $^1$H-NMR are indicated by underlining. After 24 hours only the peaks belonging to the two degradation products 6-hydroxyhexanoic acid (from the ε-caprolactone units) and 2-hydroxypropanoic acid (from the lactic acid units) remain.

Figure 3A:
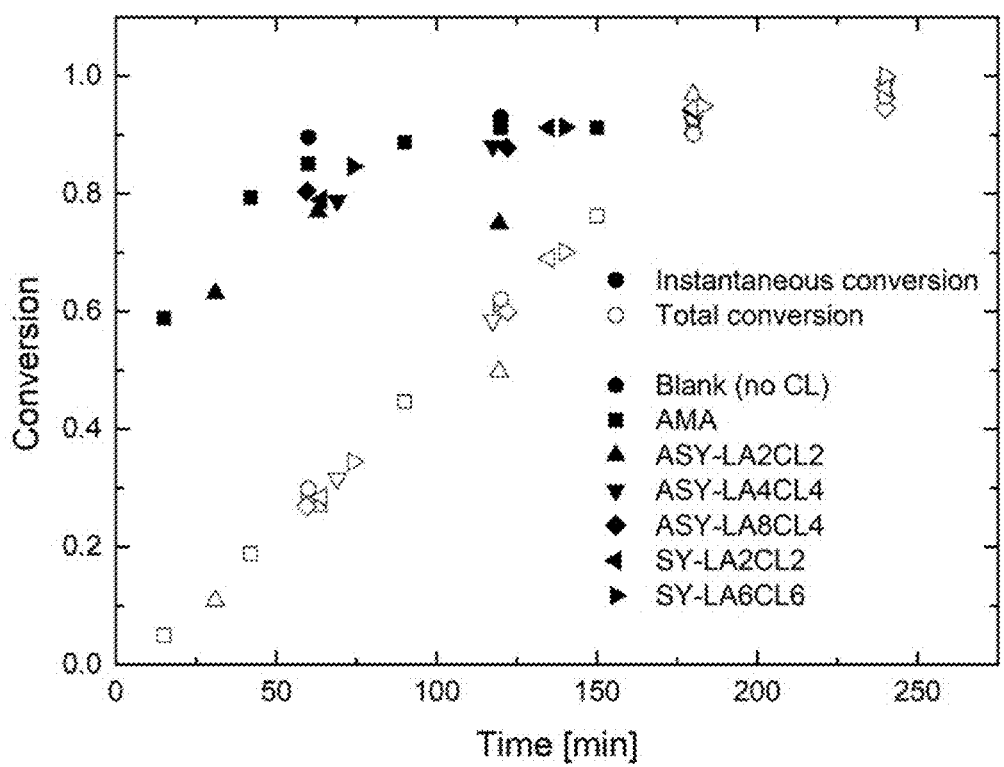
FIG. 3A shows the instantaneous and overall conversion during the seeded semibatch emulsion polymerization according to a further particular embodiment of the invention.

FIG. 3A shows the instantaneous and overall conversion during the seeded semibatch emulsion polymerization of five inventive latices containing different inventive crosslinkers (ASY-LA2CL2, ASY-LA4CL4, ASY-LA8CL4, SY-LA2CL2 or SY-LA6CL6), a latex with the commercial crosslinker AMA (allyl methacrylate) and a latex containing no crosslinker (blank). The conversion rate is very similar in all cases: Instantaneous conversion is at about 80% during most of the polymerization process and will rise to almost full conversion at the end of the polymerization.

Figure 3B:
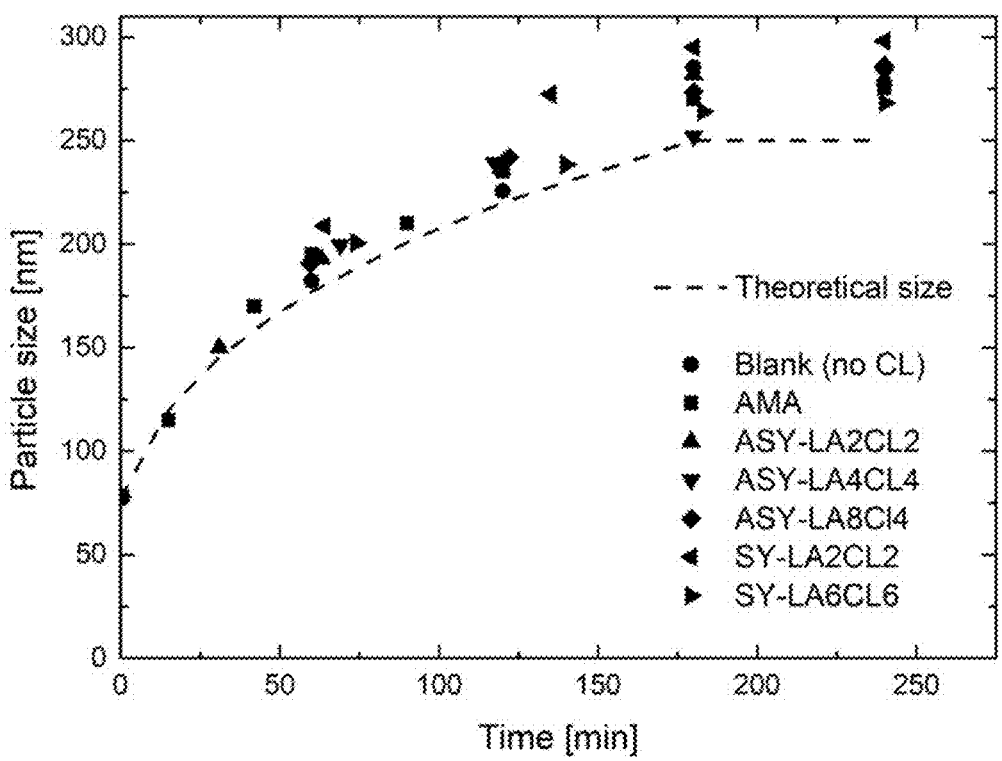
FIG. 3B shows average particle sizes during the seeded semibatch emulsion polymerization according to yet another particular embodiment of the invention.

FIG. 3B shows the average particle size during the seeded semibatch emulsion polymerization of five inventive latices containing different inventive crosslinkers (ASY-LA2CL2, ASY-LA4CL4, ASY-LA8CL4, SY-LA2CL2, SY-LA6CL6), a latex with AMA and a latex containing no crosslinker. No substantial difference in the particle size can be observed. Each latex has a particle size between 270 nm and 300 nm at the end of the polymerization process. Each latex exhibits a larger final particle size than expected, which indicates aggregation between the individual particles.

Figure 4A:
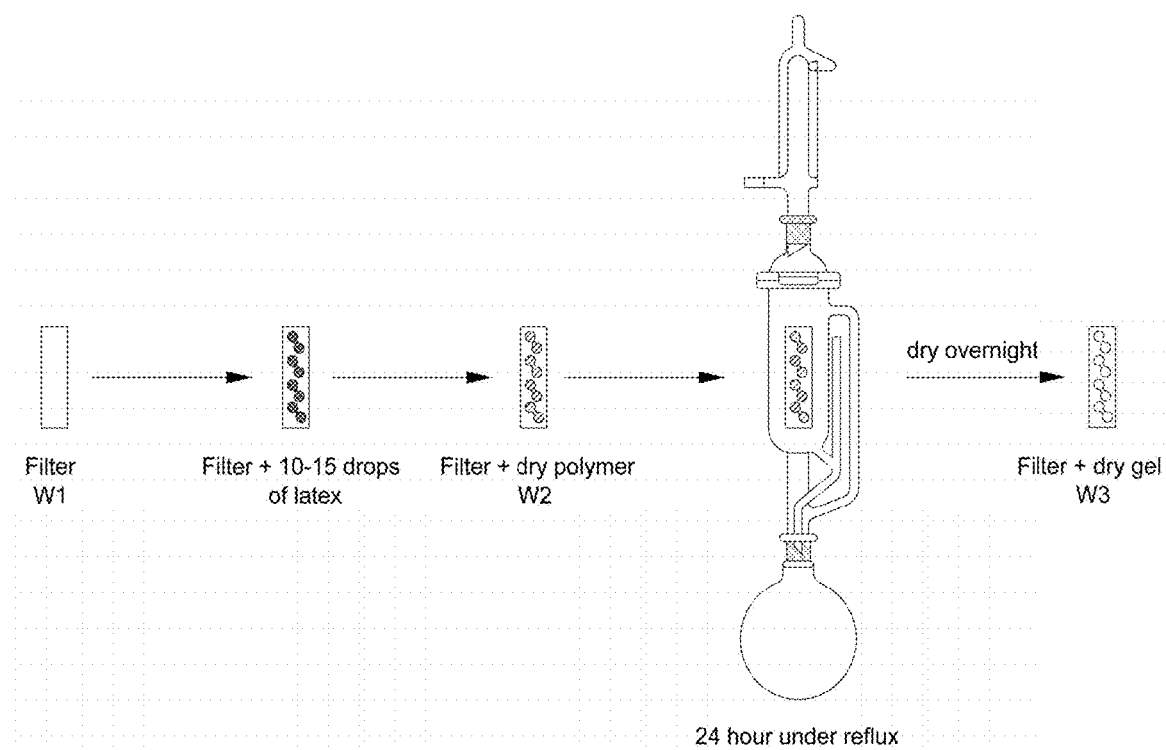
FIG. 4A shows the schematic procedure of a Soxhlet extraction.

FIG. 4A schematically shows the procedure of a Soxhlet extraction: In the first step the dry filter is weighed followed by the second step wherein 10 to 15 drops of the latex to be analyzed are placed on the filter. After drying the latex (dry polymer), in a third step, the respective filter containing the dry latex is weighed. Followed by the fourth step, wherein the filter containing the dry latex is placed into the Soxhlet apparatus. After the 24 h of reflux the filter is dried overnight and is then, in the last step, weighed again. Subsequently the swelling and the gel content of the latex can be calculated.

Figure 4B:
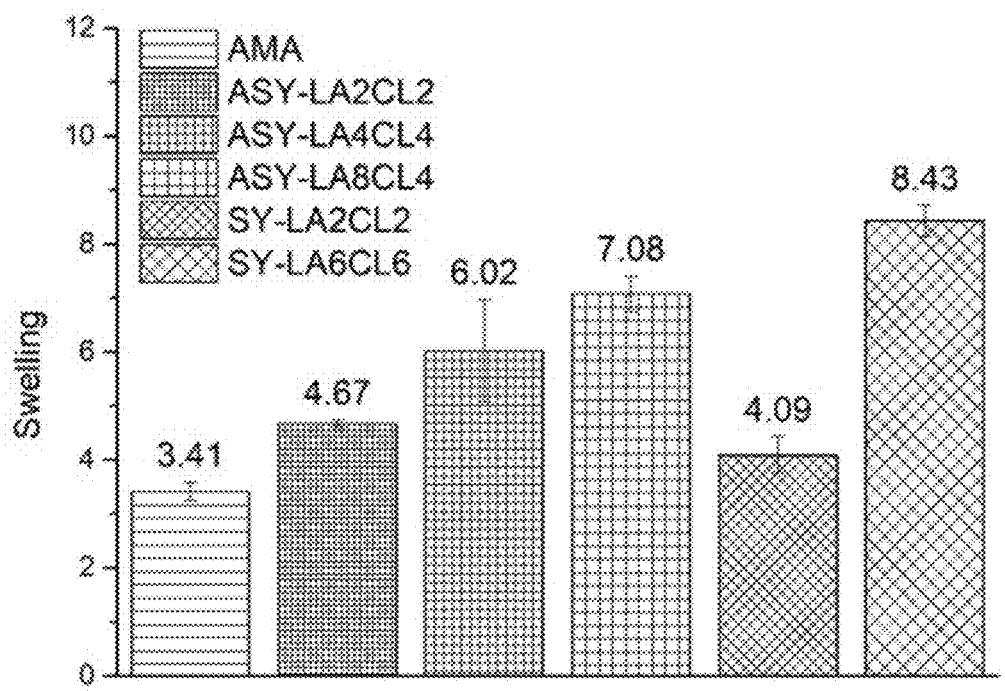
FIG. 4B shows swelling values for various latices according to yet a further particular embodiment of the invention.

FIG. 4B shows swelling values for five inventive latices (crosslinkers: ASY-LA2CL2, ASY-LA4CL4, ASY-LA8CL4, SY-LA2CL2, SY-LA6CL6) and for an AMA containing latex. The lowest swelling value is calculated for the AMA containing latex. The swelling values of the latices containing the inventive crosslinkers increase with increasing length of the oligoester crosslinkers.

FIGS. 5A and 5B represent a particular embodiment of the present invention, wherein the copolymer produced according to the method defined hereinabove and comprised by the polymeric composition may have a multimodal molecular mass distribution, especially a bimodal molecular mass distribution, and show each the molecular mass distribution for various inventive latices as well as for the blank sample and for the AMA containing latex. FIG. 5A shows the bimodal molecular mass distribution of three inventive latices with asymmetric crosslinkers (ASY-LA2CL2, ASY-LA4CL4, ASY-LA8CL4) as well as the blank sample and the AMA containing latex, while FIG. 5B shows the bimodal molecular mass distribution of two inventive latices with symmetric crosslinkers (SY-LA2CL2, SY-LA6CL6) as well as the blank latex. The molecular mass distributions are determined by AF4/MALS/RI measurement. Bimodal molecular mass distributions are observed with one mode of low molecular masses in between $10^4$ g/mol and $10^6$ g/mol and the other mode of high molecular masses in between $10^7$ g/mol and $4·10^8$ g/mol. The high molecular mass mode, which represents the crosslinked part of the polymeric composition, shows a clear peak, except for the sample containing the longest symmetric crosslinker (SY-LA6CL6). The molecular mass of the peak increases the shorter the oligoester crosslinker is. Thus, the high molecular mass peak of the latex containing the shortest symmetric crosslinker (SY-LA2CL2) has its maximum at the highest value for the oligoester containing samples at $2.5·10^8$ g/mol. Whereas, the longer asymmetric crosslinkers show maxima of their peak in the high molecular mass mode at $8·10^7$ g/mol (ASY-LA4CL4) and $6·10^7$ g/mol (ASY-LA8CL4). The AMA containing sample and the Blank have the maximum of their peak in the high molecular mass mode on the one hand at a lower value of $1.5·10^7$ g/mol (Blank) and on the other hand at a higher value of $3.5·10^9$ g/mol (AMA).

Figure 6A:
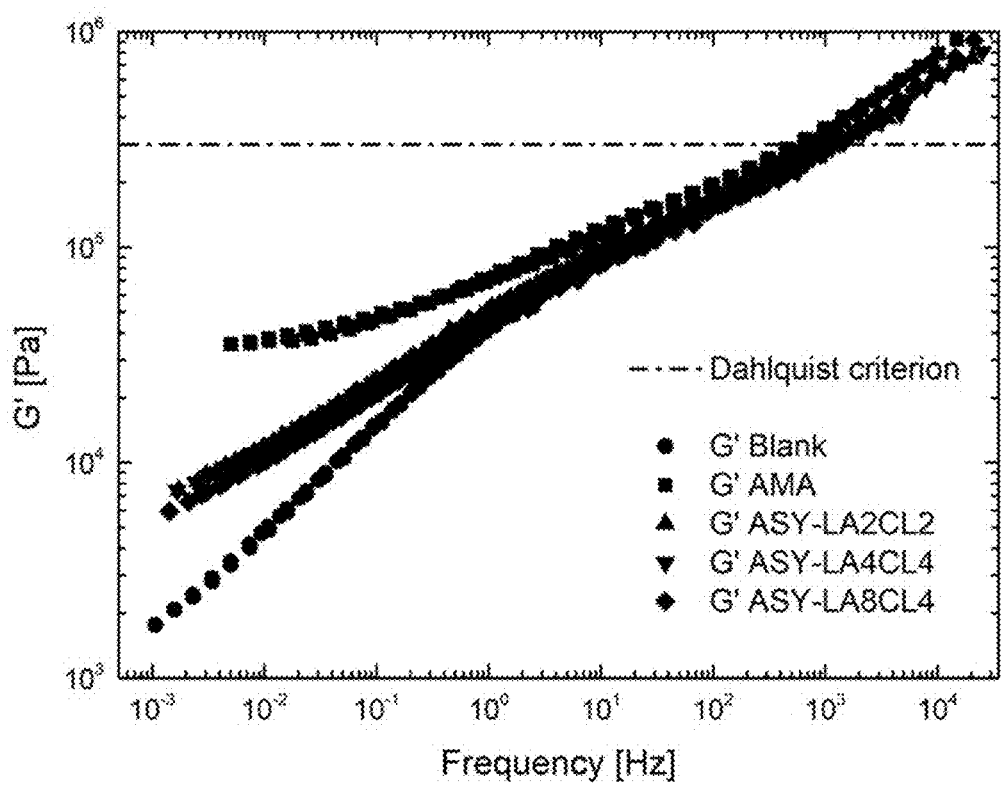
FIGS. 6A and 6B show each storage moduli of various latices to quantify the Dahlquist criterion according to a further particular embodiment of the invention.
Figure 6B:
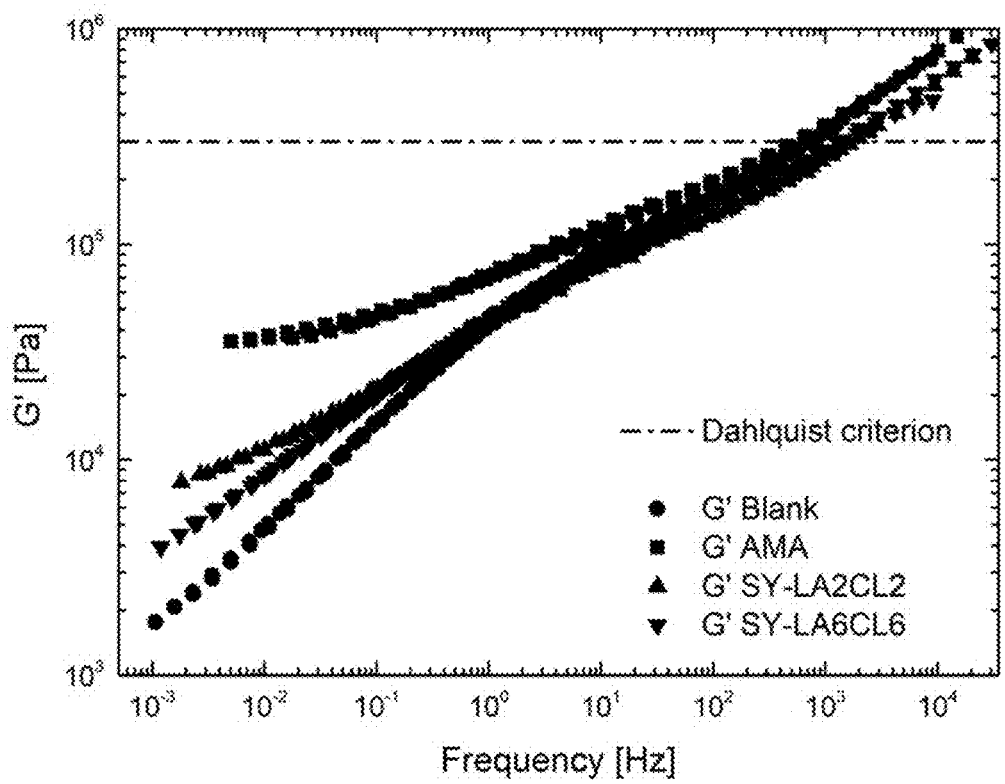

FIGS. 6A and 6B each show storage moduli of various inventive latices as well as the blank latex and the AMA containing latex to quantify the Dahlquist criterion. FIG. 6A shows the storage moduli of three inventive latices with asymmetric crosslinkers (ASY-LA2CL2, ASY-LA4CL4, ASY-LA8CL4) as well as the blank sample and the AMA containing latex, while FIG. 6B shows the storage moduli of two inventive latices with symmetric crosslinkers (SY-LA2CL2, SY-LA6CL6) as well as the blank latex and the AMA containing latex. The Dahlquist criterion states that the storage modulus should be smaller than $3·10^5$ Pa. All measured latices satisfy the Dahlquist criterion at a frequency of 1 Hz. Furthermore, the AMA containing latex reaches a plateau between $10^4$ Pa and $10^5$ Pa at low frequencies and the blank sample shows liquid-like behavior. All inventive latices are in between the AMA containing latex and the blank sample.

Figure 7:
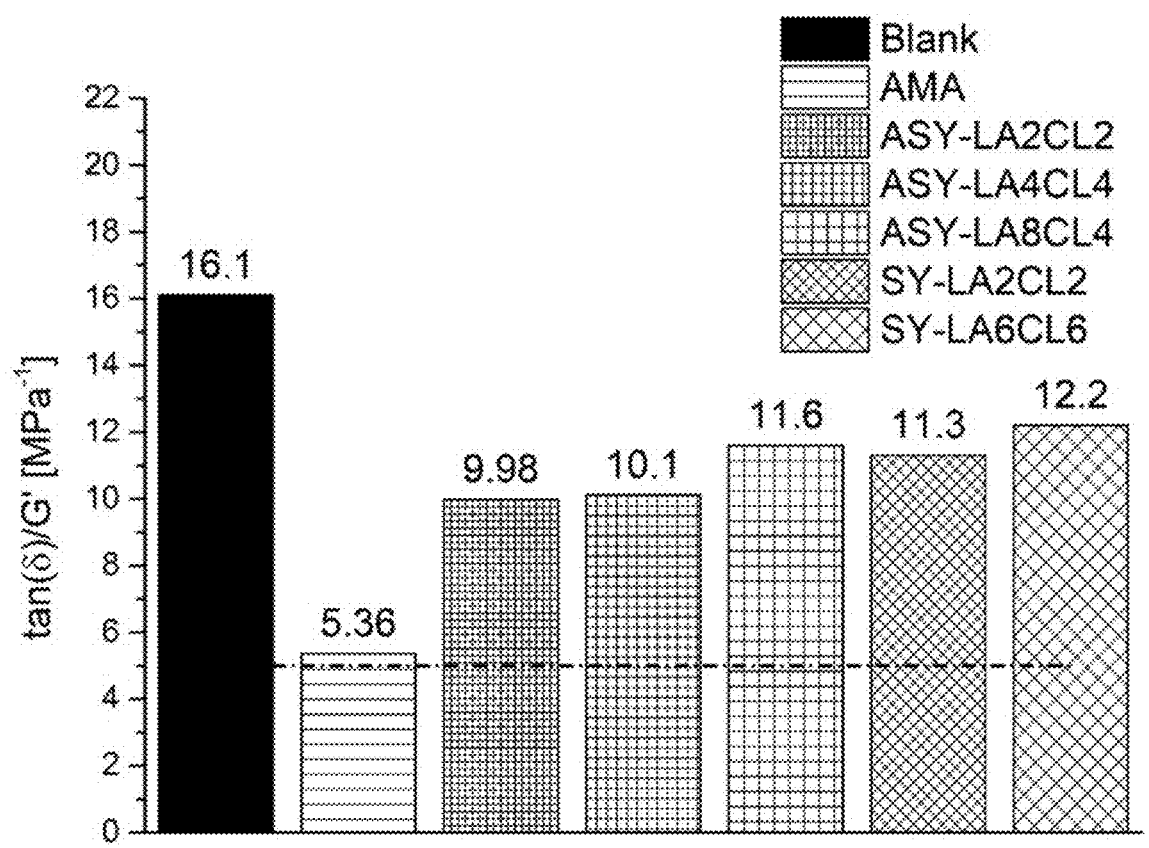
FIG. 7 shows the energy dissipation at the interface between adhesive and substrate according to yet a particular embodiment of the invention.

FIG. 7 shows the energy dissipation (viscous modulus in respect to the elastic modulus) at the interface between adhesive and substrate of five inventive latices (crosslinkers: ASY-LA2CL2, ASY-LA4CL4, ASY-LA8CL4, SY-LA2CL2, SY-LA6CL6), a latex with AMA as a crosslinker as well as the blank sample. Increasing energy dissipation values leads to an increase in resistance to detachment. For the application on steel substrates values above 5 $MPa^{-1}$ are recommended, which all tested latices comply with.

Figure 8A:
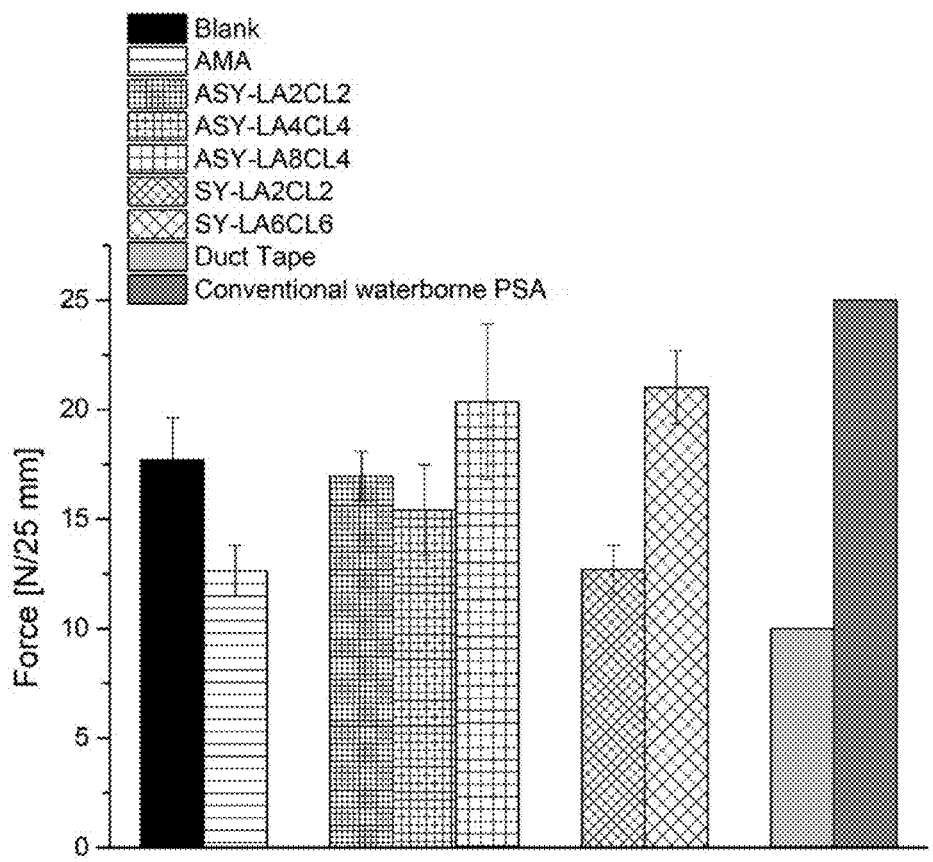
FIG. 8A shows peel values of various latices according to yet another particular embodiment of the invention.

FIG. 8A shows the peel values of five inventive latices (crosslinker: ASY-LA2CL2, ASY-LA4CL4, ASY-LA8CL4, SY-LA2CL2, SY-LA6CL6), a latex with AMA as a crosslinker, latex without a crosslinker, a conventional waterborne PSA and duct tape. Conventionally available duct tape has a peel value of about 10 N/25 mm, all other samples have a peel value between 12 N/25 mm and 21 N/25 mm, which are high values compared to duct tape. The AMA containing latex and the SY-LA2CL2 containing latex show the lowest peel values, while the latices containing the longest asymmetric and symmetric crosslinkers show the highest peel values, even higher than the blank sample. Therefore, it can be concluded, that with increasing crosslinking density peel reaches a maximum and will, with further increasing crosslinking density, decrease again.

Figure 8B:
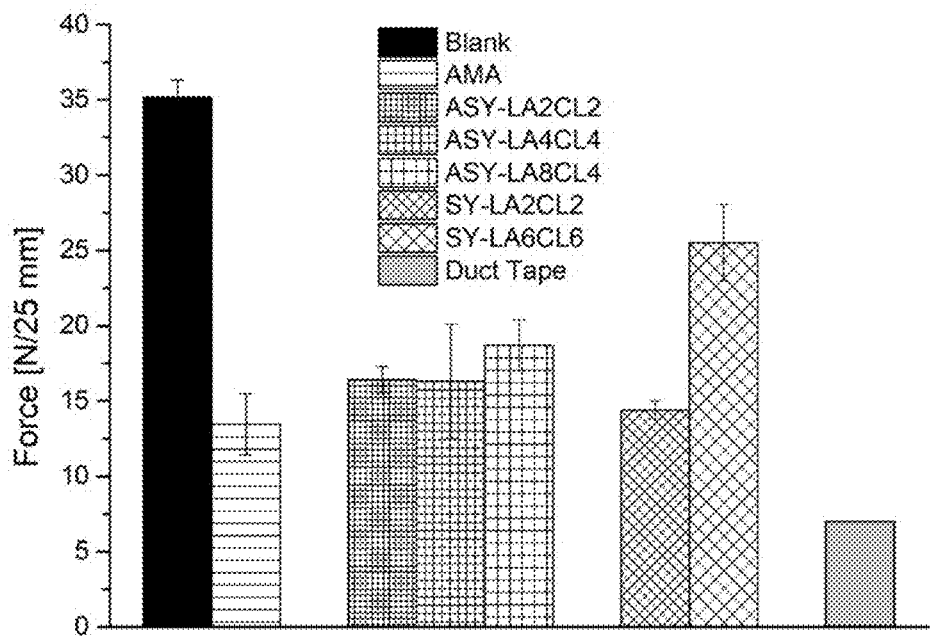
FIG. 8B shows loop-tack values of various latices according to a further particular embodiment of the invention.

FIG. 8B shows the loop-tack values of five inventive latices (crosslinker: ASY-LA2CL2, ASY-LA4CL4, ASY-LA8CL4, SY-LA2CL2, SY-LA6CL6), a latex with AMA as a crosslinker, the blank sample and duct tape. The blank sample shows by far the highest loop-tack value followed by the SY-LA6CL6 containing sample, which has the lowest crosslinking density. With increasing crosslinking density the loop-tack value further decreases and thus the AMA containing latex has the lowest loop-tack value. These values are still high compared to duct tape, which shows by far the lowest loop-tack value.

Figure 9A:
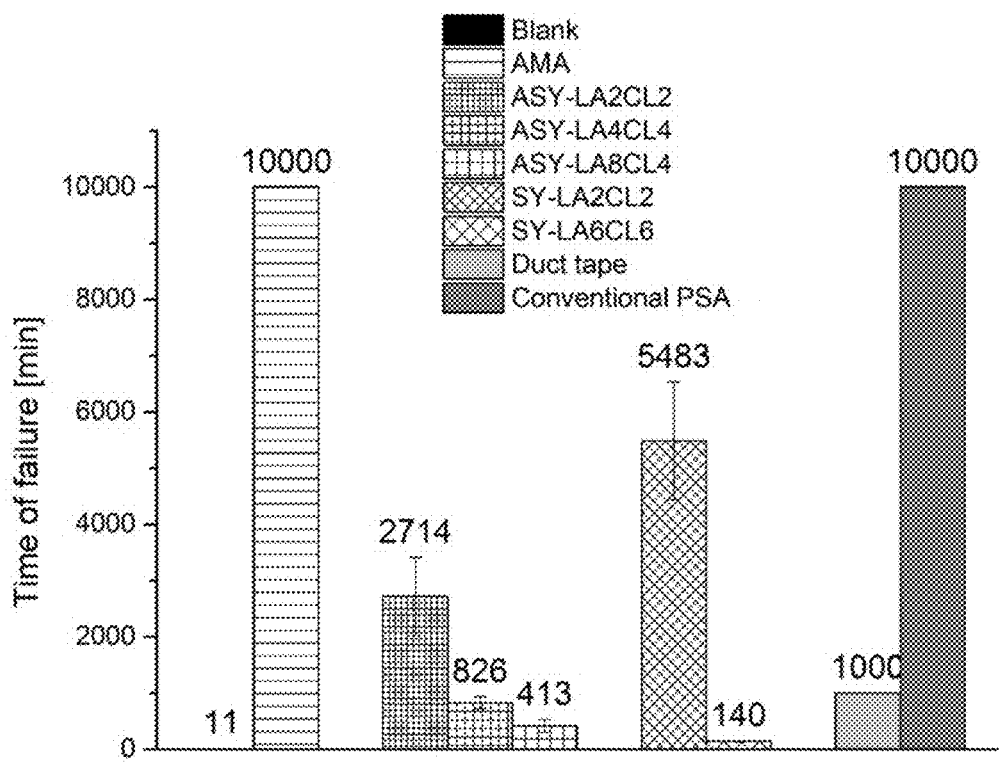
FIG. 9A shows shear values of various latices according to a particular embodiment of the invention.

FIG. 9A shows the shear values of five inventive latices (crosslinker: ASY-LA2CL2, ASY-LA4CL4, ASY-LA8CL4, SY-LA2CL2, SY-LA6CL6), an AMA containing latex, the blank sample, a conventional waterborne PSA and duct tape. The shear time increases with the gel content, therefore, the blank latex has the shortest shear time and the AMA containing latex and the conventional waterborne PSA have the longest shear times. Hence, the inventive latices with longer crosslinkers have shorter shear times than the inventive latices with shorter crosslinkers.

Figure 9B:
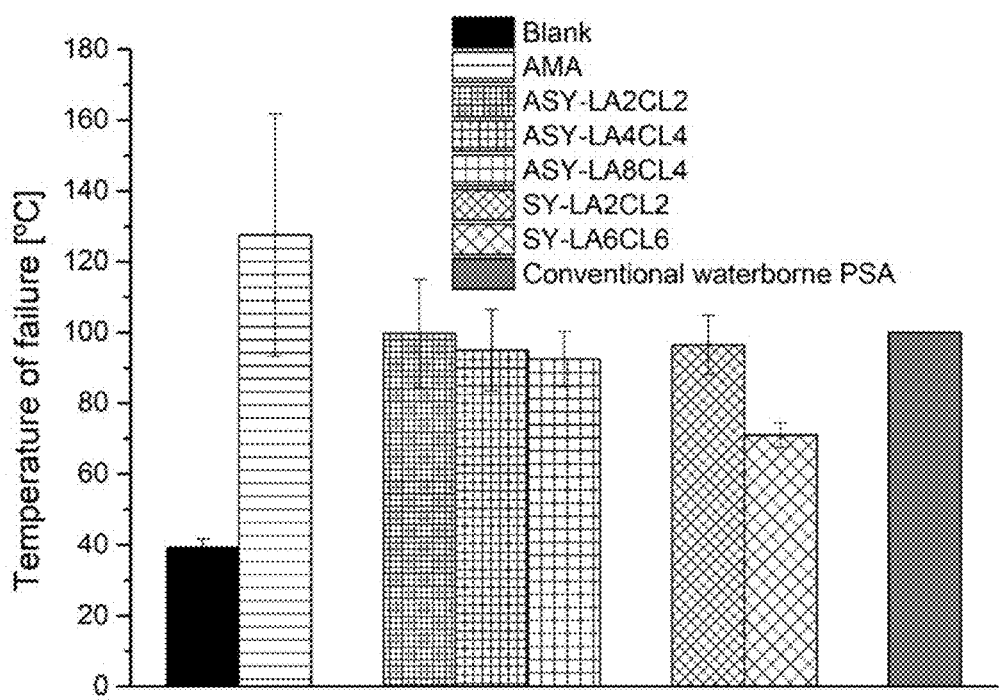
FIG. 9B shows SAFT values of various latices according to yet a particular embodiment of the invention.

FIG. 9B shows the SAFT values of five inventive latices (crosslinker: ASY-LA2CL2, ASY-LA4CL4, ASY-LA8CL4, SY-LA2CL2, SY-LA6CL6), an AMA containing latex, the blank sample and a conventional waterborne PSA. Also the SAFT values increase with the gel content. Therefore, the lowest temperature of failure is exhibited by the blank sample while the AMA containing latex exhibits the highest temperature of failure. All inventive latices except SY-LA6CL6, which has a lower temperature of failure, have similar SAFT values. The difference between the inventive latices with different crosslinker lengths and therefore different gel contents is more significant regarding the time of failure (shear) than regarding the temperature of failure (SAFT).

Figure 10A:
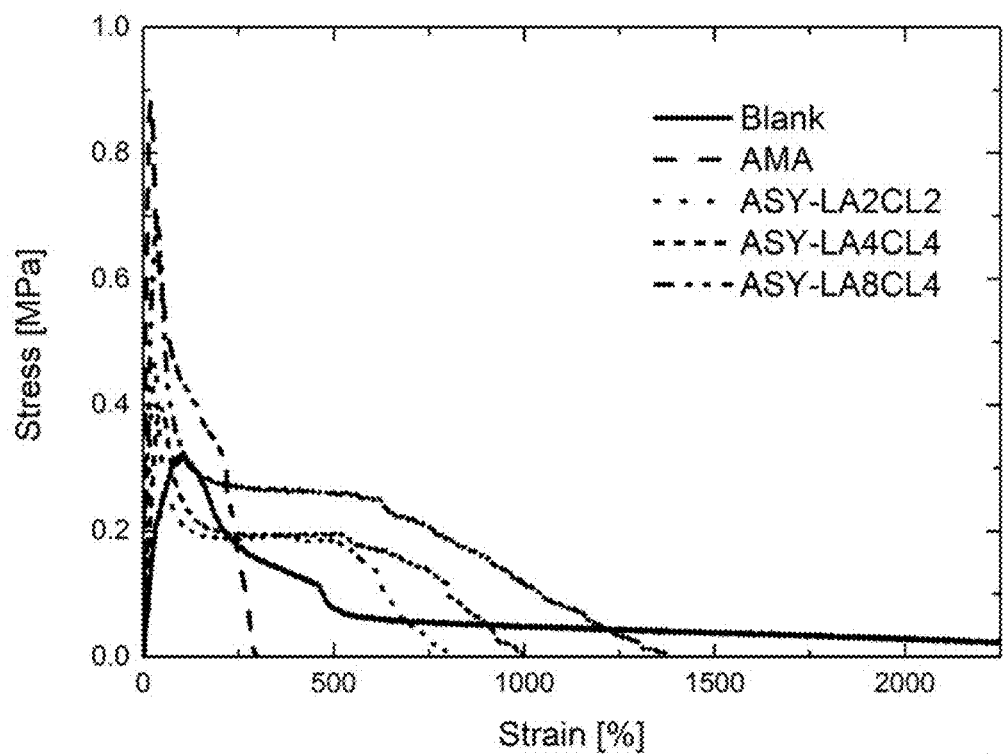
FIGS. 10A and 10B show each probe tack values of various latices and the respective stress strain curves according to yet another particular embodiment of the invention.
Figure 10B:
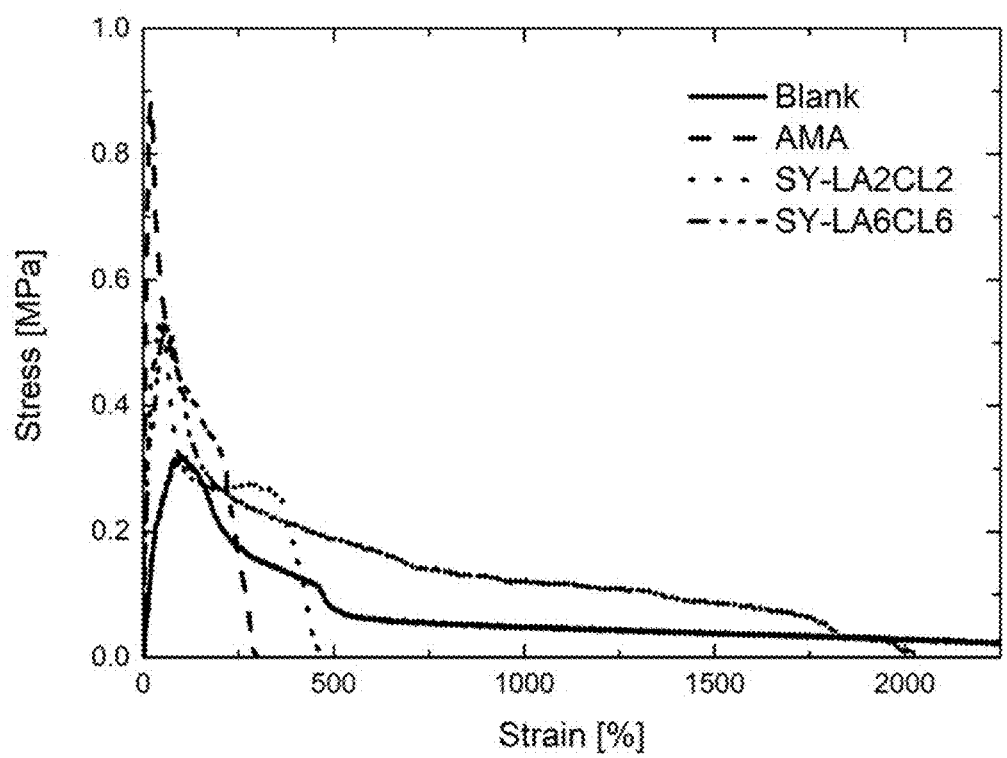

FIGS. 10A and 10B each show the stress strain curves of various inventive latices as well as the blank latex and the AMA containing latex obtained by probe tack measurements. FIG. 10A shows the stress strain curves of three inventive latices containing asymmetric crosslinkers (ASY-LA2CL2, ASY-LA4CL4, ASY-LA8CL4) as well as of the blank sample and the AMA containing latex, while FIG. 10B shows the stress strain curves of two inventive latices containing symmetric crosslinkers (SY-LA2CL2, SY-LA6CL6) as well as of the blank sample and the AMA containing latex. The AMA containing latex does not show a fibrillation plateau which indicates stiff behavior caused by its high degree of crosslinking, while the blank sample shows liquid like behavior. All inventive latices, except for the one containing SY-LA6CL6, which also shows liquid-like behavior, show a fibrillation plateau. The length of the fibrillation plateau increases with the length of the inventive crosslinker.

Figure 11A:
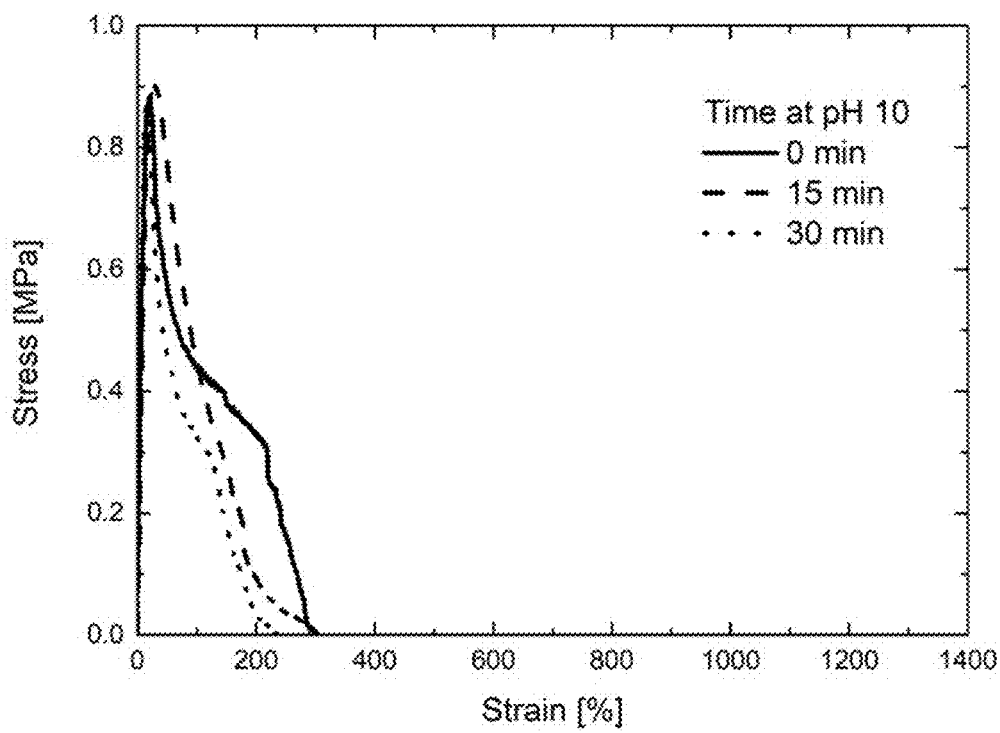
FIGS. 11A and 11B show each probe tack values of a latex after different immersion times in potassium hydroxide solution (pH 10) and the respective stress strain curves according to yet a further particular embodiment of the invention.
Figure 11B:
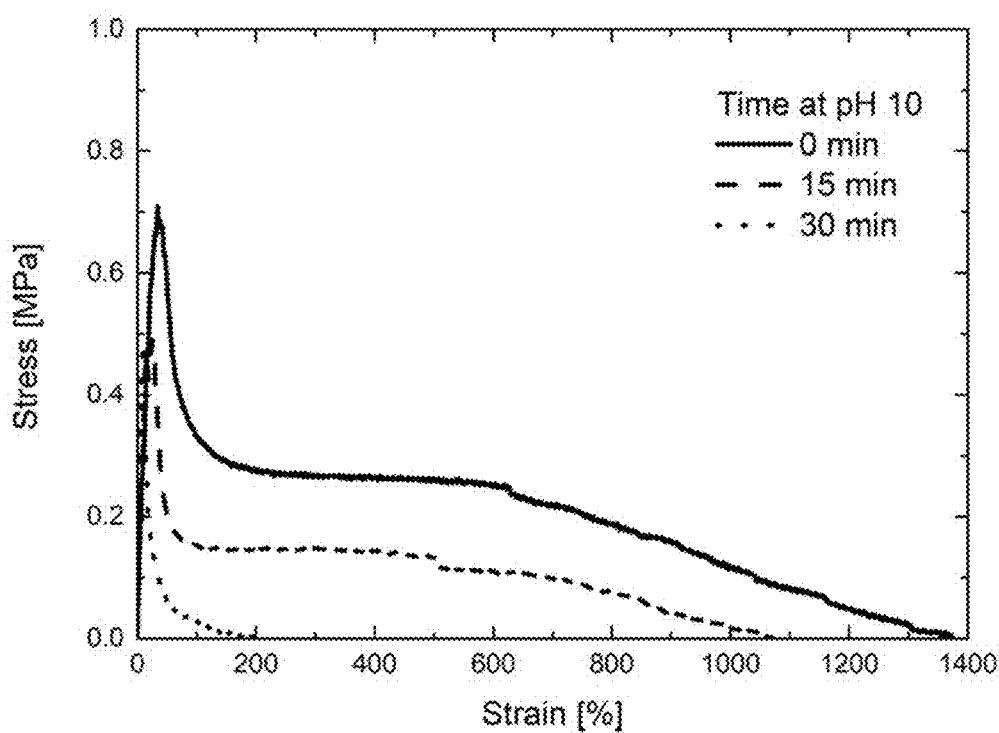

FIGS. 11A and 11B each show probe tack values of a latex with different immersion times (0 min, 15 min, 30 min) in potassium hydroxide solution (pH 10) and the respective stress strain curves. FIG. 11A shows the stress strain curves after different immersion times of the AMA containing latex, while FIG. 11B shows the stress strain curves after different immersion times of the ASY-LA8CL4 containing latex. The area under the stress strain curves of the AMA containing latex decreases slightly with the immersion time. However, the ASY-LA8CL4 containing latex shows a substantial decrease in the area under the stress strain curves, especially the fibrillation plateau of the stress strain curve after 30 min of immersion disappears completely, which indicates the decomposition of the crosslinker.

Figure 12A:
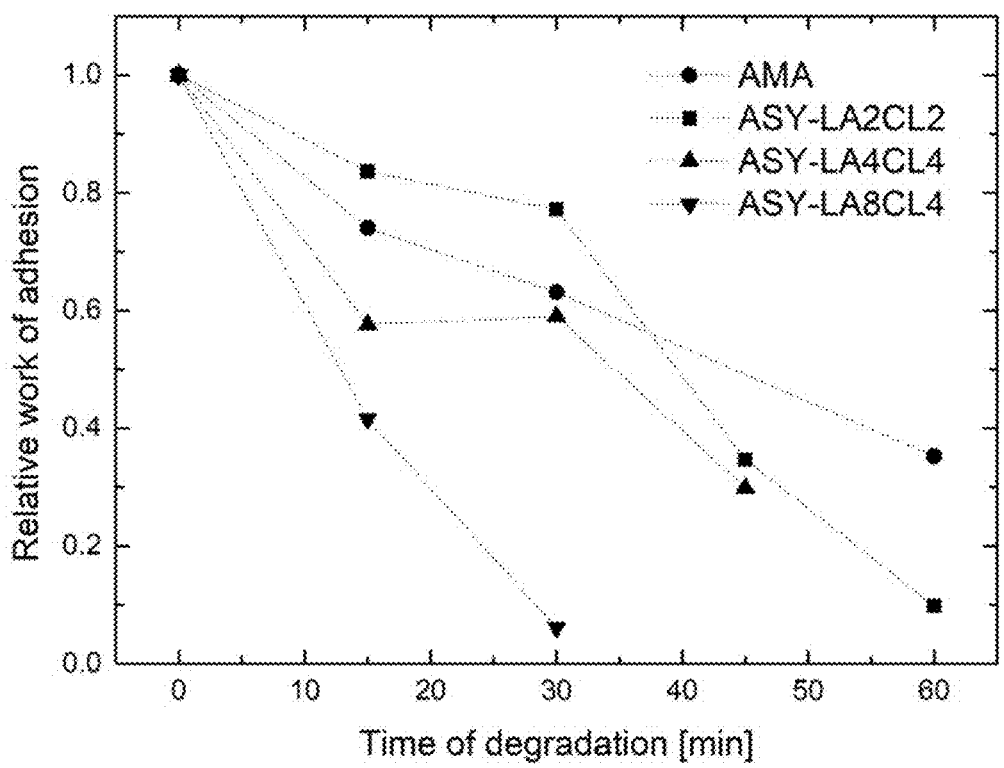
FIGS. 12A and 12B show each work of adhesion curves after different immersion times in potassium hydroxide solution (pH 10) according to another particular embodiment of the invention.
Figure 12B:
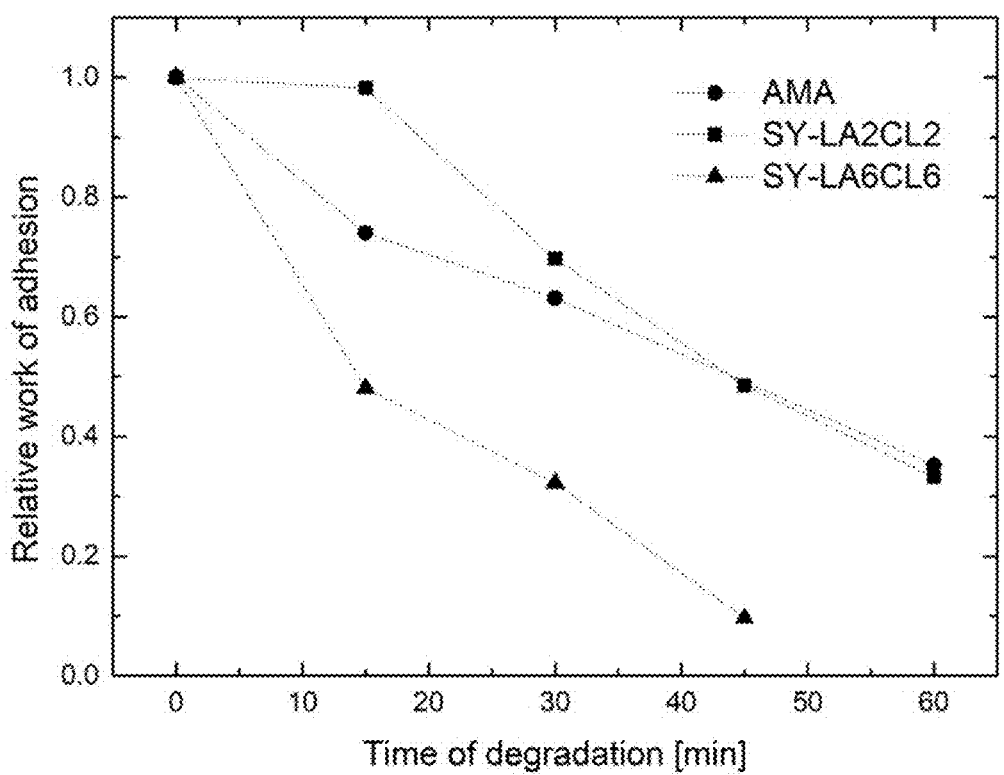

FIGS. 12A and 12B each show the work of adhesion curves with increasing immersion times calculated through integration of the probe tack curves of various inventive latices as well as the AMA containing latex. FIG. 12A shows the work of adhesion of three inventive latices containing asymmetric crosslinker (ASY-LA2CL2, ASY-LA4CL4, ASY-LA8CL4) as well as of the AMA containing latex, while FIG. 12B shows the work of adhesion of two inventive latices containing symmetric crosslinker (SY-LA2CL2, SY-LA6CL6) as well as of the AMA containing latex. All latices show a decrease in their relative work of adhesion with increasing immersion time in basic solution. The rate of degradation increases with increasing crosslinker length since the longer crosslinkers contain more degradable ester groups.

Examples

Abbreviation of Used Materials

HEMA: 2-hydroxyethylmethacrylate
BA: n-butyl acrylate
AA: acrylic acid
MMA: methyl methacrylate
KPS: potassium persulfate
$Sn(Oct)_2$: tin(II) 2-ethylhexanoate
Dowfax® 2A1: anionic surfactant, dodecyldiphenyloxide disulfonate (45 wt. % active matter, Dow Chemicals®)
t-DDM: chain transfer agent, tert-dodecanethiol
AMA: allyl methacrylate
AIBN azobisisobutyronitrile Synthesis of the Inventive Crosslinkers The asymmetric oligoester crosslinkers are referred to as ASY-LAnCLm and the symmetric oligoester crosslinkers are referred to as SY-LAnCLm, wherein "n" is the number of lactic acid units and "m" is the number of ε-caprolactone units, respectively.

1. Crosslinkers with ε-Caprolactone and Lactide

Asymmetric and symmetric oligoester crosslinkers with different target chain-lengths are synthesized by ROP (ring-opening polymerization) using $Sn(Oct)_2$ (0.1 mol %) as a catalyst in bulk under nitrogen atmosphere. The synthesis of the crosslinkers is either started with HEMA (asymmetric crosslinkers) or with 1,4-butanediol (symmetric crosslinkers) as initiating species. The monomers ε-caprolactone and lactide are used in different ratios and reacted at a temperature of 130° C. for 6 h. Subsequently, in a second step, 1.1 equivalents (asymmetric crosslinkers) or 2.2 equivalents (symmetric crosslinkers) of itaconic anhydride are added and the temperature is kept at 90° C. for 3 h an exemplary symmetric crosslinker is illustrated in the following as a block copolymer (with "m" and "n" as defined hereinabove):

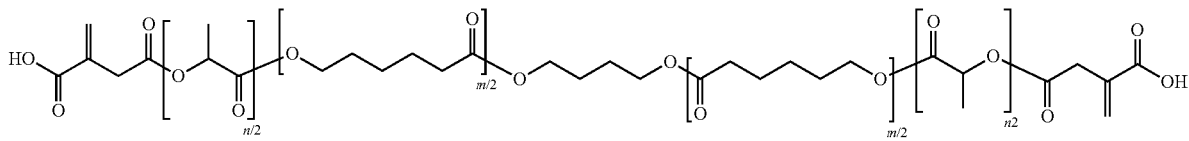

An exemplary asymmetric crosslinker is illustrated in the following as a block copolymer (with "m" and "n" as defined hereinabove):

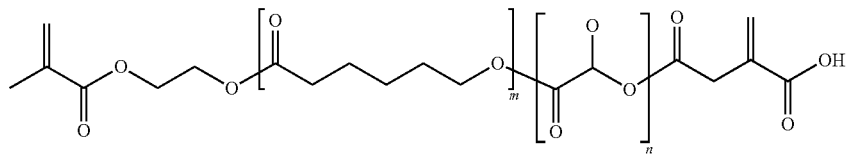

2. Homo-Crosslinkers with ε-Caprolactone

Asymmetric homo-ε-caprolactone-crosslinkers are prepared by ROP using $Sn(Oct)_2$ (0.01 mol %) as a catalyst in bulk under nitrogen atmosphere. The synthesis is started with HEMA as initiating species. Different equivalents of ε-caprolactone are added. This first step of the synthesis is carried out at 130° C. for 6 h. Then 1.1 equivalents of itaconic anhydride are added in a second step, which is carried out at 90° C. for 3 h. An exemplary asymmetric homo-ε-caprolactone-crosslinker is illustrated in the following as a block copolymer (with "m" as defined hereinabove):

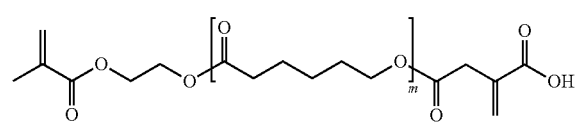

Symmetric homo-ε-caprolactone-crosslinkers are prepared by ROP using $Sn(Oct)_2$ (0.01 mol %) as a catalyst in bulk under nitrogen atmosphere. The synthesis is started with 1,4-butanediol as initiating species. Different equivalents of ε-caprolactone are added. This first step of the synthesis is carried out at 130° C. for 6 h. Then 2.2 equivalents of itaconic anhydride are added in a second step, which is carried out at 90° C. for 3 h. An exemplary symmetric homo-ε-caprolactone-crosslinker is illustrated in the following as a block copolymer (with "m" as defined hereinabove):

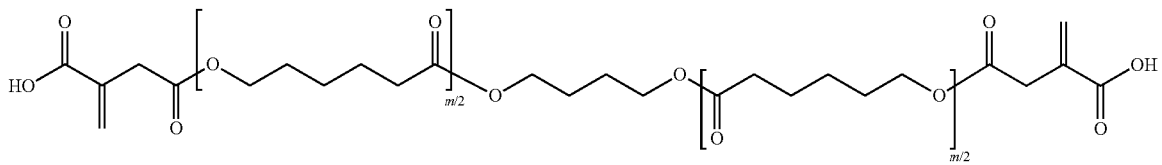

3. Homo-Crosslinkers with Lactide

Asymmetric homo-lactide-crosslinkers are prepared by ROP using $Sn(Oct)_2$ (0.01 mol %) as a catalyst in bulk under nitrogen atmosphere. The synthesis is started with HEMA as initiating species. Different equivalents of lactide are added. This first step of the synthesis is carried out at 130° C. for 6 h. Then 1.1 equivalents of itaconic anhydride are added in a second step, which is carried out at 90° C. for 3 h. An exemplary asymmetric homo-lactide-crosslinker is illustrated in the following as a block copolymer (with "n" as defined hereinabove):

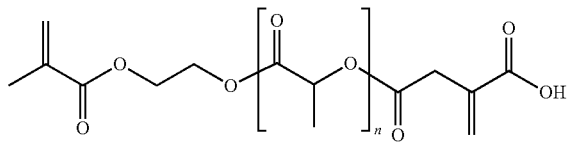

Symmetric homo-lactide-crosslinkers are prepared by ROP using $Sn(Oct)_2$ (0.01 mol %) as a catalyst in bulk under nitrogen atmosphere. The synthesis is started with 1,4-butanediol as initiating species. Different equivalents of lactide are added. This first step of the synthesis is carried out at 130° C. for 6 h. Then 2.2 equivalents of itaconic anhydride are added in a second step, which is carried out at 90° C. for 3 h. An exemplary symmetric homo-lactide-crosslinker is illustrated in the following as a block copolymer (with "n" as defined hereinabove):

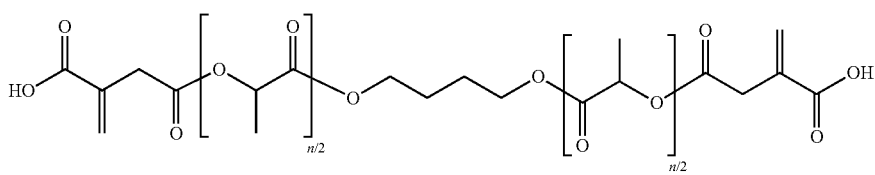

Solution Polymerization of the Inventive Crosslinkers with BA/MMA/AA

To test the suitability and ability of the inventive oligoester crosslinkers to copolymerize with common (meth)acrylic monomers solution polymerizations are carried out. A common PSA formulation for solution polymerization is used. Subsequently also the degradability of these PSAs (synthesized by solution polymerization) is tested.

Three PSAs (blank, ASY-LA4CL4 and SY-LA6CL6) are synthesized according to the following procedure: The monomers BA/MMA/AA in the ratio 89.1/9.9/1 and optionally 1 mol % of the inventive oligoester crosslinker are polymerized in a solution polymerization in toluene to obtain a polymer with a solids content of 30%, wherein 5 wbm % of AIBN are added when the polymerization temperature of 70° C. is reached. The solution polymerizations is carried out at 70° C. and under nitrogen atmosphere for 4 hours. The obtained polymer is dried by removing the solvent (i.e. toluene) in a vacuum oven at a temperature of 80° C. The dried polymers are then analyzed by GPC measurements. The molecular masses of the PSAs (polymers) are shown in Table 1, furthermore the molecular mass distributions are illustrated in FIG. 1.

For degradation, the dried polymer is then immersed for 24 h in a potassium hydroxide solution. The molecular masses of the PSAs after the immersion in potassium hydroxide solution is also shown in Table 1, moreover the molecular mass distributions before and after degradation are also displayed in FIG. 2A.

TABLE 1

Weight-average molecular masses and polydispersity of the PSAs synthesized by solution polymerization calculated from GPC-measurements before and after immersion in basic solution

| Polymer (PSA) | $M_W$ [g/mol] | PDI |
|---|---|---|
| Blank | 80,800 | 2.03 |
| Blank (degraded) | 65,000 | 2.22 |
| ASY-LA4CL4 | 297,600 | 4.65 |
| ASY-LA4CL4 (degraded) | 96,000 | 2.48 |
| SY-LA6CL6 | 375,400 | 6.41 |
| SY-LA6CL6 (degraded) | 108,000 | 2.45 |

The molecular mass distributions measured by GPC (SEC)/RI of the polymer containing the inventive oligoester crosslinkers are broader compared to the molecular mass distribution of the blank polymer, this is also confirmed by the PDIs. For the blank polymer (polymer without a crosslinker) a PDI of 2 is obtained, while for the polymer containing the crosslinker ASY-LA4CL4 has a PDI of 5 and for the polymer containing the crosslinker SY-LA6CL6 a PDI of 6 is determined by GPC measurements. These broader distributions and higher PDIs for the polymers containing the inventive oligoester crosslinkers proof their ability to function as a crosslinker in the copolymerization with (meth)acrylic monomers.

The molecular mass distribution of the blank polymer after immersion in a basic solution only changes slightly, whereas the molecular mass distributions of the polymers containing the inventive oligoester crosslinkers become narrower and are almost similar to the molecular mass distribution of the blank polymer after degradation.

The weight-average molecular mass of the blank polymer decreases by about 20% after degradation, whereas the weight-average molecular masses of the polymers with the inventive oligoester crosslinkers is around a third of the initial value after degradation. Furthermore, the polydispersity of the polymer containing the asymmetric oligoester crosslinker (ASY-LA4CL4) decreases from 4.7 to 2.5 and the polydispersity of the polymer containing the symmetric crosslinker (SY-LA6CL6) decreases from 6.4 to 2.5. On the other hand the blank polymer shows a slight increase in polydispersity from 2.0 to 2.2 after degradation. It can be concluded that the crosslinkers are degradable in basic environment.

The degradation of the crosslinkers is also displayed in the comparison of the $^1$H-NMRs before and after 24 hours of immersion in the potassium hydroxide solution with a pH of approximately 10. The comparison of the significant part of the $^1$H-NMRs of ASY-LA8CL4 is illustrated in FIG. 2B.

The structure of ASY-LA8CL4 including the labeling of the respective protons is shown in the following:

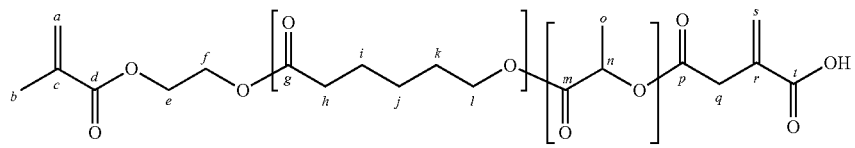

The $^1$H-NMR spectrum of which is the upper one in FIG. 2B.

After 24 hours only the peaks belonging to the two degradation products 6-hydroxyhexanoic acid (from the ε-caprolactone units) and 2-hydroxypropanoic acid (from the lactic acid units) remain. The structures of 6-hydroxyhexanoic acid and 2-hydroxypropanoic acid are shown in the following, also including the labeling of the respective protons:

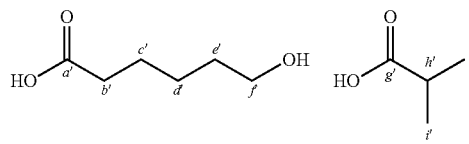

Hence, the oligoester co-crosslinker is completely degradated.

Synthesis of Inventive Pressure-Sensitive Adhesives

PSAs (pressure-sensitive adhesives) are synthesized in a two-step seeded semibatch emulsion polymerization process.

First, a seed with a solids content of 30 wt. % is prepared in semibatch emulsion polymerization at a temperature of 80° C. under nitrogen atmosphere and stirring at 200 rpm. Then 2 wbm % (weight % based on monomer) of Dowfax® 2A1, water and ammonium hydroxide solution are loaded into a 1-L-glassreactor. The initiator KPS is added and a preemulsion containing the monomers BA, MMA and AA, Dowfax® 2A1 and water is fed with a flow rate of 1.59 g/min for 180 min to the reactor. The temperature of 80° C. is kept for another 60 min after the feeding is finished.

In a second step, acrylic latices with a solids content of 50 wt. % are prepared in seeded semibatch emulsion polymerization at a temperature of 75° C. and under nitrogen atmosphere. The seed and water are loaded into a 1-L-glassreactor. Then 0.25 wbm % of the initiator KPS are added and a preemulsion containing the remainder of monomers BA, MMA and AA, the beforehand synthesized oligoester crosslinker, t-DDM, Dowfax® 2A1 and water are fed at a flow rate of 1.35 g/min for 180 min. Subsequently, after the feeding is finished, the temperature is raised and then kept at 80° C. for 60 min.

Depending on the analysis method adhesive films are needed. These adhesive films are prepared by casting the latex on a flame treated polyethylene terephthalate (PET) sheet (29 μm thick) using a stainless steel film applicator. The film applicator is used with a gap of 120 μm to produce films with a thickness of approximately 60 μm. For probe tack measurements films with a final thickness of 100 μm are cast over a glass substrate. In all cases films are dried at 23° C. and 50% humidity for 12 h.

Results and Discussion

Asymmetric and symmetric crosslinkers are successfully synthesized by one-pot ring opening polymerization, as described hereinabove. Three different asymmetric crosslinkers and two symmetric ones are synthesized changing the ratio between lactide and ε-caprolactone and hence, changing their length. Furthermore, asymmetric homocrosslinkers containing either lactide or ε-caprolactone are also synthesized. Moreover, also symmetric homo-crosslinkers containing either lactide or ε-caprolactone are also synthesized.

For all cases, the theoretical molecular masses and the experimental ones measured by NMR and/or GPC are very similar confirming the desired structure of the crosslinkers (see Table 2). The number-average molecular masses measured by GPC are higher than the theoretical ones which could be attributed to the polystyrene calibration used in the analyses.

TABLE 2

Theoretical and experimental molecular masses calculated from NMR and number-average molecular mass determined by GPC of the synthesized crosslinkers

| Crosslinker | M (theo.) [g/mol] | M (NMR) [g/mol] | $M_n$ (GPC) [g/mol] | PDI |
|---|---|---|---|---|
| ASY-LA2CL2 | 598 | 586 | — | — |
| ASY-LA4CL4 | 986 | 1,118 | 1,078 | 1.9 |
| ASY-LA8CL4 | 1,274 | 1,274 | 1,464 | 1.7 |
| SY-LA2CL2 | 686 | 680 | — | — |
| SY-LA6CL6 | 1,486 | 1,486 | 1,583 | 1.4 |
| ASY-LA6 | 674 | 638 | 610 | 1.3 |
| ASY-CL6 | 926 | 926 | 861 | 1.2 |

Kinetics and Particle Evolution

The hereinabove synthesized degradable crosslinkers are included in waterborne PSA formulations (MMA/BA/AA in the ratio 89.1/9.9/1) by the hereinabove described two-step seeded semibatch emulsion polymerization process. Furthermore, two more latices are synthesized, one without a crosslinker and the other one using a commercially available crosslinker, allyl methacrylate (AMA). The evolution of the instantaneous and overall conversions are shown in FIG. 3A and the average particle sizes during the reaction are shown in FIG. 3B.

The kinetics are very similar in all cases regardless of the type of crosslinker used. Instantaneous conversions, determined gravimetrically, is at above 80% during most of the polymerization and at the end almost full conversion is achieved in all cases (see Table 3). Regarding the average particle size evolution, there are no substantial differences either, each PSA having a final particle size between 270 nm to 300 nm. In all cases the average particle size is larger than the targeted one indicating some aggregation between particles at the end of the polymerization process.

Glass Transition Temperature (Tg)

One of the most important properties when characterizing PSAs is the Tg (glass transition temperature), which is determined by differential scanning calorimetry (DSC). As shown in Table 3, all synthesized latices present similar and appropriate Tgs for the use as PSAs, namely between −36° C. and −33° C.

Crosslinking Properties

To determine the gel content (GC S), Soxhlet extractions of the dried latices are carried out. Soxhlet extraction describes the process of the continuous extraction of soluble components from solids. THF (tetrahydrofuran) is used as a solvent for the determination of the gel content for waterborne polyacrylates. The in THF soluble part of the polyacrylate (the so called "sol") is extracted from the in THF insoluble part (the so called "gel").

Crosslinking in the polyacrylates leads to the formation of a network. These networks, as they surpass a certain size, are not soluble in THF anymore, whereas the linear part of the polyacrylate (i.e. not crosslinked part) can be dissolved in THF.

To measure the gel content, glass fiber square pads (CEM) are used as backing. A few droplets of latex are placed on the filter (filter weight=$W_1$) and dried under vacuum overnight at room temperature. The filter together with the dried polymer is weighed ($W_2$) and then a continuous extraction with THF under reflux in the Soxhlet is carried out for 24 hours. The weight of the dry sample is taken ($W_3$) after the extraction is completed. A schematic overview of the process is illustrated in FIG. 4A. The gel content is calculated as the ratio between the weight of the insoluble polymer fraction and that of the initial sample, as shown by the following equation:

$$\text{Gel content [\%]} = \frac{W_3 - W_1}{W_2 - W_1} \times 100$$

The determined gel content of the different latices are listed in Table 3. As for the gel content or insoluble part in THF, it has been reported previously that the blank latex shows almost no gel content due to the usage of dodecanethiol as a CTA. However, the latex synthesized using AMA shows the highest gel content of 74%.

The gel content of the latices with the oligoester crosslinkers are between the blank one and the one containing AMA. Regarding the asymmetric oligoester crosslinkers the shortest one, ASY-LA2CL2, shows the largest gel content of 40%. When increasing the length of the asymmetric oligoester crosslinker, the gel content of the PSA decreases. Moreover, a similar trend is observed when using the symmetric oligoester crosslinkers, the longest crosslinker leads to the lowest gel content value of 23%.

Even though the same amount of moles of the oligoester crosslinkers and AMA are used, the gel content of the latices synthesized using the oligoester crosslinkers is just about half of the gel content of the AMA sample. Furthermore, gel content decreases when increasing the oligoester crosslinker length. This might be due to the lower water solubility of the oligoester crosslinkers and therefore, the limited ability they may have to diffuse in the aqueous phase from the monomer droplets to the polymer particles. The fact that the gel content decreases with an increase in the oligoester crosslinker length reaffirms this hypothesis.

As expected the lowest value of the soluble Mw is measured for the latex synthesized with AMA, since it has the highest amount of insoluble fraction. However, not only the Mw of the soluble part of the latices containing the oligoester crosslinkers are higher than the two references (the blank one and the one containing AMA), but also the polydispersity values are doubled.

Furthermore, swelling measurements are performed to obtain further data regarding the crosslinking density. Swelling is inversely proportional to the crosslinking density. To measure the degree of swelling Soxhlet extractions of the dried latices are carried out as schematically illustrated in FIG. 4A. Glass fiber square pads (CEM) are used as backing. A few droplets of latex are placed on the filter (filter weight=$W_1$) and dried for 18 h at 60° C. A continuous Soxhlet extraction with tetrahydrofuran (THF) under reflux is carried out afterwards for 24 h. The weight of the wet filter together with the wet swollen sample is taken ($W_2$). Subsequently the filter and the sample are dried for 18 h at 60° C. and weighted ($W_3$) afterwards. Three measurements are performed for each sample, the average value of swelling is reported. The average value of swelling is calculated as shown in the following equation:

$$\text{Swelling} = \frac{W_2 - (k+1) \cdot W_1}{W_3 - W_1}$$

The variable k represents the amount of THF [g] absorbed per gram of fiberglass (filter). To measure the value k, four of the fiberglass filters without any latex ($W_{f,1}$) are kept for 24 h under reflux conditions using THF in the Soxhlet apparatus and are then weighted immediately in their wet state ($W_{f,2}$). The amount of absorbed THF per gram of fiberglass filter is calculated as shown in the following equation:

$$k = \frac{W_{f,2} - W_{f,1}}{W_{f,1}}$$

The average of the calculated values of the four measured samples is considered for k (here: k=4.039).

The measured swelling values of the different latices are listed in Table 3 and are shown in FIG. 4B.

For the blank sample it was not possible to determine the average value of swelling because of its negligible gel content. The lowest swelling value was calculated for the AMA sample. Furthermore, the swelling value of the oligoester containing samples increases with increasing length of the oligoester crosslinkers in case of the asymmetric crosslinkers as well as in case of the symmetric crosslinkers. This indicates that the longer oligoester crosslinkers are less effective in emulsion polymerization because of their limited water solubility and therefore limited diffusion through the aqueous phase.

TABLE 3

Conversion, Z-average particle size, Tg, Gel Content measured by Soxhlet (GC S), Swelling measured by Soxhlet for PSA latices with different crosslinkers

| Crosslinker | X [%] | $D_p$ [nm] | Tg [° C.] | GCS [%] | Swelling |
|---|---|---|---|---|---|
| Blank | 96 | 278 | −36 | 7 ± 7 | — |
| AMA | 98 | 276 | −34 | 74 ± 0.3 | 3.41 |
| ASY-LA2CL2 | 97 | 295 | −34 | 40 ± 1 | 4.67 |
| ASY-LA4CL4 | 99 | 283 | −33 | 34 ± 0.5 | 6.02 |
| ASY-LA8CL4 | 99 | 286 | −34 | 31 ± 0.2 | 7.08 |
| SY-LA2CL2 | 100 | 298 | −34 | 40 ± 0.3 | 4.09 |
| SY-LA6CL6 | 100 | 268 | −34 | 23 ± 0.6 | 8.43 |

The weight-average molecular masses (Sol $M_w$) measured by GPC(SEC) with an RI (refractive index) detector and polystyrene (PS) as standard only refer to the soluble fraction of the polymer, whereas the weight-average molecular masses ($M_w$) measured by AF4 (asymmetric flow field-flow fractionation) with MALS (multi-angle light scattering) and an RI detector refer to the entire molecular mass spectrum, including very high molecular masses of above $10^7$ g/mol and hence provide significantly higher values for the molecular masses.

TABLE 3A

Mw of the soluble part in THF by GPC(SEC)RI, polydispersity index (PDI) by GPC(SEC)RI and Mw of the entire latices by AF4/MALS/RI for PSA latices with different crosslinkers

| Crosslinker | Sol $M_W$ (GPC) [kg/mol] | Sol PDI(GPC) | $M_W$ (AF4) [kg/mol] |
|---|---|---|---|
| Blank | 178 | 2.1 | 10,500 |
| AMA | 79 | 2.2 | 3,681,000 |
| ASY-LA2CL2 | 233 | 3.4 | 76,400 |
| ASY-LA4CL4 | 238 | 4.3 | 35,000 |
| ASY-LA8CL4 | 272 | 4.5 | 40,100 |
| SY-LA2CL2 | 264 | 4.1 | 93,800 |
| SY-LA6CL6 | 270 | 3.6 | 30,900 |

The samples containing the different crosslinkers are further characterized by AF4/MALS/RI to obtain information about the entire molecular mass distribution (whereas measurements by GPC(SEC)/RI analysis are only possible for the soluble fraction of the latices). The determined molecular mass distributions are shown in FIG. 5A (molecular mass distributions of the latices with asymmetric crosslinkers) and FIG. 5B (molecular mass distributions of the latices with symmetric crosslinkers) and both figures also show the molecular mass distributions of the blank sample and FIG. 5A also the AMA containing latex. Bimodal molecular mass distributions are observed (as shown in FIGS. 5A and 5B) with one mode of low molecular masses in between $10^4$ g/mol and $10^6$ g/mol and the other mode of high molecular masses in between $10^7$ g/mol and $4·10^8$ g/mol. The high molecular mass mode, which represents the crosslinked part of the polymeric composition, shows a clear peak, except for the sample containing the longest symmetric crosslinker (SY-LA6CL6). The molecular mass of the peak increases the shorter the oligoester crosslinker is. Thus, the high molecular mass peak of the latex containing the shortest symmetric crosslinker (SY-LA2CL2) has its maximum at the highest value for the oligoester containing samples at $2.5·10^8$ g/mol. Whereas, the longer asymmetric crosslinkers show maxima of their peak in the high molecular mass mode at $8·10^7$ g/mol (ASY-LA4CL4) and $6·10^7$ g/mol (ASY-LA8CL4). The AMA containing sample and the Blank each have the maximum of their peak in the high molecular mass mode on the one hand at a lower value of $1.5·10^7$ g/mol (Blank) and on the other hand at a higher value of $3.5·10^9$ g/mol (AMA).

Rheology

PSAs have to flow up to some point in order to make good contact with the substrates. To quantify that the Dahlquist criterion is used, which states that G' (storage modulus) should be smaller than $3·10^5$ Pa. In order to study that DMA (dynamic mechanical analysis) measurements of latices containing different crosslinkers are performed using a parallel plate setup. The determined storage moduli are shown in FIG. 6A (storage moduli of the latices with asymmetric crosslinkers) and FIG. 6B (storage moduli of the latices with symmetric crosslinkers) and both figures also show the storage moduli of the AMA containing latex and the blank sample.

All measured latices satisfy the Dahlquist criterion and show storage moduli values below 0.3 MPa at a frequency of 1 Hz. The AMA containing latex is the only one that seems to reach a plateau between $10^4$ Pa and $10^5$ Pa at low frequencies, while the blank sample shows liquid-like behavior. The storage moduli of the inventive latices containing oligoester crosslinkers are all in between the latex containing AMA and the blank sample.

Furthermore, the ratio of tan(S)/G' is related to the energy dissipation at the interface between adhesive and substrate. An increase in the viscous modulus in respect to the elastic modulus leads to an increase in resistance to detachment. Values above 5 $MPa^{-1}$ are recommended for steel substrates. The tan(S)/G' of the inventive latices containing the different crosslinkers are plotted in FIG. 7.

The AMA containing latex shows a value slightly above 5 $MPa^{-1}$ for tan(S)/G', whereas the blank shows a value of 16 $MPa^{-1}$. Values between 10 $MPa^{-1}$ and 12 $MPa^{-1}$ are calculated for the inventive latices containing the different symmetric and asymmetric oligoester crosslinkers. Therefore, it can be concluded that the inventive PSAs containing the different oligoester crosslinkers are good candidates for the use on steel substrates.

Adhesive Properties

The adhesive properties of the latices are characterized using different methods. The peel, loop tack and probe tack tests are performed at 23±2° C. and 50±5% humidity. The shear resistance failure time and the holding temperature are tested using Shear/SAFT equipment. Shear measurements are carried out at a temperature of 25° C. A temperature ramp of 1° C./min is applied for the SAFT measurements and a weight of 1 kg is attached to the samples for shear and SAFT measurements. For all cases average values of four repeated measurements are reported in the following.

180° Peel, Loop-tack, Shear and SAFT measurements are carried out to prove the feasibility of the synthesized latices as PSAs. The results of these measurements are presented in Table 4.

TABLE 4

Average peel, loop-tack, shear and SAFT values

| Crosslinker | Peel [N/25 mm] | Loop-tack [N/25 mm] | Shear [min] | SAFT [° C.] |
|---|---|---|---|---|
| Blank | 17.7 ± 1.9 | 35.2 ± 1.1 | 11 ± 3 | 39 ± 3 |
| AMA | 12.6 ± 1.2 | 13.5 ± 2.0 | >10,000 | 128 ± 34 |
| ASY-LA2CL2 | 17.0 ± 1.1 | 16.4 ± 0.9 | 2,714 ± 700 | 100 ± 15 |
| ASY-LA4CL4 | 15.4 ± 2.1 | 16.3 ± 3.8 | 826 ± 110 | 95 ± 12 |
| ASY-LA8CL8 | 20.4 ± 3.6 | 18.7 ± 1.7 | 413 ± 114 | 93 ± 8 |
| SY-LA2CL2 | 12.7 ± 1.1 | 14.4 ± 0.6 | 5,483 ± 1,050 | 97 ± 8 |
| SY-LA6CL6 | 21.0 ± 1.7 | 25.5 ± 2.6 | 140 ± 8 | 71 ± 4 |

Peel values between 12 N/25 mm and 21 N/25 mm are measured for the different latices. These are high values compared to commercially available duct tape, which shows a peel value of approximately 10 N/25 mm. The AMA and SY-LA2CL2 containing latices show the lowest peel values (13 N/25 mm) while the latices containing the longest asymmetric and symmetric crosslinkers show the highest peel values (20 N/25 mm and 21 N/25 mm, respectively), even higher than the peel value of the blank sample (18 N/25 mm). This can be explained due to the fact that with increasing crosslinking density, peel does reach a maximum and with further increasing crosslinking density starts to decrease. The different peel values are illustrated in FIG. 8A.

Tack on the other hand, shows the highest values for the lowest crosslinking density and it decreases with increasing crosslinking density, this is also observed in the loop-tack measurements. The blank sample shows by far the highest loop-tack value (35 N/25 mm) followed by the SY-LA6CL6 containing latex (26 N/25 mm), which has the lowest crosslinking density of the latices containing crosslinkers (GC S: 23%, as previously shown in Table 3). The other latices follow that trend, the lowest loop-tack values are observed for the AMA sample (14 N/25 mm) and for the samples containing the two shortest asymmetric and symmetric crosslinker (16 N/25 mm respectively 14 N/25 mm). These are also high values compared to the commercial duct tape, which shows a value of approximately 7 N/25 mm. The different loop-tack values are illustrated in FIG. 8B.

Shear values also follow the trend according to the measured gel contents. The lowest shear time of 11 minutes is observed for the blank sample and the highest of more than 10,000 minutes for the AMA containing latex. Both the asymmetric and symmetric oligoester crosslinker containing latices show shear times in between those two samples. The lowest shear times are observed for the longest oligoester crosslinker containing latices (ASY-LA8CL4: 413 min and SY-LA6CL6: 140 min) and higher shear times for the shorter crosslinkers (ASY-LA2CL2: 2,714 min and SY-LA2CL2: 5,483 min). The different shear values are illustrated in FIG. 9A.

The same trend can be seen in the results of the SAFT measurements. The blank sample fails at the lowest temperature of 39° C. and the AMA containing latex at the highest temperature of 128° C. Of the latices containing the inventive oligoester crosslinkers, the latex containing the longest symmetric one shows the lowest temperature of failure at 71° C. All other inventive latices show values in between 90° C. and 100° C. The different SAFT values are illustrated in FIG. 9B.

It is noticeable that the difference between the various inventive crosslinker containing latices is much more significant for the time of failure (shear) than for the temperature of failure (SAFT).

Furthermore, probe tack measurements of the different crosslinker containing latices are carried out on a glass substrate. The stress strain curves obtained from the probe tack measurements of the asymmetric crosslinker containing latices are shown in FIG. 10A, while the stress strain curves obtained from the probe tack measurements of the symmetric crosslinker containing latices are shown in FIG. 10B.

The curve of the AMA containing latex does not show a fibrillation plateau, indicating rather stiff behavior, which is caused by its high degree of crosslinking. The blank sample, on the other hand, shows liquid-like behavior. All latices containing the inventive oligoester crosslinkers, except for the SY-LA6CL6, which also behaves liquid-like and shows a strain up to 2,000% before it breaks, show a fibrillation plateau. The length of the plateau increases with an increase in the oligoester crosslinker length. The fibrillation plateaus of the latices containing ASY-LA2CL2 and ASY-LA4CL4 are each at the same stress level of 0.2 MPa. The latex containing the longest asymmetric crosslinker ASY-LA8CL4 shows the longest fibrillation plateau up to a strain of 1,300%, which is also at a higher stress level of 0.3 MPa. The latex containing the short symmetric crosslinker SY-LA2CL2 shows the shortest fibrillation plateau until a strain of almost 500% at a stress level of 0.3 MPa. The length of the fibrillation plateaus of the latices is in agreement with the results from Soxhlet extraction. The length of the fibrillation plateau increases with decreasing gel content.

Degradation

For the degradation study, 100 µm thick films of the different latices containing degradable crosslinkers are prepared on glass substrates, which are immersed into a potassium hydroxide solution with a pH of approximately 10 for different time periods. Probe tack measurements are performed before immersion and after different immersion times. In FIGS. 11A and 11B the probe tack curves of the AMA containing latex (FIG. 11A) and of the ASY-LA8CL4 containing latex (FIG. 11B) after 0 min, 15 min and 30 min immersion time are displayed.

The area below the probe tack curves of the AMA containing latex decreases slightly with the immersion time. However, the ASY-LA8CL4 containing latex shows a substantial decrease in the area below the probe tack curves. After 30 min of immersion the fibrillation plateau completely disappears.

The relative work of adhesion was calculated through integration of the probe tack curves for each latex at the different abovementioned immersion times. FIGS. 12A and 12B show the calculated work of adhesion normalized to the starting value at 0 min against the immersion times for the asymmetric (FIG. 12A) and symmetric (FIG. 12B) crosslinker containing latices as well as of the AMA containing latex.

All latices show a decrease in their relative work of adhesion with increasing time of immersion in the basic solution. Surprisingly, the latex containing AMA shows a substantial degradation of up to 35% of its starting value. It has to be considered that the AMA also contains an under these basic conditions degradable ester group. The latices containing the shortest asymmetric and symmetric crosslinkers show a similar degradation rate to the AMA containing latex. The rate of degradation increases with increasing length of the crosslinker, since the longer the crosslinkers contain more ester groups. The latex containing ASY-LA8CL4 shows a decrease in work of adhesion of 5% from the starting value in just 30 min, while the latex containing SY-LA6CL6 shows a decrease below 10% compared to the starting value within 45 min.

SUMMARY

A novel approach to obtain waterborne degradable PSAs and thus a possibility to face the major issue of the label removal during the recycling of glass bottles is presented in this application and supported by the above described examples. Symmetric and asymmetric oligoester crosslinkers are prepared and used to replace conventional crosslinkers (e.g. AMA) in waterborne PSA formulations (i.e. latices).

The inventive oligoester crosslinkers do not show any significant effect on the seeded semi-batch emulsion polymerization regarding the kinetics and particle evolution in comparison to the two references (i.e. the blank containing latex and the AMA containing latex). Soxhlet extraction prove that the oligoester crosslinkers indeed excellently work and function in this waterborne PSA formulations.

Their adherence seems to depend on their length: The shorter oligoester crosslinker containing latices are less adherent than the latices containing longer crosslinkers. Testing the adhesive properties of the latices reveal high peel and tack values and satisfactory shear and SAFT values.

Furthermore, the degradation of the PSA films (i.e. latices) is demonstrated by probe tack measurements. The latices containing the longest asymmetric and symmetric crosslinker show a substantial decrease in their work of adhesion in short times of only 30 min and 45 min, respectively. These results show the high potential for an application of these PSAs as degradable PSAs for labeling, especially labeling glass bottles.

The invention claimed is:

1. A crosslinker being degradable under basic conditions, wherein the crosslinker comprises moieties derived from ε-caprolactone (1-oxa-2-oxocycloheptane) and from lactide (3,6-dimethyl-1,4-dioxan-2,5-dion) and which crosslinker additionally comprises two ethylenically unsaturated bonds.

2. A method for producing polymeric compositions with degradable functional groups being degradable under basic conditions,
wherein said method comprises the step of using a crosslinker which crosslinker comprises moieties derived from ε-caprolactone (1-oxa-2-oxocycloheptane) and from lactide (3,6-dimethyl-1,4-dioxan-2,5-dion) and which crosslinker additionally comprises two ethylenically unsaturated bonds.

3. A method for producing a polymeric composition in the form of a water-based composition to be used as or in a pressure-sensitive adhesive, wherein the method comprises producing, via polymerization, a copolymer obtainable by copolymerizing moieties based on monomers (i), (ii) and (iii) according to the following definition and each being different from one another:
(i) at least one first ethylenically unsaturated monomer, the homopolymer of which has a glass transition temperature $Tg^{(i)}$ ranging from 30° C. to 200° C. in accordance with DIN EN ISO 11357-2:2014,
(ii) at least one second ethylenically unsaturated monomer, the homopolymer of which has a glass transition temperature $Tg^{(ii)}$ ranging from −100° C. to −10° C. in accordance with DIN EN ISO 11357-2:2014,
(iii) at least one crosslinker which crosslinker comprises moieties derived from ε-caprolactone (1-oxa-2-oxocycloheptane) and from lactide (3,6-dimethyl-1,4-dioxan-2,5-dion) and which crosslinker additionally comprises two ethylenically unsaturated bonds.

4. The method according to claim 3,
wherein:
monomer (i) is at least one first ethylenically unsaturated monomer, the homopolymer of which has a glass transition temperature $Tg^{(i)}$ ranging from 40° C. to 150° C. in accordance with DIN EN ISO 11357-2:2014,
monomer (ii) is at least one second ethylenically unsaturated monomer, the homopolymer of which has a glass transition temperature $Tg^{(ii)}$ ranging from −60° C. to −20° C. in accordance with DIN EN ISO 11357-2:2014, and
monomer (iii) is at least one crosslinking monomer, macromonomer or oligomer which comprises moieties derived from ε-caprolactone (1-oxa-2-oxocycloheptane) and from lactide (3,6-dimethyl-1,4-dioxan-2,5-dion) and which additionally comprises two ethylenically unsaturated bonds.

5. The method according to claim 3,
wherein:
(a) in a first stage, an emulsion prepolymerization of at least part of at least one of monomers (i) and (ii) is performed in the absence of crosslinker (iii), so as to produce an emulsion prepolymerization product to be used as a seed in the subsequent second stage (b); and then
(b) in a second stage, the emulsion prepolymerization product resulting from stage (a) and the remainder of monomers (i) and (ii), if any, are polymerized together with and in the presence of crosslinker (iii), so as to yield a polymeric composition in the form of a water-based composition, which polymeric composition comprises a copolymer comprising moieties of (i), (ii) and (iii) in the form of discrete particles.

6. The method according to claim 3, wherein monomer (i) comprises or is at least one of methyl methacrylate (MMA) and acrylic acid (AA).

7. The method according to claim 3, wherein monomer (i) comprises or is methyl methacrylate (MMA) and acrylic acid (AA).

8. The method according to claim 3, wherein monomer (ii) comprises or is butyl acrylate (BA).

9. The method according to claim 3,
wherein the moiety derived from ε-caprolactone, which is comprised by the crosslinker (iii), is represented by the following formula (1):

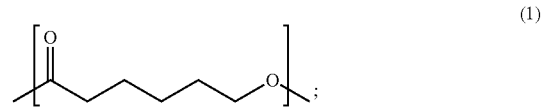

and wherein the moiety derived from lactide, which is comprised by the crosslinker (iii), is represented by the following formula (2):

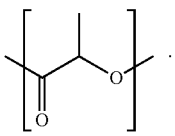
(2)

10. The method according to claim 3,
wherein moiety (iii) is obtainable via ring-opening polymerization from ε-caprolactone and lactide in the presence of at least one organic alcohol, followed by a termination reaction in the presence of at least one ethylenically unsaturated compound comprising a methylene group.

11. The method according to claim 3,
wherein moiety (iii) is obtainable via ring-opening polymerization from ε-caprolactone and lactide in the presence of at least one monovalent or divalent organic alcohol selected from monovalent or divalent aliphatic, cyclic and acrylic alcohols, followed by a termination reaction in the presence of at least one ethylenically unsaturated compound comprising a methylene group.

12. A polymeric composition in the form of a water-based composition to be used as or in a pressure-sensitive adhesive,
wherein the polymeric composition is obtainable by a method as defined in claim 3.

13. A polymeric composition in the form of a water-based composition to be used as or in a pressure-sensitive adhesive,
wherein the polymeric composition comprises a copolymer obtainable by copolymerizing moieties based on monomers (i), (ii) and (iii),
wherein the moieties (i), (ii) and (iii) are in accordance with the following definition and are each different from one another:
(i) moiety (i) on the basis of at least one first ethylenically unsaturated monomer, the homopolymer of which has a glass transition temperature $Tg^{(i)}$ ranging from 30° C. to 200° C. in accordance with DIN EN ISO 11357-2:2014,
(ii) moiety (ii) on the basis of at least one second ethylenically unsaturated monomer, the homopolymer of which has a glass transition temperature $Tg^{(ii)}$ ranging from −100° C. to −10° C. in accordance with DIN EN ISO 11357-2:2014,
(iii) moiety (iii) on the basis of at least one crosslinker, which crosslinker comprises moieties derived from ε-caprolactone (1-oxa-2-oxocycloheptane) and from lactide (3,6-dimethyl-1,4-dioxan-2,5-dion) and which crosslinker additionally comprises two ethylenically unsaturated bonds.

14. The polymeric composition according to claim 13, wherein:
moiety (i) is on the basis of the at least one first ethylenically unsaturated monomer, the homopolymer of which has a glass transition temperature $Tg^{(i)}$ ranging from 40° C. to 150° C. in accordance with DIN EN ISO 11357-2:2014,
moiety (ii) is on the basis of the at least one second ethylenically unsaturated monomer, the homopolymer of which has a glass transition temperature $Tg^{(ii)}$ ranging from −60° C. to −20° C. in accordance with DIN EN ISO 11357-2:2014, and
moiety (iii) is on the basis of at least one crosslinking monomer, macromonomer or oligomer which comprises moieties derived from ε-caprolactone (1-oxa-2-oxocycloheptane) and from lactide (3,6-dimethyl-1,4-dioxan-2,5-dion) and which additionally comprises two ethylenically unsaturated bonds.

15. The polymeric composition according to claim 13, wherein monomer (i) is at least one of methyl methacrylate (MMA) and acrylic acid (AA).

16. The polymeric composition according to claim 13, wherein monomer (i) is methyl methacrylate (MMA) and acrylic acid (AA).

17. The polymeric composition according to claim 13, wherein monomer (ii) is butyl acrylate (BA).

18. The polymeric composition according to claim 13,
wherein the polymeric composition comprises at least one of the following copolymers: (i)/(ii)/(iii)-copolymers or copolymers comprising moieties (i), (ii) and (iii) with a (i)/(ii)/(iii)-weight ratio of (1-80)/(20-99)/(0.0001-20), however, with the proviso that the sum of the weight shares results in 100.

19. The polymeric composition according to claim 13,
wherein the polymeric composition comprises at least one of the following copolymers: (i)/(ii)/(iii)-copolymers or copolymers comprising moieties (i), (ii) and (iii) with a (i)/(ii)/(iii)-molar ratio of (1-80)/(25-99)/(0.001-15), however, with the proviso that the sum of the molar shares results in 100.

20. The polymeric composition according to claim 13,
wherein the polymeric composition comprises at least one of the following copolymers: (MMA and/or AA)/BA/crosslinker-copolymers or copolymers comprising moieties (MMA and/or AA), BA and crosslinker with a (MMA and/or AA)/BA/crosslinker-weight ratio of (1-80)/(20-99)/(0.0001-20), however, with the proviso that the sum of the weight shares results in 100.

21. The polymeric composition according to claim 13,
wherein the polymeric composition comprises at least one of the following copolymers: (MMA and/or AA)/BA/crosslinker-copolymers or copolymers comprising moieties (MMA and/or AA), BA and crosslinker with a (MMA and/or AA)/BA/crosslinker-molar ratio of (1-80)/(25-99)/(0.001-15), however, with the proviso that the sum of the molar shares results in 100.

22. The polymeric composition according to claim 13,
wherein the polymeric composition is characterized by at least one of the following characteristics (a) to (e):
(a) the polymeric composition has a solids content in the range of from 5 to 90% by weight in accordance with ISO 124:2014;
(b) the copolymer comprised by the polymeric composition has a weight-average molecular mass ($M_w$) in the range of from $10^3$ to $10^{10}$ g/mol as determined by multi-angle light scattering (MALS);
(c) the copolymer comprised by the polymeric composition has a polydispersity index (PDI) in the range of from 1.5 to 9, based on the fraction of the copolymer being soluble in tetrahydrofuran (THF) and in accordance with DIN EN ISO 16014-5:2019;
(d) the copolymer comprised by the polymeric composition has a glass transition temperature Tg in the range of from −5 to −100° C., as determined by differential scanning calorimetry in accordance with DIN EN ISO 11357-2:2014;
(e) the particles of the polymeric composition have a z-average particle size in the range of from 10 to 1,000 nm, as determined by dynamic light scattering (DLS) in accordance with DIN ISO 22412:2018.

23. The polymeric composition according to claim 13, wherein the polymeric composition is characterized by at least one of the following characteristics (f) to (1):

(f) films produced from the polymeric composition by applying the polymeric composition to a support surface and subsequently drying and removal of liquid phase have a gel content in the range of from 15 to 75%, as determined by Soxhlet extraction with tetrahydrofuran (THF) as solvent in accordance with ASTM-D2765;

(g) films produced from the polymeric composition by applying the polymeric composition to a support surface and subsequently drying and removal of liquid phase have swelling values in the range of from 2 to 30, as determined by Soxhlet extraction with tetrahydrofuran (THF) as solvent in accordance with ASTM-D2765;

(h) films produced from the polymeric composition by applying the polymeric composition to a support surface and subsequently drying and removal of liquid phase satisfy the Dahlquist criterion and have storage modulus values (G') smaller than $3 \cdot 10^5$ Pa at a frequency of 1 Hz, as determined by dynamic mechanical analysis (DMA) in accordance with DIN EN ISO 6721-11:2012;

(i) films produced from the polymeric composition by applying the polymeric composition to a support surface and subsequently drying and removal of liquid phase, have 180° peel values in the range of from 5 to 35 N/25 mm in accordance with ASTM-D3330;

(j) films produced from the polymeric composition by applying the polymeric composition to a support surface and subsequently drying and removal of liquid phase have loop-tack values in the range of from 5 to 50 N/25 mm in accordance with ASTM-D6195;

(k) films produced from the polymeric composition by applying the polymeric composition to a support surface and subsequently drying and removal of liquid phase have shear values in the range of from 100 to 16,000 min in accordance with ASTM-D3654;

(l) films produced from the polymeric composition by applying the polymeric composition to a support surface and subsequently drying and removal of liquid phase have SAFT values in the range of from 40 to 200° C. in conformity with ASTM-D4498.

24. A pressure-sensitive adhesive being degradable under basic conditions and being in the form of a water-based composition, wherein the adhesive comprises a polymeric composition as defined in claim 13.

* * * * *